US012544391B2

(12) United States Patent
Du et al.

(10) Patent No.: US 12,544,391 B2
(45) Date of Patent: Feb. 10, 2026

(54) CD73 INHIBITORS

(71) Applicant: ORIC Pharmaceuticals, Inc., South San Francisco, CA (US)

(72) Inventors: Xiaohui Du, Belmont, CA (US); John Eksterowicz, Burlingame, CA (US); Valeria R. Fantin, Burlingame, CA (US); Daqing Sun, Foster City, CA (US); Qiuping Ye, Foster City, CA (US); Jared Moore, San Rafael, CA (US); Tatiana Zavorotinskaya, Moraga, CA (US); Brian R. Blank, Daly City, CA (US); Hiroyuki Kawai, Pacifica, CA (US); Chien-Hung Yeh, San Bruno, CA (US); Yosup Rew, Foster City, CA (US); Kejia Wu, South San Francisco, CA (US); Johnny Pham, San Bruno, CA (US)

(73) Assignee: ORIC PHARMACEUTICALS, INC., South San Francisco, CA (US)

( * ) Notice: Subject to any disclaimer, the term of this patent is extended or adjusted under 35 U.S.C. 154(b) by 1003 days.

(21) Appl. No.: 17/626,731

(22) PCT Filed: Jul. 15, 2020

(86) PCT No.: PCT/US2020/042183
§ 371 (c)(1),
(2) Date: Jan. 12, 2022

(87) PCT Pub. No.: WO2021/011689
PCT Pub. Date: Jan. 21, 2021

(65) Prior Publication Data
US 2022/0331343 A1    Oct. 20, 2022

Related U.S. Application Data

(60) Provisional application No. 63/049,927, filed on Jul. 9, 2020, provisional application No. 62/987,653, filed on Mar. 10, 2020, provisional application No. 62/927,974, filed on Oct. 30, 2019, provisional application No. 62/874,533, filed on Jul. 16, 2019.

(51) Int. Cl.
*A61K 31/675* (2006.01)
*A61K 45/06* (2006.01)
*A61P 35/00* (2006.01)
*C07F 9/6561* (2006.01)

(52) U.S. Cl.
CPC ............ *A61K 31/675* (2013.01); *A61K 45/06* (2013.01); *A61P 35/00* (2018.01); *C07F 9/6561* (2013.01)

(58) Field of Classification Search
CPC ............... A61K 31/675; C07F 9/6561
See application file for complete search history.

(56) References Cited

U.S. PATENT DOCUMENTS

| | | |
|---|---|---|
| 10,239,912 B2 | 3/2019 | Debien et al. |
| 11,028,120 B2 | 6/2021 | Du et al. |
| 11,129,841 B2 | 9/2021 | Du et al. |
| 11,130,778 B2 | 9/2021 | Du et al. |
| 12,018,043 B2 | 6/2024 | Du et al. |
| 2004/0229839 A1 | 11/2004 | Babu et al. |
| 2004/0266723 A1 | 12/2004 | Otto et al. |
| 2009/0029949 A1 | 1/2009 | Parrill-Baker et al. |
| 2009/0274686 A1 | 11/2009 | Or et al. |
| 2017/0044203 A1 | 2/2017 | Cacatian et al. |
| 2018/0072742 A1 | 3/2018 | Chen et al. |
| 2018/0085444 A1 | 3/2018 | Morgan et al. |
| 2019/0309010 A1 | 10/2019 | Debien et al. |
| 2020/0093844 A1 | 3/2020 | Du et al. |
| 2020/0347090 A1 | 11/2020 | Du et al. |
| 2021/0047359 A1 | 2/2021 | Du et al. |
| 2021/0130389 A1 | 5/2021 | Du et al. |
| 2021/0130390 A1 | 5/2021 | Du et al. |
| 2021/0214387 A1 | 7/2021 | Du et al. |
| 2022/0054512 A1 | 2/2022 | Du et al. |
| 2022/0220147 A1 | 7/2022 | Du et al. |
| 2022/0259253 A1 | 8/2022 | Du et al. |
| 2022/0411459 A1 | 12/2022 | Du et al. |
| 2023/0131747 A1 | 4/2023 | Du et al. |
| 2024/0124512 A1 | 4/2024 | Du et al. |
| 2025/0034198 A1 | 1/2025 | Du et al. |

FOREIGN PATENT DOCUMENTS

| | | | |
|---|---|---|---|
| CN | 104530166 B | 8/2016 | |
| EP | 0477454 A1 | 4/1992 | |
| EP | 0479640 A2 | 4/1992 | |
| WO | WO-2005020885 A2 | 3/2005 | |
| WO | WO-2008083949 A2 | 7/2008 | |
| WO | WO-2009127230 A1 | 10/2009 | |
| WO | WO-2015164573 A1 * | 10/2015 | ........... A61K 31/517 |
| WO | WO-2017098421 A1 | 6/2017 | |

(Continued)

OTHER PUBLICATIONS

Hammouda RSC Med. Chem., 2022, 13, 1150-1196 (Year: 2022).*
Ott et al Bioorg Med Chem Lett 2017 27 18 4238-4246 (Year: 2017).*
Stambasky et al Chem Rev 2009 109, 6729-6764 (Year: 2009).*
Database Accession No. 2018:1846166 (Oct. 4, 2018).
U.S. Appl. No. 17/083,871 Office Action dated May 24, 2022.
U.S. Appl. No. 17/697,318 Office Action dated Feb. 23, 2023.
U.S. Appl. No. 18/051,125 Office Action dated Aug. 23, 2023.
Berge et al. Pharmaceutical Salts. Journal of Pharmaceutical Sciences 66(1):1-19 (Jan. 1977).
Boothroyd et al. Why Do Some Molecules Form Hydrates or Solvates? Cryst Growth Des 18:1903-1908 (2018).

(Continued)

*Primary Examiner* — Jeffrey S Lundgren
(74) *Attorney, Agent, or Firm* — WILSON SONSINI GOODRICH & ROSATI

(57) ABSTRACT

Described herein are CD73 inhibitors and pharmaceutical compositions comprising said compounds. The subject compounds and compositions are useful for the treatment of cancer, infections, and neurodegenerative diseases.

31 Claims, No Drawings

(56) References Cited

FOREIGN PATENT DOCUMENTS

| WO | WO-2017120508 A1 | 7/2017 | |
| WO | WO-2018049145 A1 | 3/2018 | |
| WO | WO-2018067424 A1 | 4/2018 | |
| WO | WO-2018094148 A1 | 5/2018 | |
| WO | WO-2018119284 A1 | 6/2018 | |
| WO | WO-2018183635 A1 * | 10/2018 | .............. A61P 35/00 |
| WO | WO-2018208727 A1 | 11/2018 | |
| WO | WO-2018208980 A1 | 11/2018 | |
| WO | WO-2019090111 A1 | 5/2019 | |
| WO | WO-2019129059 A1 | 7/2019 | |
| WO | WO-2019213174 A1 | 11/2019 | |
| WO | WO-2019232319 A1 * | 12/2019 | ........... A61K 31/675 |
| WO | WO-2019246403 A1 | 12/2019 | |
| WO | WO-2020046813 A1 | 3/2020 | |
| WO | WO-2020257429 A1 | 12/2020 | |
| WO | WO-2021011689 A1 | 1/2021 | |
| WO | WO-2021087136 A1 | 5/2021 | |

OTHER PUBLICATIONS

Caiazzo et al. The Ecto-5'-Nucleotidase/CD73 Inhibitor, α,β-Methylene Adenosine 5'-Diphosphate, Exacerbates Carrageenan-Induced Pleurisy in Rat. Frontiers in Pharmacology 10:775 (2019).

Chan et al. Poster #LB-115. An Orally Bioavailable Inhibitor of CD73 Reverts Intratumoral Immunosuppression and Promotes Anti-Tumor Response. AACR Virtual Annual Meeting II, Jun. 22-24, 2020.

Co-pending U.S. Appl. No. 17/697,318, inventors Du; Xiaohui et al., filed on Mar. 17, 2022.

Du. Abstract #1242. Orally Bioavailable Small Molecule CD73 Inhibitor Reverses Immunosuppression by Reduction of Adenosine Production. PowerPoint Presentation AACR Annual Meeting Apr. 20, 2020.

Du et al. Orally Bioavailable Small-Molecule CD73 Inhibitor (OP-5244) Reverses Immunosuppression through Blockade of Adenosine Production. J Med Chem 63(18):10433-10459 (2020).

Freireich et al. Quantitative comparison of toxicity of anticancer agents in mouse, rat, hamster, dog, monkey, and man. Cancer Chemother. Rep. 50:219-244 (1966).

Ghalamfarsa et al., CD73 as a potential opportunity for cancer immunotherapy. Expert Opinion on Therapeutic Targets 23(2):127-142 (2019).

Gillerman et al., 2-Hexylthio-β,γ-CH2-ATP is an effective and selective NTPDase2 inhibitor. J Med Chem. 57(14):5919-34 (2014).

Jeffrey et al. Targeting Metabolism of Extracellular Nucleotides via Inhibition of Ectonucleotidases CD73 and CD39. J Med Chem 63(22):13444-13465 (2020).

Metzger et al. Intratumoral Immunosuppression is Reversed by Blocking Adenosine Production with an Oral Inhibitor of CD73. AACR-NCI-EORTC Oct. 27, 2019 Boston, MA.

Morisette et al. High-throughput crystallization: polymorphs, slats, co-crystals, and solvates of pharmaceutical solids. Advanced Drug Delivery Reviews 56:275-300 (2004).

Nguyen et al. Chiral drugs an overview. Int J Biomed Sci 2(2):85-100 (2006).

PCT/US2018/031891 International Search Report and Written Opinion dated Aug. 24, 2018.

PCT/US2018/059004 International Search Report and Written Opinion dated Feb. 26, 2019.

PCT/US2019/030068 International Search Report and Written Opinion dated Aug. 16, 2019.

PCT/US2020/042183 International Search Report and Written Opinion dated Oct. 27, 2020.

PCT/US2020/057996 International Search Report and Written Opinion dated Feb. 23, 2021.

U.S. Appl. No. 16/760,380 Office Action dated Jul. 12, 2021.

U.S. Appl. No. 17/078,567 Office Action dated Sep. 14, 2021.

U.S. Appl. No. 17/114,993 Office Action dated Jan. 27, 2021.

Xin et al. Solvate Prediction for Pharmaceutical Organic Molecules with Machine Learning. Cryst Growth Des 19:1903-1911 (2019).

Zavorotinskaya et al. Poster #1023. CD73 Inhibition with a Novel Orally Bioavailable Small Molecule Blocks Adenosine Production and Rescues T-cell Activation. AACR Virtual Annual Meeting II, Jun. 22-24, 2020.

Zhang. CD73: A Novel Target for Cancer Immunotherapy. Cancer Research 70(16):6407-6411 (2010).

Co-pending U.S. Appl. No. 18/660,815, inventors Du; Xiaohui et al., filed on May 10, 2024.

U.S. Appl. No. 17/722,513 Office Action dated Jun. 10, 2024.

U.S. Appl. No. 17/722,513 Office Action dated Nov. 16, 2023.

U.S. Appl. No. 18/476,763 Office Action dated Aug. 12, 2024.

U.S. Appl. No. 17/771,711 Office Action dated May 27, 2025.

U.S. Appl. No. 18/476,763 Office Action dated Mar. 12, 2025.

* cited by examiner

CD73 INHIBITORS

CROSS REFERENCE

This application is a § 371 U.S. National Stage Entry of International Application No. PCT/US2020/042183, filed Jul. 15, 2020, which claims the benefit of U.S. Application Ser. No. 62/874,533 filed Jul. 16, 2019, U.S. Application Ser. No. 62/927,974, filed Oct. 30, 2019, U.S. Application Ser. No. 62/987,653, filed Mar. 10, 2020, and U.S. Application Ser. No. 63/049,927, filed Jul. 9, 2020; which are hereby incorporated by reference in their entirety.

TECHNICAL FIELD OF THE INVENTION

The present disclosure relates to compounds, salts thereof, and pharmaceutical compositions thereof that are useful for inhibiting CD73 and treating (or preventing) a disease or disorder that is mediated by CD73.

BACKGROUND

A need exists in the art for an effective treatment of cancer, infections, and neurodegenerative diseases.

BRIEF SUMMARY OF THE INVENTION

Provided herein are compounds and compositions that are useful as CD73 inhibitors. Furthermore, the subject compounds and compositions are useful for the treatment of cancers, infections, and neurodegenerative diseases.

Provided herein are compounds having the structure of Formula (I), or a pharmaceutically acceptable salt thereof:

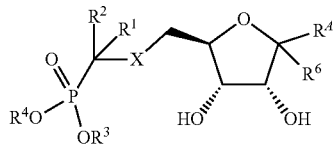

(I)

or a pharmaceutically acceptable salt thereof, wherein
X is —O—, —CH$_2$—, —S—, —S(O)$_2$—, or —NR'—;
R$^1$ is -L$^1$-R$^{10}$;
L$^1$ is a bond or an optionally substituted branched or straight C$_{1-6}$ alkylene chain, wherein up to two carbon atoms of L$^1$ are optionally and independently replaced by —NR'—, —S—, —O—, —OC(O)—, —C(O)O—, —C(O)—, —C(O)C(O)—, —C(O)NR'—, —NR'C(O)—, —NR'C(O)O—, —S(O)$_2$NR'—, —NR'S(O)$_2$—, —C(O)NR'NR'—, —NR'C(O)NR'—, —OC(O)NR'—, —NR'NR'—, —NR'S(O)$_2$NR'—, —S(O)—, or —S(O)$_2$—;
R$^{10}$ is selected from R', halo, —CN, or —CF$_3$;
each R' is independently selected from —H, or an optionally substituted group selected from a C$_{1-6}$ alkyl, a C$_{2-6}$ alkenyl, a C$_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;
R$^2$ is -L$^2$-R$^{20}$;
L$^2$ is a bond or an optionally substituted branched or straight C$_{1-6}$ Alkylene chain, wherein up to two carbon atoms of L$^2$ are optionally and independently replaced by —NR"—, —S—, —O—, —OC(O)—, —C(O)O—, —C(O)—, —C(O)C(O)—, —C(O)NR"—, —NR"C(O)—, —NR"C(O)O—, —S(O)$_2$NR"—, —NR"S(O)$_2$—, —C(O)NR"NR"—, —NR"C(O)NR"—, —OC(O)NR"—, —NR"NR"—, —NR"S(O)$_2$NR"—, —S(O)—, or —S(O)$_2$—;
R$^{20}$ is independently selected from R", halo, —CN, or —CF$_3$;
each R" is independently selected from —H or an optionally substituted group selected from a C$_{1-6}$ alkyl, a C$_{2-6}$ alkenyl, or a C$_{2-6}$ alkynyl;
each of R$^3$ and R$^4$ is independently selected from —H, C$_{1-3}$ alkyl, or a 3-8-membered saturated, partially unsaturated, or fully unsaturated monocyclic ring having 0-4 heteroatoms independently selected from nitrogen, oxygen, or sulfur;
R$^A$ is

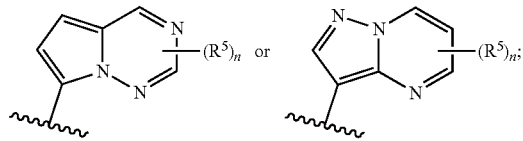

n is 1, 2, or 3;
each R$^5$ is independently -L$^3$-R$^{30}$;
each L$^3$ is independently a bond or an optionally substituted branched or straight C$_{1-6}$ alkylene chain, wherein up to two carbon atoms of L$^3$ are optionally and independently replaced by —NR'''—, —S—, —O—, —OC(O)—, —C(O)O—, —C(O)—, —C(O)C(O)—, —C(O)NR'''—, —NR'''C(O)—, —NR'''C(O)O—, —S(O)$_2$NR'''—, —NR'''S(O)$_2$—, —C(O)NR'''NR'''—, —NR'''C(O)NR'''—, —OC(O)NR'''—, —NR'''NR'''—, —NR'''S(O)$_2$NR'''—, —S(O)—, or —S(O)$_2$—;
each R$^{30}$ is independently selected from R''', halo, —CN, or —CF$_3$;
each R''' is independently selected from —H, or an optionally substituted group selected from a C$_{1-6}$ alkyl, a C$_{2-6}$ alkenyl, a C$_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R''' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur; and
R$^6$ is —H, —CN, halo, or C$_{1-6}$ alkyl;
provided that if R$^1$ is —H, then R$^2$ is other than —H.

Also disclosed herein is a pharmaceutical composition comprising a compound disclosed herein, or a pharmaceutically acceptable salt thereof, and a pharmaceutically acceptable vehicle, carrier, or adjuvant.

Also disclosed herein is a method of inhibiting CD73 comprising contacting CD73 with a compound disclosed herein, or pharmaceutically acceptable salt thereof, or a pharmaceutical composition disclosed herein. Also disclosed herein is a method of treating cancer in a subject, comprising administering to the subject a compound disclosed herein, or a pharmaceutically acceptable salt thereof, or a pharmaceutical composition disclosed herein. In some embodiments, the cancer is lung cancer, melanoma, breast cancer, ovarian cancer, colorectal cancer, gastric cancer, gallbladder cancer, prostate cancer, renal cancer, or a lymphoma. In some embodiments, the method further comprises administering a second therapeutic agent. In some embodiments, the second therapeutic agent is a chemotherapeutic agent or an immunotherapy agent.

Also disclosed herein is a method of treating an infection in a subject, comprising administering to the subject a compound disclosed herein, or a pharmaceutically acceptable salt thereof, or a pharmaceutical composition disclosed herein. In some embodiments, the infection is a viral infection. In some embodiments, the infection is a parasitic infection. Also disclosed herein is a method of treating a neurodegenerative disease in a subject, comprising administering to the subject a compound disclosed herein, or a pharmaceutically acceptable salt thereof, or a pharmaceutical composition disclosed herein. In some embodiments, the neurodegenerative disease is Alzheimer's disease, Parkinson's disease, Huntington's disease, schizophrenia, or autism.

DETAILED DESCRIPTION OF THE INVENTION

CD73 is a glycosylphosphatidylinositol (GPI) anchored cell surface protein that catalyzes the hydrolysis of adenosine monophosphate (AMP) to adenosine, and works in concert with CD39, which converts adenosine triphosphate (ATP) into AMP. The resulting adenosine functions as a signaling molecule that activates the P1 receptors expressed on the cell surface in many different tissues. Four G protein-coupled P1 or adenosine receptors have been cloned and designated as A1, A2A, A2B, and A3. Adenosine impacts a wide range of physiological processes including neural function, vascular perfusion, and immune responses. In doing so, this metabolite regulates CNS, cardiovascular, and immune system functions, to name a few.

Increasing evidence suggests that interactions between tumor cells and their microenvironment are essential for tumorigenesis. The purinergic signaling pathway in which CD73 plays a critical role, has emerged as an important player in cancer progression. It has become clear in recent years that adenosine is one of the most important immunosuppressive regulatory molecules in the tumor microenvironment and contributes to immune escape and tumor progression.

CD73 is a key protein molecule in cancer development. CD73 has been found to be overexpressed in many cancer cell lines and tumor types including, for example, breast cancer, colorectal cancer, ovarian cancer, gastric cancer, gallbladder cancer, and cancers associated with poor prognosis.

The expression of CD73 in tumors is regulated by a variety of mechanisms. CD73 expression is negatively regulated by estrogen receptor (ER) in breast cancer. Thus, CD73 is highly expressed in ER negative breast cancer patients. The hypoxia-inducible factor -1α (HIF-1α) has also been shown to regulate CD73 transcription. Additionally, inflammatory factors such as IFN-γ affect CD73 levels. CD73 expression is also epigenetically regulated by CpG island methylation in cell lines and clinical tumor samples.

In addition to being a prognostic biomarker in cancer patients, overexpression of CD73 has also been found to be functionally linked to therapy (e.g., cancer therapy) resistance. Elevated levels of CD73 were initially linked to resistance to a variety of chemotherapeutic agents including vincristine and doxorubicin.

CD73 has also been shown to be involved in immunotherapy resistance. This ectonucleotidase participates in the process of tumor immune escape by inhibiting the activation, clonal expansion, and homing of tumor -specific T cells (in particular, T helper and cytotoxic T cells); impairing tumor cell killing by cytolytic effector T lymphocytes; driving, via pericellular generation of adenosine, the suppressive capabilities of Treg and Th17 cells; enhancing the conversion of type 1 macrophages into tumor -promoting type 2 macrophages; and promoting the accumulation of MDSCs.

Small molecular inhibitors and monoclonal antibodies targeting CD73 have shown anti-tumor activity in a variety of immune-competent but not in immune-deficient mouse tumor models. Overall, these studies suggest that anti-CD73 therapy activity is dependent on its ability to elicit immune responses in vivo.

Antibodies which block PD-1, PD-L1, and CTLA-4 have shown beneficial responses in cancer patients. Recent data demonstrates that anti-CD73 mAb significantly enhances the activity of both anti-CTLA-4 and anti-PD-1 mAbs in several mouse tumor models. In addition to checkpoint blockade, CD73-mediated production of adenosine could contribute to resistance to additional immunotherapy modalities including CAR-T cells and cancer vaccines.

Interfering with CD73 activity represents a strategy to re-sensitize tumors to therapy. Based on the link between CD73 and therapy resistance, combining anti-CD73 treatment with chemotherapy or immunotherapy is an effective approach to enhance their activity in cancer patients with high CD73 levels. In some instances, CD73 expression serves as a biomarker to identify patients that could benefit from anti-CD73 combination therapy.

In some instances, the CD39/CD73 couple turns ATP-driven pro-inflammatory cell activity toward an adenosine-mediated anti-inflammatory state. A number of studies have shown changes in the activity of the CD39/CD73 axis during infections induced by a variety of microorganisms. An increase in CD73 expression has also been observed in the brain of mice infected with *Toxoplasma gondii*, which promotes the parasite life cycle through the production of adenosine. Thus, the pharmacological blockade of CD73 is a promising therapeutic approach to treat human toxoplasmosis.

Enhanced expression and activity of CD39 and CD73 have been observed in endothelial cells infected with cytomegalovirus (CMV). The increase in local adenosine production, associated with the upregulation of ecto-nucleotidases, generates an immunosuppressive and antithrombotic microenvironment, which facilitates viral entry into target cells.

In some instances, inhibitors of CD73, by driving a decrease on adenosine production, have applications as antiviral agents. The elevated expression/activity of CD39 and CD73 on lymphocytes of individuals infected with human immunodeficiency virus (HIV) indicates a role for ecto-nucleotidases in the immune dysfunction associated with this disease. In fact, an increased proportion of Tregs expressing CD39, as well as a positive correlation between CD39 expression on Tregs and disease progression has been observed in different cohorts of HIV-infected patients. It has also been shown that HIV-positive patients had a higher number of CD39+ Treg, and that their Teff exhibited an increased sensitivity in vitro to the suppressive effect of adenosine, which was related to the elevated expression of immunosuppressive A2A receptors.

In the central nervous system, adenosine plays a critical role in controlling a multitude of neural functions. Through the activation of P1 receptors, adenosine is involved in diverse physiological and pathological processes such as regulation of sleep, general arousal state and activity, local neuronal excitability, and coupling of the cerebral blood flow to the energy demand. In some instances, manipulation of adenosine production via CD73 inhibitors is useful for treating neurodegenerative diseases such as Alzheimer's disease, Parkinson's disease and Huntington's disease, and psychiatric disorders such as schizophrenia and autism.

The present disclosure provides compounds that inhibit CD73 activity. The present disclosure also provides compounds of Formula (I), or a pharmaceutically acceptable salt thereof:

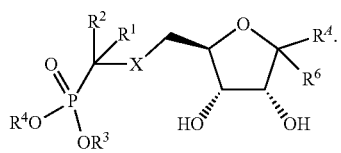

(I)

Definitions

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry," Thomas Sorrell, University Science Books, Sausalito: 1999, and "March's Advanced Organic Chemistry," 5th Ed., Ed.: Smith, M. B. and March, J., John Wiley & Sons, New York: 2001, the entire contents of which are hereby incorporated by reference.

As used herein and in the appended claims, the singular forms "a," "and," and "the" include plural referents unless the context clearly dictates otherwise. Thus, for example, reference to "an agent" includes a plurality of such agents, and reference to "the cell" includes reference to one or more cells (or to a plurality of cells) and equivalents thereof known to those skilled in the art, and so forth. When ranges are used herein for physical properties, such as molecular weight, or chemical properties, such as chemical formulae, all combinations and subcombinations of ranges and specific embodiments therein are intended to be included. The term "about" when referring to a number or a numerical range means that the number or numerical range referred to is an approximation within experimental variability (or within statistical experimental error), and thus the number or numerical range, in some instances, will vary between 1% and 15% of the stated number or numerical range. The term "comprising" (and related terms such as "comprise" or "comprises" or "having" or "including") is not intended to exclude that in other certain embodiments, for example, an embodiment of any composition of matter, composition, method, or process, or the like, described herein, "consist of" or "consist essentially of" the described features.

As described herein, "protecting group" and its abbreviation "PG" refer to a moiety or functionality that is introduced into a molecule by chemical modification of a functional group in order to obtain chemoselectivity in a subsequent chemical reaction. Standard protecting groups are provided in Wuts and Greene: "Greene's Protective Groups in Organic Synthesis," 4th Ed, Wuts, P. G. M. and Greene, T. W., Wiley-Interscience, New York: 2006.

As described herein, compounds of the disclosure optionally may be substituted with one or more substituents, such as are illustrated generally above, or as exemplified by particular classes, subclasses, and species of the disclosure.

As used herein, the term "hydroxyl" or "hydroxy" refers to an —OH moiety.

As used herein the term "aliphatic" encompasses the terms alkyl, alkenyl, and alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic (e.g., cycloalkyl or cycloalkenyl), heterocycloaliphatic (e.g., heterocycloalkyl or heterocycloalkenyl), aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl)carbonylamino, (heterocycloalkylalkyl) carbonylamino, heteroarylcarbonylamino, heteroaralkylcarbonylamino, alkylaminocarbonyl, cycloalkylaminocarbonyl, heterocycloalkylaminocarbonyl, arylaminocarbonyl, or heteroarylaminocarbonyl], amino (e.g., aliphaticamino, cycloaliphaticamino, or heterocycloaliphaticamino), sulfonyl (e.g., aliphatic-SO$_2$—), sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroarylalkoxy, alkoxycarbonyl, alkylcarbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino)alkyl (such as (alkyl-SO$_2$-amino)alkyl), aminoalkyl, amidoalkyl, (cycloaliphatic)alkyl, or haloalkyl. An alkyl is optionally substituted with one or more substituents including oxo, halo, —CN, —OH, or —NH$_2$. An alkyl is optionally substituted with one or more substituents including oxo, deuterium, halo, —CN, —OH, or —NH$_2$. An alkyl is optionally substituted with one or more deuteriums.

As used herein, an "alkenyl" group refers to an aliphatic carbon group that contains 2-12 (e.g., 2-8, 2-6, or 2-4) carbon atoms and at least one double bond. Like an alkyl group, an alkenyl group can be straight or branched. Examples of an alkenyl group include, but are not limited to allyl, 1- or 2-isopropenyl, 2-butenyl, and 2-hexenyl. An alkenyl group can be optionally substituted with one or more substituents such as halo, phospho, cycloaliphatic (e.g., cycloalkyl or cycloalkenyl), heterocycloaliphatic (e.g., heterocycloalkyl or heterocycloalkenyl), aryl, heteroaryl, alkoxy, aroyl, heteroaroyl, acyl [e.g., (aliphatic)carbonyl, (cycloaliphatic)carbonyl, or (heterocycloaliphatic)carbonyl], nitro, cyano, amido [e.g., (cycloalkylalkyl)carbonylamino, arylcarbonylamino, aralkylcarbonylamino, (heterocycloalkyl)carbonylamino, (heterocycloalkylalkyl)carbonylamino, heteroarylcarbonylamino, heteroaralkylcarbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphaticamino, heterocycloaliphaticamino, or aliphaticsulfonylamino], sulfonyl (e.g., alkyl-$SO_2$—, cycloaliphatic-$SO_2$—, or aryl-$SO_2$—), sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyalkenyl, aralkenyl, (alkoxyaryl)alkenyl, (sulfonylamino)alkenyl [e.g., (alkyl-$SO_2$-amino)alkenyl], aminoalkenyl, amidoalkenyl, (cycloaliphatic)alkenyl, or haloalkenyl. An alkenyl is optionally substituted with one or more substituents including oxo, halo, —CN, —OH, or —$NH_2$.

As used herein, an "alkynyl" group refers to an aliphatic carbon group that contains 2-12 (e.g., 2-8, 2-6, or 2-4) carbon atoms and has at least one triple bond. An alkynyl group can be straight or branched.

Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyloxy, nitro, carboxy, cyano, halo, hydroxy, sulfo, mercapto, sulfanyl (e.g., aliphaticsulfanyl or cycloaliphaticsulfanyl), sulfinyl (e.g., aliphaticsulfinyl or cycloaliphaticsulfinyl), sulfonyl (e.g., aliphatic-$SO_2$—, aliphaticamino-$SO_2$—, or cycloaliphatic-$SO_2$—), amido [e.g., aminocarbonyl, alkylaminocarbonyl, alkylcarbonylamino, cycloalkylaminocarbonyl, heterocycloalkylaminocarbonyl, cycloalkylcarbonylamino, arylaminocarbonyl, arylcarbonylamino, aralkylcarbonylamino, (heterocycloalkyl)carbonylamino, (cycloalkylalkyl)carbonylamino, heteroaralkylcarbonylamino, heteroarylcarbonylamino or heteroarylaminocarbonyl], urea, thiourea, sulfamoyl, sulfamide, alkoxycarbonyl, alkylcarbonyloxy, cycloaliphatic, heterocycloaliphatic, aryl, heteroaryl, acyl [e.g., (cycloaliphatic)carbonyl or (heterocycloaliphatic)carbonyl], amino (e.g., aliphaticamino), sulfoxy, oxo, carboxy, carbamoyl, (cycloaliphatic)oxy, (heterocycloaliphatic)oxy, or (heteroaryl)alkoxy. An alkynyl is optionally substituted with one or more substituents including oxo, halo, —CN, —OH, or —$NH_2$.

As used herein, an "amido" encompasses both "aminocarbonyl" and "carbonylamino." These terms when used alone or in connection with another group refer to an amido group such as —N($R^X$)—C(O)—$R^Y$ or —C(O)—N($R^X$)$_2$, when used terminally, and —C(O)—N($R^X$)— or —N($R^X$)—C(O)— when used internally, wherein $R^X$ and $R^Y$ can be aliphatic, cycloaliphatic, aryl, aralphatic, heterocycloaliphatic, heteroaryl or heteroaraliphatic. Examples of amido groups include alkylamido (such as alkylcarbonylamino or alkylaminocarbonyl), (heterocycloaliphatic)amido, (heteroaralkyl)amido, (heteroaryl)amido, (heterocycloalkyl)alkylamido, arylamido, aralkylamido, (cycloalkyl)alkylamido, or cycloalkylamido.

As used herein, an "amino" group refers to —$NR^XR^Y$ wherein each of $R^X$ and $R^Y$ is independently hydrogen, aliphatic, cycloaliphatic, (cycloaliphatic)aliphatic, aryl, araliphatic, heterocycloaliphatic, (heterocycloaliphatic)aliphatic, heteroaryl, carboxy, sulfanyl, sulfinyl, sulfonyl, (aliphatic)carbonyl, (cycloaliphatic)carbonyl, ((cycloaliphatic)aliphatic)carbonyl, arylcarbonyl, (aralphatic)carbonyl, (heterocycloaliphatic)carbonyl, ((heterocycloaliphatic)aliphatic)carbonyl, (heteroaryl)carbonyl, or (heteroaraliphatic)carbonyl, each of which being defined herein and being optionally substituted. Examples of amino groups include alkylamino, dialkylamino, or arylamino. When the term "amino" is not the terminal group (e.g., alkylcarbonylamino), it is represented by —$NR^X$—, where $R^X$ has the same meaning as defined above.

As used herein, an "aryl" group used alone or as part of a larger moiety as in "aralkyl," "aralkoxy," or "aryloxyalkyl" refers to monocyclic (e.g., phenyl), bicyclic (e.g., indenyl, naphthalenyl, tetrahydronaphthyl, and 2,3-dihydro-1H-indene), and tricyclic (e.g., fluorenyl tetrahydrofluorenyl, tetrahydroanthracenyl, and anthracenyl) ring systems in which the monocyclic ring system is aromatic or at least one of the rings in a bicyclic or tricyclic ring system is aromatic. The bicyclic and tricyclic groups include benzofused 2-3 membered carbocyclic rings. For example, a benzofused group includes phenyl fused with two or more $C_{4-8}$ carbocyclic moieties. An aryl is optionally substituted with one or more substituents including aliphatic (e.g., alkyl, alkenyl, or alkynyl); cycloaliphatic; (cycloaliphatic)aliphatic; heterocycloaliphatic; (heterocycloaliphatic)aliphatic; aryl; heteroaryl; alkoxy; (cycloaliphatic)oxy; (heterocycloaliphatic)oxy; aryloxy; heteroaryloxy; (araliphatic)oxy; (heteroaraliphatic)oxy; aroyl; heteroaroyl; amino; oxo (on a non-aromatic carbocyclic ring of a benzofused bicyclic or tricyclic aryl); nitro; carboxy; amido; acyl [e.g., (aliphatic)carbonyl, (cycloaliphatic)carbonyl, ((cycloaliphatic)aliphatic)carbonyl, (araliphatic)carbonyl, (heterocycloaliphatic)carbonyl, ((heterocycloaliphatic)aliphatic)carbonyl, or (heteroaraliphatic)carbonyl]; sulfonyl (e.g., aliphatic-$SO_2$— or amino-$SO_2$—); sulfinyl [e.g., aliphatic-S(O)— or cycloaliphatic-S(O)—]; sulfanyl (e.g., aliphatic-S—); cyano; halo; hydroxy; mercapto; sulfoxy; urea; thiourea; sulfamoyl; sulfamide; or carbamoyl. An aryl is optionally substituted with one or more substituents including halo, —CN, —OH, —$NH_2$, alkyl, alkoxy, or haloalkyl. Alternatively, an aryl can be unsubstituted. Non-limiting examples of substituted aryls include haloaryl [e.g., mono-, di (such asp, m-dihaloaryl), and (trihalo)aryl]; (carboxy)aryl [e.g., (alkoxycarbonyl)aryl, ((aralkyl)carbonyloxy)aryl, and (alkoxycarbonyl)aryl]; (amido)aryl [e.g., (aminocarbonyl)aryl, (((alkylamino)alkyl)aminocarbonyl)aryl, (alkylcarbonyl)aminoaryl, (arylaminocarbonyl)aryl, and (((heteroaryl)amino)carbonyl)aryl]; aminoaryl [e.g., ((alkylsulfonyl)amino)aryl or ((dialkyl)amino)aryl]; (cyanoalkyl)aryl; (alkoxy)aryl; (sulfamoyl)aryl [e.g., (aminosulfonyl)aryl]; (alkylsulfonyl)aryl; (cyano)aryl; (hydroxyalkyl)aryl; ((alkoxy)alkyl)aryl; (hydroxy)aryl, ((carboxy)alkyl)aryl; (((dialkyl)amino)alkyl)aryl; (nitroalkyl)aryl; (((alkylsulfonyl)amino)alkyl)aryl; ((heterocycloaliphatic)carbonyl)aryl; ((alkylsulfonyl)alkyl)aryl; (cyanoalkyl)aryl; (hydroxyalkyl)aryl; (alkylcarbonyl)aryl; alkylaryl; (trihaloalkyl)aryl; p-amino-m-alkoxycarbonylaryl; p-amino-m-cyanoaryl; p-halo-m-aminoaryl; or (m-(heterocycloaliphatic)-o-(alkyl))aryl.

As used herein, an "araliphatic" such as an "aralkyl" group refers to an aliphatic group (e.g., a $C_{1-4}$ alkyl group) that is substituted with an aryl group. "Aliphatic," "alkyl," and "aryl" are defined herein. An example of an araliphatic such as an aralkyl group is benzyl.

As used herein, an "aralkyl" group refers to an alkyl group (e.g., a $C_{1-4}$ alkyl group) that is substituted with an aryl group. Both "alkyl" and "aryl" have been defined above. An example of an aralkyl group is benzyl. An aralkyl is optionally substituted with one or more substituents such as aliphatic (e.g., alkyl, alkenyl, or alkynyl, including carboxyalkyl, hydroxyalkyl, or haloalkyl such as trifluoromethyl); cycloaliphatic (e.g., cycloalkyl or cycloalkenyl); (cycloalkyl)alkyl; heterocycloalkyl; (heterocycloalkyl)alkyl; aryl; heteroaryl; alkoxy; cycloalkyloxy; heterocycloalkyloxy; aryloxy; heteroaryloxy; aralkyloxy; heteroaralkyloxy; aroyl; heteroaroyl; nitro; carboxy; alkoxycarbonyl; alkylcarbonyloxy; amido [e.g., aminocarbonyl, alkylcarbonylamino, cycloalkylcarbonylamino, (cycloalkylalkyl)carbonylamino, arylcarbonylamino, aralkylcarbonylamino, (heterocycloalkyl)carbonylamino, (heterocycloalkylalkyl)carbonylamino, heteroarylcarbonylamino, or heteroaralkylcarbonylamino]; cyano; halo; hydroxyl; acyl; mercapto; alkylsulfanyl; sulfoxy; urea; thiourea; sulfamoyl; sulfamide; oxo; or carbamoyl. An aralkyl is optionally substituted with one or more substituents including halo, —CN, —OH, —NH$_2$, alkyl, alkoxy, or haloalkyl.

As used herein, a "bicyclic ring system" includes 6-12 (e.g., 8-12 or 9, 10, or 11) membered structures that form two rings, wherein the two rings have at least one atom in common (e.g., 2 atoms in common). Bicyclic ring systems include bicycloaliphatics (e.g., bicycloalkyl or bicycloalkenyl), bicycloheteroaliphatics, bicyclic aryls, and bicyclic heteroaryls.

As used herein, a "cycloaliphatic" group encompasses a "cycloalkyl" group and a "cycloalkenyl" group, each of which being optionally substituted as set forth below.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydro-indenyl, decahydro-naphthyl, bicyclo[3.2.1]octyl, bicyclo[2.2.2]octyl, bicyclo[3.3.1]nonyl, bicyclo[3.3.2.]decyl, bicyclo[2.2.2]octyl, adamantyl, or ((aminocarbonyl)cycloalkyl)cycloalkyl.

A "cycloalkenyl" group, as used herein, refers to a non-aromatic carbocyclic ring of 3-10 (e.g., 4-8) carbon atoms having one or more double bonds. Examples of cycloalkenyl groups include cyclopentenyl, 1,4-cyclohexa-di-enyl, cycloheptenyl, cyclooctenyl, hexahydro-indenyl, octahydro-naphthyl, cyclohexenyl, bicyclo[2.2.2]octenyl, or bicyclo[3.3.1]nonenyl.

A cycloalkyl or cycloalkenyl group can be optionally substituted with one or more substituents such as phosphor; aliphatic (e.g., alkyl, alkenyl, or alkynyl); cycloaliphatic; (cycloaliphatic)aliphatic; heterocycloaliphatic; (heterocycloaliphatic)aliphatic; aryl; heteroaryl; alkoxy; (cycloaliphatic)oxy; (heterocycloaliphatic)oxy; aryloxy; heteroaryloxy; (araliphatic)oxy; (heteroaraliphatic)oxy; aroyl; heteroaroyl; amino; amido [e.g., (aliphatic)carbonylamino, (cycloaliphatic)carbonylamino, ((cycloaliphatic)aliphatic)carbonylamino, (aryl)carbonylamino, (araliphatic)carbonylamino, (heterocycloaliphatic)carbonylamino, ((heterocycloaliphatic)aliphatic)carbonylamino, (heteroaryl)carbonylamino, or (heteroaraliphatic)carbonylamino]; nitro; carboxy (e.g., HOOC—, alkoxycarbonyl, or alkylcarbonyloxy); acyl [e.g., (cycloaliphatic)carbonyl, ((cycloaliphatic) aliphatic)carbonyl, (araliphatic)carbonyl, (heterocycloaliphatic)carbonyl, ((heterocycloaliphatic)aliphatic)carbonyl, or (heteroaraliphatic)carbonyl]; cyano; halo; hydroxyl; mercapto; sulfonyl (e.g., alkyl-SO$_2$— and aryl-SO$_2$—); sulfinyl (e.g., alkyl-S(O)—); sulfanyl (e.g., alkyl-S—); sulfoxy; urea; thiourea; sulfamoyl; sulfamide; oxo; or carbamoyl. A cycloalkyl is optionally substituted with one or more substituents including oxo, halo, —CN, —OH, —NH$_2$, alkyl, alkoxy, or haloalkyl.

As used herein, the term "heterocycloaliphatic" encompasses heterocycloalkyl groups and heterocycloalkenyl groups, each of which being optionally substituted as set forth below.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothiochromenyl, octahydroindolyl, octahydropyrindinyl, decahydroquinolinyl, octahydrobenzo[b]thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo[3.3.1.0$^{3,7}$]nonyl. A monocyclic heterocycloalkyl group can be fused with a phenyl moiety to form structures, such as tetrahydroisoquinoline, that would be categorized as heteroaryls.

A "heterocycloalkenyl" group, as used herein, refers to a mono- or bicylic (e.g., 5- to 10-membered mono- or bicyclic) non-aromatic ring structure having one or more double bonds, and wherein one or more of the ring atoms is a heteroatom (e.g., N, O, or S). Monocyclic and bicyclic heterocycloaliphatics are numbered according to standard chemical nomenclature.

A heterocycloalkyl or heterocycloalkenyl group can be optionally substituted with one or more substituents such as phospho, aliphatic [e.g., alkyl, alkenyl, or alkynyl], cycloaliphatic, (cycloaliphatic)aliphatic, heterocycloaliphatic, (heterocycloaliphatic)aliphatic, aryl, heteroaryl, alkoxy, (cycloaliphatic)oxy, (heterocycloaliphatic)oxy, aryloxy, heteroaryloxy, (araliphatic)oxy, (heteroaraliphatic)oxy, aroyl, heteroaroyl, amino, amido [e.g., (aliphatic)carbonylamino, (cycloaliphatic)carbonylamino, ((cycloaliphatic) aliphatic)carbonylamino, (aryl)carbonylamino, (araliphatic)carbonylamino, (heterocycloaliphatic)carbonylamino, ((heterocycloaliphatic) aliphatic)carbonylamino, (heteroaryl) carbonylamino, or (heteroaraliphatic)carbonylamino], nitro, carboxy [e.g., HOOC—, alkoxycarbonyl, or alkylcarbonyloxy], acyl [e.g., (cycloaliphatic)carbonyl, ((cycloaliphatic) aliphatic)carbonyl, (araliphatic)carbonyl, (heterocycloaliphatic)carbonyl, ((heterocycloaliphatic)aliphatic)carbonyl, or (heteroaraliphatic)carbonyl], nitro, cyano, halo, hydroxy, mercapto, sulfonyl [e.g., alkylsulfonyl or arylsulfonyl], sulfinyl [e.g., alkylsulfinyl], sulfanyl [e.g., alkylsulfanyl], sulfoxy, urea, thiourea, sulfamoyl, sulfamide, oxo, or carbamoyl. A heterocycloalkyl is optionally substituted with one or more substituents including oxo, halo, —CN, —OH, —NH$_2$, alkyl, alkoxy, or haloalkyl.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophene-yl, quinolinyl, or isoquinolinyl). Some examples of heteroaryl are azetidinyl, pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b]thiophenyl, indazolyl, benzimidazolyl, benzthiazolyl, puryl, cinnolyl, quinolyl, quinazolyl, cinnolyl, phthalazyl, quinazolyl, quinoxalyl, isoquinolyl, 4H-quinolizyl, benzo-1,2,5-thiadiazolyl, or 1,8-naphthyridyl.

Without limitation, monocyclic heteroaryls include furyl, thiophene-yl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

A heteroaryl is optionally substituted with one or more substituents such as aliphatic [e.g., alkyl, alkenyl, or alkynyl]; cycloaliphatic; (cycloaliphatic)aliphatic; heterocycloaliphatic; (heterocycloaliphatic)aliphatic; aryl; heteroaryl; alkoxy; (cycloaliphatic)oxy; (heterocycloaliphatic)oxy; aryloxy; heteroaryloxy; (araliphatic)oxy; (heteroaraliphatic) oxy; aroyl; heteroaroyl; amino; oxo (on a non-aromatic carbocyclic or heterocyclic ring of a bicyclic or tricyclic heteroaryl); carboxy; amido; acyl [e.g., aliphaticcarbonyl; (cycloaliphatic)carbonyl; ((cycloaliphatic)aliphatic)carbonyl; (araliphatic)carbonyl; (heterocycloaliphatic)carbonyl; ((heterocycloaliphatic)aliphatic)carbonyl; or (heteroaraliphatic)carbonyl]; sulfonyl [e.g., aliphaticsulfonyl or aminosulfonyl]; sulfinyl [e.g., aliphaticsulfinyl]; sulfanyl [e.g., aliphaticsulfanyl]; nitro; cyano; halo; hydroxy; mercapto; sulfoxy; urea; thiourea; sulfamoyl; sulfamide; or carbamoyl. Alternatively, a heteroaryl can be unsubstituted. A heteroaryl is optionally substituted with one or more substituents including, halo, —CN, —OH, —NH$_2$, alkyl, alkoxy, or haloalkyl.

Non-limiting examples of substituted heteroaryls include (halo)heteroaryl [e.g., mono- and di-(halo)heteroaryl]; (carboxy)heteroaryl [e.g., (alkoxycarbonyl)heteroaryl]; cyanoheteroaryl; aminoheteroaryl [e.g., ((alkylsulfonyl)amino) heteroaryl and ((dialkyl)amino)heteroaryl]; (amido) heteroaryl [e.g., aminocarbonylheteroaryl, ((alkylcarbonyl) amino)heteroaryl, ((((alkyl)amino)alkyl)aminocarbonyl) heteroaryl, (((heteroaryl)amino)carbonyl)heteroaryl, ((heterocycloaliphatic)carbonyl)heteroaryl, and ((alkylcarbonyl)amino)heteroaryl]; (cyanoalkyl)heteroaryl; (alkoxy) heteroaryl; (sulfamoyl)heteroaryl [e.g., (aminosulfonyl)heteroaryl]; (sulfonyl)heteroaryl [e.g., (alkylsulfonyl) heteroaryl]; (hydroxyalkyl)heteroaryl; (alkoxyalkyl) heteroaryl; (hydroxy)heteroaryl; ((carboxy)alkyl)heteroaryl; (((dialkyl)amino)alkyl]heteroaryl; (heterocycloaliphatic) heteroaryl; (cycloaliphatic)heteroaryl; (nitroalkyl)heteroaryl; (((alkylsulfonyl)amino)alkyl)heteroaryl; ((alkylsulfonyl)alkyl)heteroaryl; (cyanoalkyl)heteroaryl; (acyl) heteroaryl [e.g., (alkylcarbonyl)heteroaryl]; (alkyl) heteroaryl; or (haloalkyl)heteroaryl [e.g., trihaloalkylheteroaryl].

As used herein, a "heteroaraliphatic" (such as a heteroaralkyl group) refers to an aliphatic group (e.g., a C$_{1-4}$ alkyl group) that is substituted with a heteroaryl group. "Aliphatic," "alkyl," and "heteroaryl" have been defined above.

As used herein, a "heteroaralkyl" group refers to an alkyl group (e.g., a C$_{1-4}$ alkyl group) that is substituted with a heteroaryl group. Both "alkyl" and "heteroaryl" have been defined above. A heteroaralkyl is optionally substituted with one or more substituents such as alkyl (including carboxyalkyl, hydroxyalkyl, and haloalkyl such as trifluoromethyl), alkenyl, alkynyl, cycloalkyl, (cycloalkyl)alkyl, heterocycloalkyl, (heterocycloalkyl)alkyl, aryl, heteroaryl, alkoxy, cycloalkyloxy, heterocycloalkyloxy, aryloxy, heteroaryloxy, aralkyloxy, heteroaralkyloxy, aroyl, heteroaroyl, nitro, carboxy, alkoxycarbonyl, alkylcarbonyloxy, aminocarbonyl, alkylcarbonylamino, cycloalkylcarbonylamino, (cycloalkylalkyl)carbonylamino, arylcarbonylamino, aralkylcarbonylamino, (heterocycloalkyl)carbonylamino, (heterocycloalkylalkyl)carbonylamino, heteroarylcarbonylamino, heteroaralkylcarbonylamino, cyano, halo, hydroxy, acyl, mercapto, alkylsulfanyl, sulfoxy, urea, thiourea, sulfamoyl, sulfamide, oxo, or carbamoyl. A heteroaralkyl is optionally substituted with one or more substituents including, halo, —CN, —OH, —NH$_2$, alkyl, alkoxy, or haloalkyl.

As used herein, "cyclic moiety" and "cyclic group" refer to mono-, bi-, and tri-cyclic ring systems including cycloaliphatic, heterocycloaliphatic, aryl, or heteroaryl, each of which has been previously defined.

As used herein, a "bridged bicyclic ring system" refers to a bicyclic heterocyclicalipahtic ring system or bicyclic cycloaliphatic ring system in which the rings are bridged. Examples of bridged bicyclic ring systems include, but are not limited to, adamantanyl, norbornanyl, bicyclo[3.2.1] octyl, bicyclo[2.2.2]octyl, bicyclo[3.3.1]nonyl, bicyclo [3.3.2]decyl, 2-oxabicyclo[2.2.2]octyl, 1-azabicyclo[2.2.2] octyl, 3-azabicyclo[3.2.1]octyl, and 2,6-dioxa-tricyclo [3.3.1.0$^{3,7}$]nonyl. A bridged bicyclic ring system can be optionally substituted with one or more substituents such as alkyl (including carboxyalkyl, hydroxyalkyl, and haloalkyl such as trifluoromethyl), alkenyl, alkynyl, cycloalkyl, (cycloalkyl)alkyl, heterocycloalkyl, (heterocycloalkyl)alkyl, aryl, heteroaryl, alkoxy, cycloalkyloxy, heterocycloalkyloxy, aryloxy, heteroaryloxy, aralkyloxy, heteroaralkyloxy, aroyl, heteroaroyl, nitro, carboxy, alkoxycarbonyl, alkylcarbonyloxy, aminocarbonyl, alkylcarbonylamino, cycloalkylcarbonylamino, (cycloalkylalkyl)carbonylamino, arylcarbonylamino, aralkylcarbonylamino, (heterocycloalkyl) carbonylamino, (heterocycloalkylalkyl)carbonylamino, heteroarylcarbonylamino, heteroaralkylcarbonylamino, cyano, halo, hydroxy, acyl, mercapto, alkylsulfanyl, sulfoxy, urea, thiourea, sulfamoyl, sulfamide, oxo, or carbamoyl.

As used herein, an "acyl" group refers to a formyl group or R$^X$—C(O)— (such as alkyl-C(O)—, also referred to as "alkylcarbonyl") where R$^X$ and "alkyl" have been defined previously. Acetyl and pivaloyl are examples of acyl groups.

As used herein, an "aroyl" or "heteroaroyl" refers to an aryl-C(O)— or a heteroaryl-C(O)—. The aryl and heteroaryl portion of the aroyl or heteroaroyl is optionally substituted as previously defined.

As used herein, an "alkoxy" group refers to an alkyl-O— group where "alkyl" has been defined previously.

As used herein, a "carbamoyl" group refers to a group having the structure —O—CO—NR$^X$R$^Y$ or —NR$^X$—CO— O—R$^Z$, wherein R$^X$ and R$^Y$ have been defined above and R$^Z$ can be aliphatic, aryl, araliphatic, heterocycloaliphatic, heteroaryl, or heteroaraliphatic.

As used herein, a "carboxy" group refers to —COOH, —COOR$^X$, —OC(O)H, —OC(O)R$^X$, when used as a terminal group; or —OC(O)— or —C(O)O— when used as an internal group.

As used herein, a "haloaliphatic" group refers to an aliphatic group substituted with 1-3 halogen.

For instance, the term haloalkyl includes the group —CF$_3$.

As used herein, a "mercapto" group refers to —SH.

As used herein, a "sulfo" group refers to —SO$_3$H or —SO$_3$R$^X$ when used terminally or —S(O)$_3$— when used internally.

As used herein, a "sulfamide" group refers to the structure —NR$^X$—S(O)$_2$—NR$^Y$R$^Z$ when used terminally and —NR$^X$—S(O)$_2$—NR$^Y$— when used internally, wherein R$^X$, R$^Y$, and R$^Z$ have been defined above.

As used herein, a "sulfamoyl" group refers to the structure —O—S(O)$_2$—NR$^Y$R$^Z$ wherein R$^Y$ and R$^Z$ have been defined above.

As used herein, a "sulfonamide" group refers to the structure —S(O)$_2$—NR$^X$R$^Y$ or —NR$^X$—S(O)$_2$—R$^Z$ when used terminally; or —S(O)$_2$—NR$^X$— or —NR$^X$—S(O)$_2$— when used internally, wherein R$^X$, R$^Y$, and R$^Z$ are defined above.

As used herein a "sulfanyl" group refers to —S—R$^X$ when used terminally and —S— when used internally, wherein R$^X$ has been defined above. Examples of sulfanyls include aliphatic-S—, cycloaliphatic-S—, aryl-S—, or the like.

As used herein a "sulfinyl" group refers to —S(O)—R$^X$ when used terminally and —S(O)— when used internally, wherein R$^X$ has been defined above. Examples of sulfinyl groups include aliphatic-S(O)—, aryl-S(O)—, (cycloaliphatic(aliphatic))—S(O)—, cycloalkyl-S(O)—, heterocycloaliphatic-S(O)—, heteroaryl-S(O)—, or the like.

As used herein, a "sulfonyl" group refers to —S(O)$_2$—R$^X$ when used terminally and —S(O)$_2$— when used internally, wherein R$^X$ has been defined above. Examples of sulfonyl groups include aliphatic-S(O)$_2$—, aryl-S(O)$_2$—, (cycloaliphatic(aliphatic))—S(O)$_2$—, cycloaliphatic-S(O)$_2$—, heterocycloaliphatic-S(O)$_2$—, heteroaryl-S(O)$_2$—, (cycloaliphatic(amido(aliphatic)))—S(O)$_2$— or the like.

As used herein, a "sulfoxy" group refers to —O—S(O)—R$^X$ or —S(O)—O—R$^X$, when used terminally and —O—S(O)— or —S(O)—O— when used internally, where R$^X$ has been defined above.

As used herein, a "halogen" or "halo" group refers to fluorine, chlorine, bromine or iodine.

As used herein, an "alkoxycarbonyl," which is encompassed by the term carboxy, used alone or in connection with another group refers to a group such as alkyl-O—C(O)—.

As used herein, an "alkoxyalkyl" refers to an alkyl group such as alkyl-O-alkyl-, wherein alkyl has been defined above.

As used herein, a "carbonyl" refers to —C(O)—.

As used herein, "oxo" refers to =O.

As used herein, the term "phospho" refers to phosphinates and phosphonates. Examples of phosphinates and phosphonates include —P(O)(R)$_2$, wherein R is aliphatic, alkoxy, aryloxy, heteroaryloxy, (cycloaliphatic)oxy, (heterocycloaliphatic)oxy aryl, heteroaryl, cycloaliphatic or amino.

As used herein, an "aminoalkyl" refers to the structure (R$^X$)$_2$N-alkyl-.

As used herein, a "cyanoalkyl" refers to the structure (NC)-alkyl-.

As used herein, a "urea" group refers to the structure —NR$^X$—CO—NR$^Y$R$^Z$ and a "thiourea" group refers to the structure —NR$^X$—CS—NR$^Y$R$^Z$ when used terminally and —NR$^X$—CO—NR$^Y$— or —NR$^X$—CS—NR$^Y$— when used internally, wherein R$^X$, R$^Y$, and R$^Z$ have been defined above.

As used herein, a "guanidine" group refers to the structure —N=C(N(R$^X$R$^Y$))N(R$^X$R$^Y$) or —NR$^X$—C(=NR$^X$)NR$^X$R$^Y$ wherein R$^X$ and R$^Y$ have been defined above.

As used herein, the term "amidino" group refers to the structure —C=(NR$^X$)N(R$^X$R$^Y$) wherein R$^X$ and R have been defined above.

As used herein, the term "vicinal" generally refers to the placement of substituents on a group that includes two or more carbon atoms, wherein the substituents are attached to adjacent carbon atoms.

As used herein, the term "geminal" generally refers to the placement of substituents on a group that includes two or more carbon atoms, wherein the substituents are attached to the same carbon atom.

The terms "terminally" and "internally" refer to the location of a group within a substituent. A group is terminal when the group is present at the end of the substituent not further bonded to the rest of the chemical structure. Carboxyalkyl, i.e., R$^X$O(O)C-alkyl, is an example of a carboxy group used terminally.

A group is internal when the group is present in the middle of a substituent of the chemical structure.

Alkylcarboxy (e.g., alkyl-C(O)O— or alkyl-OC(O)—) and alkylcarboxyaryl (e.g., alkyl-C(O)O-aryl- or alkyl-O(CO)-aryl-) are examples of carboxy groups used internally.

As used herein, the terms "aliphatic chain" and "alkylene chain" are used interchangeably to refer to a branched or straight aliphatic group (e.g., alkyl groups, alkenyl groups, or alkynyl groups). A straight aliphatic chain has the structure —[CH$_2$]$_v$—, where v is 1-12. A branched aliphatic chain is a straight aliphatic chain that is substituted with one or more aliphatic groups. A branched aliphatic chain has the structure —[CQQ]$_v$- where Q is independently a hydrogen or an aliphatic group; however, Q shall be an aliphatic group in at least one instance. The term aliphatic chain includes alkyl chains, alkenyl chains, and alkynyl chains, where alkyl, alkenyl, and alkynyl are defined above.

The phrase "optionally substituted" is used herein interchangeably with the phrase "substituted or unsubstituted." As described herein, compounds of the disclosure can optionally be substituted with one or more substituents, such as are illustrated generally above, or as exemplified by particular classes, subclasses, and species of the disclosure. As described herein, the variables X, R$^A$, R$^1$, R$^2$, R$^3$, R$^4$, R$^5$, and R$^6$ and other variables contained in Formula described herein encompass specific groups, such as alkyl and aryl. Unless otherwise noted, each of the specific groups for the variables X, R$^A$, R$^1$, R$^2$, R$^3$, R$^4$, R$^5$, and R$^6$ and other variables contained therein can be optionally substituted with one or more substituents described herein.

Each substituent of a specific group is further optionally substituted with one to three of halo, cyano, oxo, alkoxy, hydroxy, amino, nitro, aryl, cycloaliphatic, heterocycloaliphatic, heteroaryl, haloalkyl, and alkyl.

For instance, an alkyl group can be substituted with alkylsulfanyl and the alkylsulfanyl can be optionally substituted with one to three of halo, cyano, oxo, alkoxy, hydroxy, amino, nitro, aryl, haloalkyl, and alkyl.

As an additional example, the cycloalkyl portion of a (cycloalkyl)carbonylamino can be optionally substituted with one to three of halo, cyano, alkoxy, hydroxy, nitro, haloalkyl, and alkyl. When two alkoxy groups are bound to the same atom or adjacent atoms, the two alkoxy groups can form a ring together with the atom(s) to which they are bound.

As used herein, the term "substituted," whether preceded by the term "optionally" or not, refers generally to the replacement of hydrogen atoms in a given structure with the radical of a specified substituent. Specific substituents are described above in the definitions and below in the description of compounds and examples thereof. Unless otherwise indicated, an optionally substituted group can have a substituent at each substitutable position of the group, and when more than one position in any given structure can be substituted with more than one substituent selected from a specified group, the substituent can be either the same or different at every position. A ring substituent, such as a heterocycloalkyl, can be bound to another ring, such as a cycloalkyl, to form a spiro-bicyclic ring system, e.g., both rings share one common atom. As one of ordinary skill in the art will recognize, combinations of substituents envisioned by this disclosure are those combinations that result in the formation of stable or chemically feasible compounds.

As used herein, the phrase "stable or chemically feasible" refers to compounds that are not substantially altered when subjected to conditions to allow for their production, detection, and preferably their recovery, purification, and use for one or more of the purposes disclosed herein. In some embodiments, a stable compound or chemically feasible compound is one that is not substantially altered when kept at a temperature of 40° C. or less, in the absence of moisture or other chemically reactive conditions, for at least a week.

As used herein, an "effective amount" is defined as the amount required to confer a therapeutic and/or prophylactic effect on the treated patient, and is typically determined based on age, surface area, weight, and condition of the patient. The interrelationship of dosages for animals and humans (based on milligrams per meter squared of body surface) is described by Freireich et al., Cancer Chemother. Rep., 50: 219 (1966). Body surface area may be approximately determined from height and weight of the patient. See, e.g., Scientific Tables, Geigy Pharmaceuticals, Ardsley, New York, 537 (1970). As used herein, "patient" refers to a mammal, including a human.

Unless otherwise stated, structures depicted herein also are meant to include all isomeric (e.g., enantiomeric, diastereomeric, and geometric (or conformational)) forms of the structure; for example, the R and S configurations for each asymmetric center, (Z) and (E) double bond isomers, and (Z) and (E) conformational isomers. Therefore, single stereochemical isomers as well as enantiomeric, diastereomeric, and geometric (or conformational) mixtures of the present compounds are within the scope of the disclosure.

Unless otherwise stated, all tautomeric forms of the compounds of the disclosure are within the scope of the disclosure. Additionally, unless otherwise stated, structures depicted herein also are meant to include compounds that differ only in the presence of one or more isotopically enriched atoms. For example, compounds having the present structures except for the replacement of hydrogen by deuterium or tritium, or the replacement of a carbon by a $^{13}$C- or $^{14}$C-enriched carbon are within the scope of this disclosure. Such compounds are useful, for example, as analytical tools or probes in biological assays, or as therapeutic agents.

Chemical structures and nomenclature are derived from ChemDraw, version 11.0.1, Cambridge, MA It is noted that the use of the descriptors "first," "second," "third," or the like is used to differentiate separate elements (e.g., solvents, reaction steps, processes, reagents, or the like) and may or may not refer to the relative order or relative chronology of the elements described.

Compounds

Described herein are compounds that inhibit CD73 activity. These compounds, and compositions comprising these compounds, are useful for the treatment of cancer, infections, and neurodegenerative diseases.

In some embodiments provided herein is a compound having the structure of Formula (I), or a pharmaceutically acceptable salt thereof:

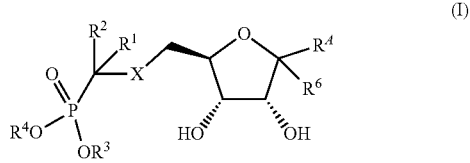

(I)

or a pharmaceutically acceptable salt thereof, wherein
X is —O—, —CH$_2$—, —S—, —S(O)$_2$—, or —NR'—;
R$^1$ is -L$^1$-R$^{10}$;
L$^1$ is a bond or an optionally substituted branched or straight C$_{1-6}$ alkylene chain, wherein up to two carbon atoms of L$^1$ are optionally and independently replaced by —NR'—, —S—, —O—, —OC(O)—, —C(O)O—, —C(O)—, —C(O)C(O)—, —C(O)NR'—, —NR'C(O)—, —NR'C(O)O—, —S(O)$_2$NR'—, —NR'S(O)$_2$—, —C(O)NR'NR'—, —NR'C(O)NR'—, —OC(O)NR'—, —NR'NR'—, —NR'S(O)$_2$NR'—, —S(O)— or —S(O)$_2$—;
R$^{10}$ is selected from R', halo, —CN, or —CF$_3$;
each R' is independently selected from —H, or an optionally substituted group selected from a C$_{1-6}$ alkyl, a C$_{2-6}$ alkenyl, a C$_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;
R$^2$ is -L$^2$-R$^{20}$;
L$^2$ is a bond or an optionally substituted branched or straight C$_{1-6}$ alkylene chain, wherein up to two carbon atoms of L$^2$ are optionally and independently replaced by —NR"—, —S—, —O—, —OC(O)—, —C(O)O—, —C(O)—, —C(O)C(O)—, —C(O)NR"—, —NR"C(O)—, —NR"C(O)O—, —S(O)$_2$NR"—, —NR"S(O)$_2$—, —C(O)NR"NR"—, —NR"C(O)NR"—, —OC(O)NR"—, —NR"NR"—, —NR"S(O)$_2$NR"—, —S(O)—, or —S(O)$_2$—;
R$^{20}$ is independently selected from R", halo, —CN, or —CF$_3$;
each R" is independently selected from —H, or an optionally substituted group selected from a C$_{1-6}$ alkyl, a C$_{2-6}$ alkenyl, a C$_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R" are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;

each of $R^3$ and $R^4$ is independently selected from —H, $C_{1-3}$ alkyl, or a 3-8-membered saturated, partially unsaturated, or fully unsaturated monocyclic ring having 0-4 heteroatoms independently selected from nitrogen, oxygen, or sulfur;

$R^A$ is

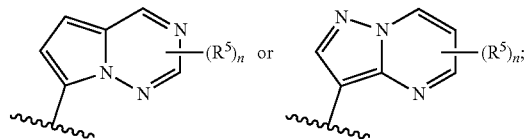

n is 1, 2, 3, or 4;

each $R^5$ is independently -$L^3$-$R^{30}$;

each $L^3$ is independently a bond or an optionally substituted branched or straight $C_{1-6}$ alkylene chain, wherein up to two carbon atoms of $L^3$ are optionally and independently replaced by —NR'''—, —S—, —O—, —OC(O)—, —C(O)O—, —C(O)—, —C(O)C(O)—, —C(O)NR'''—, —NR'''C(O)—, —NR'''C(O)O—, —S(O)$_2$NR'''—, —NR'''S(O)$_2$—, —C(O)NR'''NR'''—, —NR'''C(O)NR'''—, —OC(O)NR'''—, —NR'''NR'''—, —NR'''S(O)$_2$NR'''—, —S(O)—, or —S(O)$_2$—;

each $R^{30}$ is independently selected from R''', halo, —CN, or —CF$_3$;

each R''' is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R''' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur; and $R^6$ is —H, —CN, halo, or $C_{1-6}$ alkyl;

provided that when $R^1$ is —H, $R^2$ is other than —H.

In some embodiments of a compound of Formula (I), (Ia), or (Ib), $R^6$ is —H. In some embodiments of a compound of Formula (I), $R^6$ is $C_{1-6}$ alkyl.

In some embodiments of a compound of Formula (I), $R^A$ is

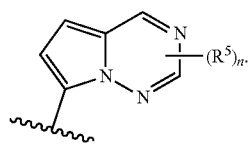

In some embodiments of a compound of Formula (I), $R^A$ is

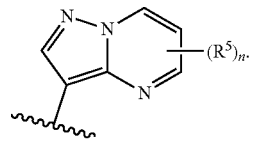

In some embodiments provided herein is a compound having the structure of Formula (Ia), or a pharmaceutically acceptable salt thereof.

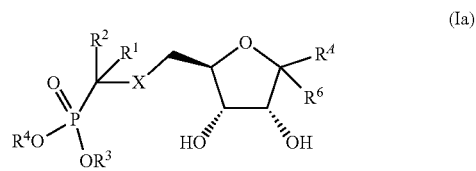

(Ia)

or a pharmaceutically acceptable salt thereof, wherein

X is —O—, —CH$_2$—, —S—, —S(O)$_2$—, or —NR'—;

$R^1$ is -$L^1$-$R^{10}$;

$L^1$ is a bond or an optionally substituted branched or straight $C_{1-6}$ alkylene chain, wherein up to two carbon atoms of $L^1$ are optionally and independently replaced by —NR'—, —S—, —O—, —OC(O)—, —C(O)O—, —C(O)—, —C(O)C(O)—, —C(O)NR'—, —NR'C(O)—, —NR'C(O)O—, —S(O)$_2$NR'—, —NR'S(O)$_2$—, —C(O)NR'NR'—, —NR'C(O)NR'—, —OC(O)NR'—, —NR'NR'—, —NR'S(O)$_2$NR'—, —S(O)—, or —S(O)$_2$—;

$R^{10}$ is selected from R', halo, —CN, or —CF$_3$;

each R' is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;

$R^2$ is -$L^2$-$R^{20}$;

$L^2$ is a bond or an optionally substituted branched or straight $C_{1-6}$ alkylene chain, wherein up to two carbon atoms of $L^2$ are optionally and independently replaced by —NR''—, —S—, —O—, —OC(O)—, —C(O)O—, —C(O)—, —C(O)C(O)—, —C(O)NR''—, —NR''C(O)—, —NR''C(O)O—, —S(O)$_2$NR''—, —NR''S(O)$_2$—, —C(O)NR''NR''—, —NR''C(O)NR''—, —OC(O)NR''—, —NR''NR''—, —NR''S(O)$_2$NR''—, —S(O)—, or —S(O)$_2$—;

$R^{20}$ is independently selected from R'', halo, —CN, or —CF$_3$;

each R'' is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R''' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;

each of $R^3$ and $R^4$ is independently selected from —H, $C_{1-3}$ alkyl, or a 3-8-membered saturated, partially unsaturated, or fully unsaturated monocyclic ring having 0-4 heteroatoms independently selected from nitrogen, oxygen, or sulfur;

$R^4$ is

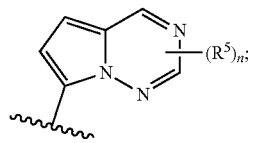

n is 1, 2, 3, or 4;

each $R^5$ is independently -$L^3$-$R^{30}$;

each $L^3$ is independently a bond or an optionally substituted branched or straight $C_{1-6}$ alkylene chain, wherein up to two carbon atoms of $L^3$ are optionally and independently replaced by —NR'''—, —S—, —O—, —OC(O)—, —C(O)O—, —C(O)—, —C(O)C(O)—, —C(O)NR'''—, —NR'''C(O)—, —NR'''C(O)O—, —S(O)$_2$NR'''—, —NR'''S(O)$_2$—, —C(O)NR'''NR'''—, —NR'''C(O)NR'''—, —OC(O)NR'''—, —NR'''NR'''—, —NR'''S(O)$_2$NR'''—, —S(O)—, or —S(O)$_2$—;

each $R^{30}$ is independently selected from R''', halo, —CN, or —CF$_3$;

each R''' is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R''' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur; and $R^6$ is —H, —CN, halo, or $C_{1-6}$ alkyl;

provided that when $R^1$ is —H, $R^2$ is other than —H.

In some embodiments provided herein is a compound having the structure of Formula (Ia), or a pharmaceutically acceptable salt thereof:

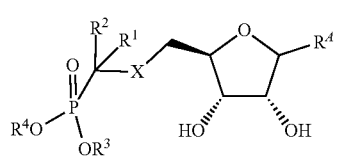

(Ia)

or a pharmaceutically acceptable salt thereof, wherein

X is —O—, —CH$_2$—, —S—, —S(O)$_2$—, or —NR'—;

$R^1$ is -$L^1$-$R^{10}$;

$L^1$ is a bond or an optionally substituted branched or straight $C_{1-6}$ alkylene chain, wherein up to two carbon atoms of $L^1$ are optionally and independently replaced by —NR'—, —S—, —O—, —OC(O)—, —C(O)O—, —C(O)—, —C(O)C(O)—, —C(O)NR'—, —NR'C(O)—, —NR'C(O)O—, —S(O)$_2$NR'—, —NR'S(O)$_2$—, —C(O)NR'NR'—, —NR'C(O)NR'—, —OC(O)NR'—, —NR'NR'—, —NR'S(O)$_2$NR'—, —S(O)— or —S(O)$_2$—;

$R^{10}$ is selected from R', halo, —CN, or —CF$_3$;

each R' is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;

$R^2$ is -$L^2$-$R^{20}$;

$L^2$ is a bond or an optionally substituted branched or straight $C_{1-6}$ alkylene chain, wherein up to two carbon atoms of $L^2$ are optionally and independently replaced by —NR''—, —S—, —O—, —OC(O)—, —C(O)O—, —C(O)—, —C(O)C(O)—, —C(O)NR''—, —NR''C(O)—, —NR''C(O)O—, —S(O)$_2$NR''—, —NR''S(O)$_2$—, —C(O)NR''NR''—, —NR''C(O)NR''—, —OC(O)NR''—, —NR''NR''—, —NR''S(O)$_2$NR''—, —S(O)—, or —S(O)$_2$—;

$R^{20}$ is independently selected from R'', halo, —CN, or —CF$_3$;

each R'' is independently selected from —H or an optionally substituted group selected from a $C_{1-6}$ alkyl, a $C_{2-6}$ alkenyl, or a $C_{2-6}$ alkynyl;

each of $R^3$ and $R^4$ is independently selected from —H, $C_{1-3}$ alkyl, or a 3-8-membered saturated, partially unsaturated, or fully unsaturated monocyclic ring having 0-4 heteroatoms independently selected from nitrogen, oxygen, or sulfur;

$R^4$ is

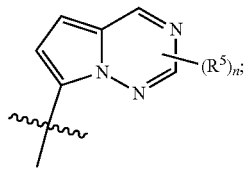

n is 1, 2, 3, or 4;

each $R^5$ is independently -$L^3$-$R^{30}$;

each $L^3$ is independently a bond or an optionally substituted branched or straight $C_{1-6}$ alkylene chain, wherein up to two carbon atoms of $L^3$ are optionally and independently replaced by —NR'''—, —S—, —O—, —OC(O)—, —C(O)O—, —C(O)—, —C(O)C(O)—, —C(O)NR'''—, —NR'''C(O)—, —NR'''C(O)O—, —S(O)$_2$NR'''—, —NR'''S(O)$_2$—, —C(O)NR'''NR'''—, —NR'''C(O)NR'''—, —OC(O)NR'''—, —NR'''NR'''—, —NR'''S(O)$_2$NR'''—, —S(O)—, or —S(O)$_2$—;

each $R^{30}$ is independently selected from R''', halo, —CN, or —CF$_3$; and each R'" is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R'" are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur, provided that when $R^1$ is —H, $R^2$ is other than —H.

In some embodiments provided herein is a compound having the structure of Formula (Ib), or a pharmaceutically acceptable salt thereof:

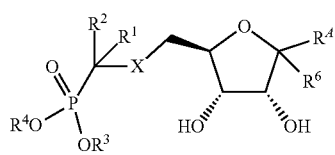

(Ib)

or a pharmaceutically acceptable salt thereof, wherein
X is —O—, —$CH_2$—, —S—, —$S(O)_2$—, or —NR'—;
$R^1$ is -$L^1$-$R^{10}$;
$L^1$ is a bond or an optionally substituted branched or straight $C_{1-6}$ alkylene chain, wherein up to two carbon atoms of $L^1$ are optionally and independently replaced by —NR'—, —S—, —O—, —OC(O)—, —C(O)O—, —C(O)—, —C(O)C(O)—, —C(O)NR'—, —NR'C(O)—, —NR'C(O)O—, —$S(O)_2$NR'—, —NR'$S(O)_2$—, —C(O)NR'NR'—, —NR'C(O)NR'—, —OC(O)NR'—, —NR'NR'—, —NR'S$(O)_2$NR'—, —S(O)—, or —$S(O)_2$—;
$R^{10}$ is selected from R', halo, —CN, or —$CF_3$;
each R' is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;
$R^2$ is -$L^2$-$R^{20}$;
$L^2$ is a bond or an optionally substituted branched or straight $C_{1-6}$ alkylene chain, wherein up to two carbon atoms of $L^2$ are optionally and independently replaced by —NR"—, —S—, —O—, —OC(O)—, —C(O)O—, —C(O)—, —C(O)C(O)—, —C(O)NR"—, —NR"C(O)—, —NR"C(O)O—, —$S(O)_2$NR"—, —NR"$S(O)_2$—, —C(O)NR"NR"—, —NR"C(O)NR"—, —OC(O)NR"—, —NR"NR"—, —NR"S$(O)_2$NR"—, —S(O)—, or —$S(O)_2$—;
$R^{20}$ is independently selected from R", halo, —CN, or —$CF_3$;

each R" is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R" are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur;
each of $R^3$ and $R^4$ is independently selected from —H, $C_{1-3}$ alkyl, or a 3-8-membered saturated, partially unsaturated, or fully unsaturated monocyclic ring having 0-4 heteroatoms independently selected from nitrogen, oxygen, or sulfur;
$R^A$ is

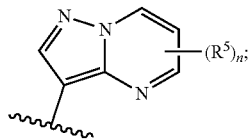

n is 1, 2, 3, or 4;
each $R^5$ is independently -$L^3$-$R^{30}$;
each $L^3$ is independently a bond or an optionally substituted branched or straight $C_{1-6}$ alkylene chain, wherein up to two carbon atoms of $L^3$ are optionally and independently replaced by —NR'"—, —S—, —O—, —OC(O)—, —C(O)O—, —C(O)—, —C(O)C(O)—, —C(O)NR'"—, —NR'"C(O)—, —NR'"C(O)O—, —$S(O)_2$NR'"—, —NR'"$S(O)_2$—, —C(O)NR'"NR'"—, —NR'"C(O)NR'"—, —OC(O)NR'"—, —NR'"NR'"—, —NR'"S$(O)_2$NR'"—, —S(O)—, or —$S(O)_2$—;
each $R^{30}$ is independently selected from R'", halo, —CN, or —$CF_3$;
each R'" is independently selected from —H, or an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, or sulfur, or an 8-12 membered saturated, partially unsaturated, or fully unsaturated bicyclic ring system having 0-5 heteroatoms independently selected from nitrogen, oxygen, or sulfur; or two occurrences of R'" are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, or sulfur; and
$R^6$ is —H, —CN, halo, or $C_{1-6}$ alkyl.

In some embodiments of a compound of Formula (I), (Ia), or (Ib), X is —O—, —$CH_2$—, or —S—. For example, X is —O—. In other examples, X is —$CH_2$— or —S—.

In some embodiments of a compound of Formula (I), (Ia), or (Ib), $R^1$ is -$L^1$-$R^{10}$; $L^1$ is an optionally substituted branched or straight $C_{1-4}$ alkylene (or aliphatic) chain, wherein one or two carbon atoms of $L^1$ is optionally and independently replaced by —NR'—, —S—, —O—, —OC(O)—, —C(O)O—, —C(O)—, —C(O)C(O)—, —C(O)NR'—, or —NR'C(O)—; $R^{10}$ is R'; and each R' is independently selected from —H, or an optionally substituted group selected from a $C_{1-3}$ alkyl or a 3-8-membered saturated, partially unsaturated, or fully unsaturated monocyclic ring having 0-4 heteroatoms independently selected from nitrogen, oxygen, or sulfur.

In some embodiments of a compound of Formula (I), (Ia), or (Ib), $R^1$ is -$L^1$-$R^{10}$; $L^1$ is an optionally substituted branched or straight $C_{1-4}$ alkylene (or aliphatic) chain, wherein one carbon atom of $L^1$ is optionally and independently replaced by —NR'—, —S—, —O—, —OC(O)—, —C(O)O—, —C(O)—, —C(O)C(O)—, —C(O)NR'—, or —NR'C(O)—; $R^{10}$ is R'; and each R' is independently selected from —H, or an optionally substituted group selected from a $C_{1-3}$ alkyl or a 3-8-membered saturated, partially unsaturated, or fully unsaturated monocyclic ring having 0-4 heteroatoms independently selected from nitrogen, oxygen, or sulfur.

In some embodiments of a compound of Formula (I), (Ia), or (Ib), $R^1$ is -$L^1$-$R^{10}$; $L^1$ is an optionally substituted branched or straight $C_{1-4}$ alkylene chain, wherein one or two carbon atoms of $L^1$ is optionally and independently replaced by —O—, —OC(O)—, —C(O)O—, or —C(O)—; and $R^{10}$ is independently selected from —H, —CH$_3$, —CH$_2$CH$_3$, or an optionally substituted group selected from

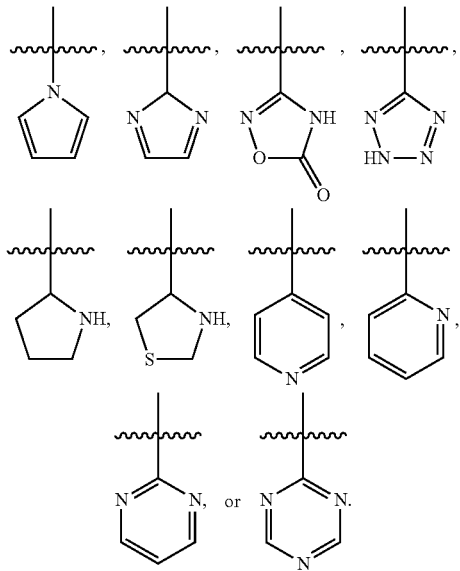

In some embodiments of a compound of Formula (I), (Ia), or (Ib), $R^1$ is -$L^1$-$R^{10}$; $L^1$ is an optionally substituted branched or straight $C_{1-4}$ alkylene chain, wherein one carbon atom of $L^1$ is optionally and independently replaced by —O—, —OC(O)—, —C(O)O—, or —C(O)—; and $R^{10}$ is independently selected from —H, —CH$_3$, —CH$_2$CH$_3$, or an optionally substituted group selected from

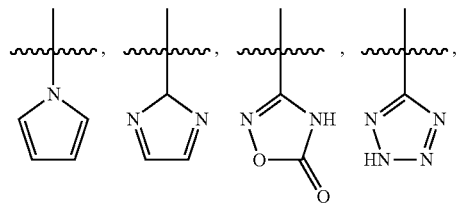

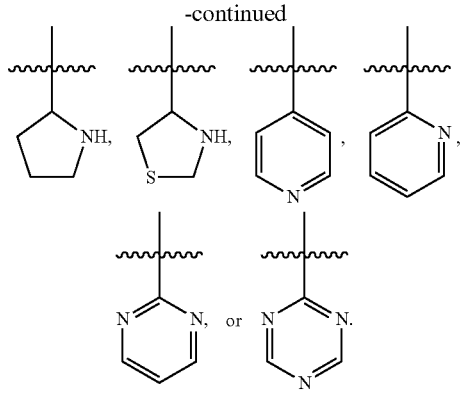

In some embodiments of a compound of Formula (I), (Ia), or (Ib), $R^1$ is -$L^1$-$R^{10}$; $L^1$ is an optionally substituted branched or straight $C_{1-3}$ alkylene chain, wherein one carbon atom of L is optionally and independently replaced by —O—, —OC(O)—, —C(O)O—, or —C(O)—; and $R^{10}$ is —H or

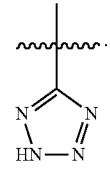

In some embodiments of a compound of Formula (I), (Ia), or (Ib), $R^1$ is —H, —CH$_3$, —CH$_2$—OH, —CH$_2$—CH$_3$, —CH$_2$—O—CH$_3$, —CH$_2$C(O)OH, —CH$_2$—O—CH$_2$—C(O)OH, —CH$_2$—O—CH$_2$—C(O)CH$_3$, —C(O)OH,

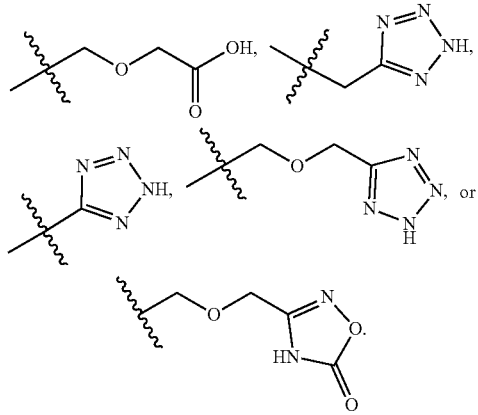

In some embodiments of a compound of Formula (I), (Ia), or (Ib), $R^1$ is —H, —CH$_3$, —CH$_2$—OH, —CH$_2$—O—CH$_3$, —CH$_2$C(O)OH, —C(O)OH,

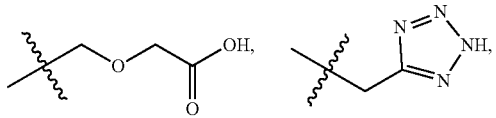

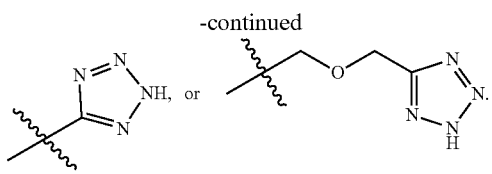
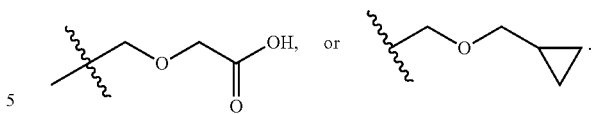

In some embodiments of a compound of Formula (I), R² is -L²-R²⁰; L² is an optionally substituted branched or straight C₁₋₄ alkylene (or aliphatic) chain, wherein one carbon atom of L is optionally and independently replaced by —NR'—, —S—, —O—, —OC(O)—, —C(O)O—, —C(O)—, —C(O)C(O)—, —C(O)NR'—, or —NR'C(O)—; R²⁰ is R"; and each R" is independently selected from —H, or an optionally substituted group selected from a C₁₋₃ alkyl or a 3-8-membered saturated, partially unsaturated, or fully unsaturated monocyclic ring having 0-4 heteroatoms independently selected from nitrogen, oxygen, or sulfur.

In some embodiments of a compound of Formula (I), (Ia), or (Ib), R² is -L²-R²⁰; L² is an optionally substituted branched or straight C₁₋₄ alkylene (or aliphatic) chain, wherein one carbon atom of L² is optionally replaced by —NR"—, —O—, —OC(O)—, —C(O)O—, —C(O)—, —C(O)NR"—, or —NR"C(O)—; R²⁰ is R"; and each R" is independently selected from —H, an optionally substituted C₁₋₃ alkyl, or an optionally substituted 5-membered heteroaryl.

In some embodiments of a compound of Formula (I), (Ia), or (Ib), R² is -L²-R²⁰; L² is an optionally substituted branched or straight C₁₋₄ alkylene (or aliphatic) chain, wherein one carbon atom of L² is optionally replaced by —NR"—, —O—, —OC(O)—, —C(O)O—, —C(O)—, —C(O)NR"—, or —NR"C(O)—; R²⁰ is R"; and each R" is independently selected from —H or an optionally substituted C₁₋₃ alkyl.

In some embodiments of a compound of Formula (I), (Ia), or (Ib), R² is -L²-R²⁰; L² is an optionally substituted branched or straight C₁₋₄ alkylene chain, wherein one carbon atom of L² is optionally replaced by —O—, —OC(O)—, —C(O)O—, or —C(O)—; and R²⁰ is —H, an optionally substituted C₁₋₃ alkyl, or an optionally substituted 5-membered heteroaryl.

In some embodiments of a compound of Formula (I), (Ia), or (Ib), R² is -L²-R²⁰; L² is an optionally substituted branched or straight C₁₋₄ alkylene chain, wherein one carbon atom of L² is optionally replaced by —O—, —OC(O)—, —C(O)O—, or —C(O)—; and R²⁰ is —H or an optionally substituted C₁₋₃ alkyl.

In some embodiments of a compound of Formula (I), R² is —H, —CH₃, —CH₂—OH, —CH₂—O—CH₃, —CH₂C(O)OH, —C(O)OH,

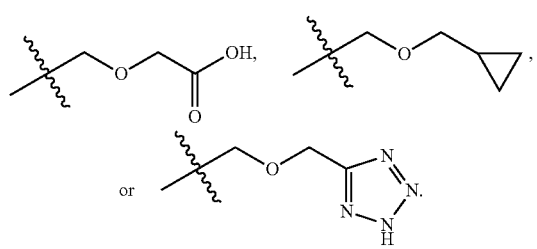

In some embodiments of a compound of Formula (I), (Ia), or (Ib), R² is —H, —CH₃, —CH₂—OH, —CH₂—O—CH₃, —CH₂C(O)OH, —C(O)OH, or

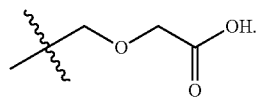 [SMILES: *COCC(=O)O]

In some embodiments of a compound of Formula (I), (Ia), or (Ib), R² is —H, —CH₃, —CH₂—OH, —CH₂—O—CH₃, —CH₂C(O)OH, —C(O)OH, or In some embodiments of a compound of Formula (I), (Ia), or (Ib), each of R³ and R⁴ is independently selected from —H, or C₁₋₃ alkyl. For example, each of R³ and R⁴ is independently selected from —H, methyl, ethyl, or propyl, or isopropyl. In other examples, each of R³ and R⁴ is independently selected from —H, methyl or ethyl.

In some embodiments of a compound of Formula (I), (Ia), or (Ib), each of R³ and R⁴ is —H.

In some embodiments of a compound of Formula (I), (Ia), or (Ib), n is 1, 2, or 3. In other embodiments of a compound of Formula (I), (Ia), or (Ib), n is 1 or 2, and each R is independently -L³-R³⁰; each L³ is independently a bond or an optionally substituted branched or straight C₁₋₆ alkylene chain, wherein up to two carbon atoms of L³ are optionally and independently replaced by —NR'"—, —S—, —O—, —OC(O)—, —C(O)O—, —C(O)—, —C(O)NR'"—, —NR'"C(O)—, —S(O)—, or —S(O)₂—; each R³⁰ is R'" or halo; and each R'" is independently selected from —H, or an optionally substituted group selected from a C₁₋₆ alkyl, a 3-8-membered saturated, partially unsaturated, or fully unsaturated monocyclic ring having 0-4 heteroatoms independently selected from nitrogen, oxygen, or sulfur.

In some embodiments of a compound of Formula (I), (Ia), or (Ib), n is 2 and at least one occurrence of R is halo. For example, n is 2 and one occurrence of R⁵ is —Cl, —Br, —Cl, —F, or —I. In other examples, n is 2 and at least one occurrence of R is —Br, —Cl, or —F.

In some embodiments of a compound of Formula (I), (Ia), or (Ib), n is 2, one occurrence of R⁵ is halo, and a second occurrence of R is -L³-R³⁰; wherein L³ is independently a bond or an optionally substituted branched or straight C₁₋₄ alkylene chain, wherein one carbon atom of L³ is optionally and independently replaced by —NR'"—, —S—, or —O—; R³⁰ is R'"; and each R'" is independently selected from —H, or an optionally substituted group selected from a C₁₋₃ alkyl, or a 4-6-membered saturated, partially unsaturated, or fully unsaturated carbocycle.

In some embodiments of a compound of Formula (I), (Ia), or (Ib), n is 2, one occurrence of R⁵ is —Cl, —Br, or —F, and the second occurrence of R is -L³-R³⁰; wherein L³ is independently a bond or an optionally substituted branched or straight C₁₋₃ alkylene chain, wherein one carbon atom of L³ is optionally and independently replaced by —NR'"—; R³⁰ is R'"; and each R'" is independently selected from —H, or an optionally substituted group selected from a C₁₋₃ alkyl, or a 4-6-membered saturated, partially unsaturated, or fully unsaturated carbocycle. For example, n is 2, one occurrence of R is —Cl, —Br, or —F, and the second occurrence of R is -L³-R³⁰; wherein L³ is independently a bond or an optionally substituted branched or straight C₁₋₃ alkylene chain (e.g., —CH$_2$—, or —CH$_2$—CH$_2$—), wherein one carbon atom of L$^3$ is optionally and independently replaced by —NR'''—; R$^{30}$ is R'''; and each R''' is independently selected from —H, or an optionally substituted group selected from a C$_{1-3}$ alkyl (e.g., methyl, ethyl, propyl, or isopropyl), or an optionally substituted cycloalkyl selected from

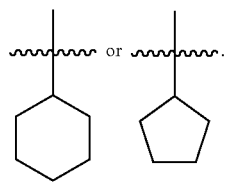

In some embodiments of a compound of Formula (I) or (Ia), R$^4$ is

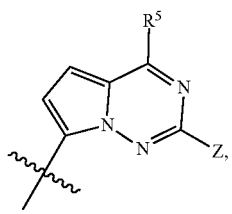

wherein Z is halo, and R$^5$ is -L$^3$-R$^{30}$; wherein L$^3$ is independently a bond or an optionally substituted branched or straight C$_{1-4}$ alkylene (or aliphatic) chain, wherein one carbon atom of L$^3$ is optionally and independently replaced by —NR'''—, —S—, or —O—; R$^{30}$ is R'''; and each R''' is independently selected from —H, or an optionally substituted group selected from a C$_{1-3}$ alkyl, a 4-6-membered saturated, partially unsaturated, or fully unsaturated carbocycle, or a 8-12 membered saturated, partially unsaturated, or fully unsaturated bicyclic carbocycle.

In some embodiments of a compound of Formula (I) or (Ia), R$^4$ is

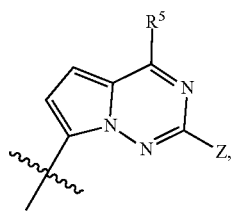

wherein Z is halo, and R is -L$^3$-R$^{30}$; wherein L$^3$ is independently a bond or an optionally substituted branched or straight C$_{1-4}$ alkylene (or aliphatic) chain, wherein one carbon atom of L$^3$ is optionally and independently replaced by —NR'''—, —S—, or —O—; R$^{30}$ is R'''; and each R''' is independently selected from —H, or an optionally substituted group selected from a C$_{1-3}$ alkyl, or a 4-6-membered saturated, partially unsaturated, or fully unsaturated carbocycle.

In some embodiments of a compound of Formula (I) or (Ia), R$^4$ is

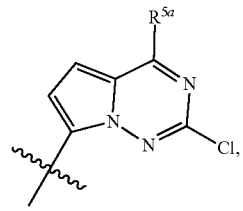

and R$^{5a}$ is —H, —CH$_3$,

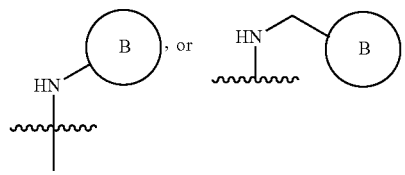

wherein ring B is

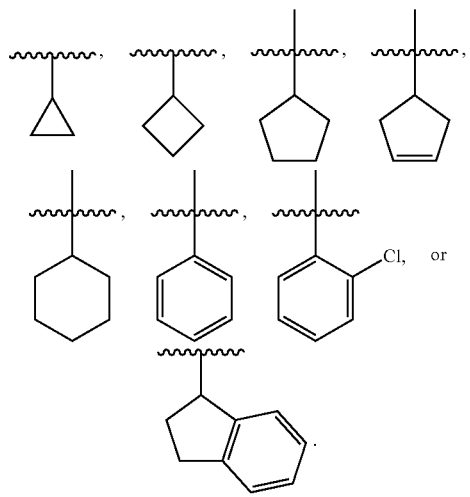

In some embodiments of a compound of Formula (I) or (Ia), R$^4$ is

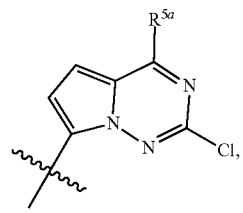

and $R^{5a}$ is —H, —CH$_3$, or

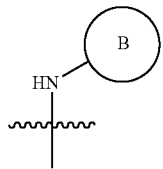

wherein ring B is

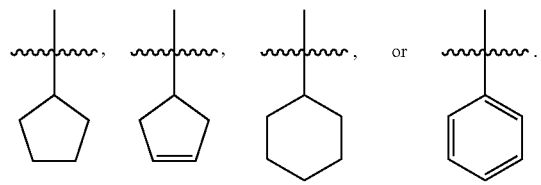

In some embodiments of a compound of Formula (I) or (Ia), $R^A$ is

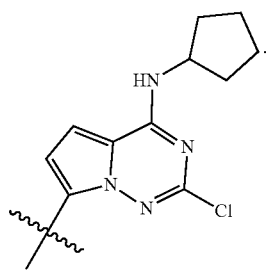 [SMILES: *c1ccc2c(NC3CCCC3)nc(Cl)nn12]

In some embodiments of a compound of Formula (I) or (Ib), $R^A$ is

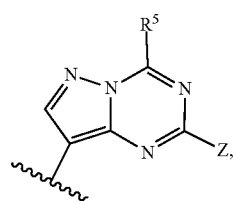

wherein Z is halo, and $R^5$ is -L$^3$-R$^{30}$; wherein L$^3$ is independently a bond or an optionally substituted branched or straight C$_{1-4}$ alkylene (or aliphatic) chain, wherein one carbon atom of L$^3$ is optionally and independently replaced by —NR'''—, —S—, or —O—; R$^{30}$ is R'''; and each R''' is independently selected from —H, or an optionally substituted group selected from a C$_{1-3}$ alkyl, a 4-6-membered saturated, partially unsaturated, or fully unsaturated carbocycle, or a 8-12 membered saturated, partially unsaturated, or fully unsaturated bicyclic carbocycle.

In some embodiments of a compound of Formula (I) or (Ib), $R^A$ is

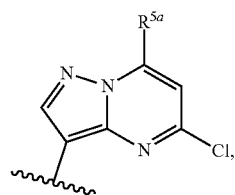

and $R^{5a}$ is —H, —CH$_3$,

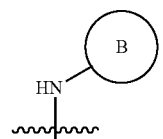, or 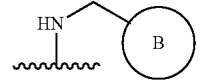

wherein ring B is

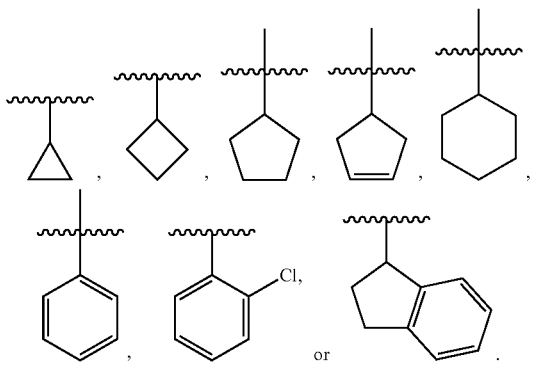

In some embodiments of a compound of Formula (I) or (Ib), $R^A$ is

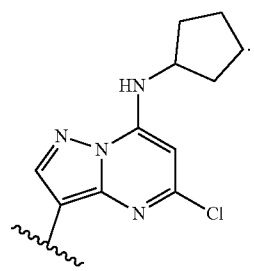 [SMILES: *c1cnn2c(NC3CCCC3)cc(Cl)nc12]

Some embodiments provide a compound having the structure of Formula (Ia-1) or (Ia-2)

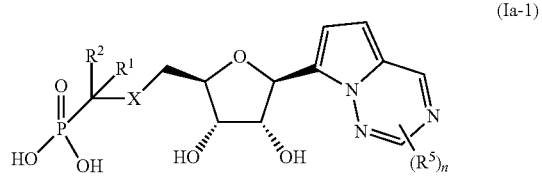

(Ia-1)

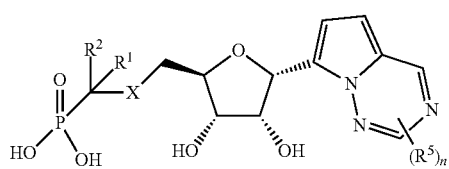

(Ia-2)

or a pharmaceutically acceptable salt thereof, wherein each of $R^1$, $R^2$, $R^5$, X, and n are defined above for the compound of Formula (I) and (Ia).

Some embodiments provide a compound having the structure of Formula Ia-3) or Ia-4):

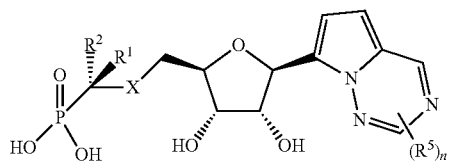

(Ia-3)

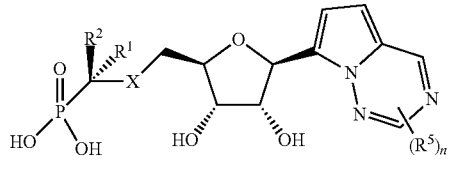

(Ia-4)

or a pharmaceutically acceptable salt thereof, wherein each of $R^1$, $R^2$, $R^5$, X, and n are defined above for the compound of Formula (I) and (Ia).

Some embodiments provide a compound having the structure of Formula Ia-5) or Ia-6):

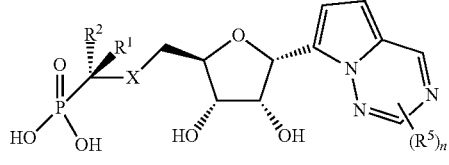

(Ia-5)

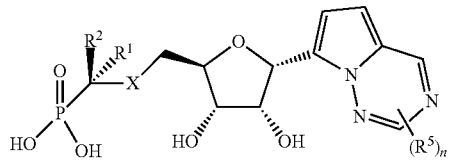

(Ia-6)

or a pharmaceutically acceptable salt thereof, wherein each of $R^1$, $R^2$, $R^5$, X, and n are defined above for the compound of Formula (I) and (Ia).

Some embodiments provide a compound having the structure of Formula (Ia-7):

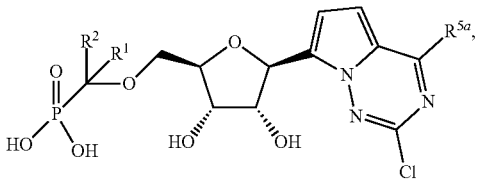

(Ia-7)

or a pharmaceutically acceptable salt thereof, wherein each of R and $R^2$ is defined above for the compound of Formula (I) or (Ia), and $R^{5a}$ is —H, —CH$_3$,

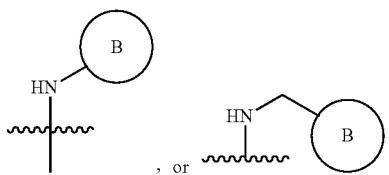

, or wherein ring B is

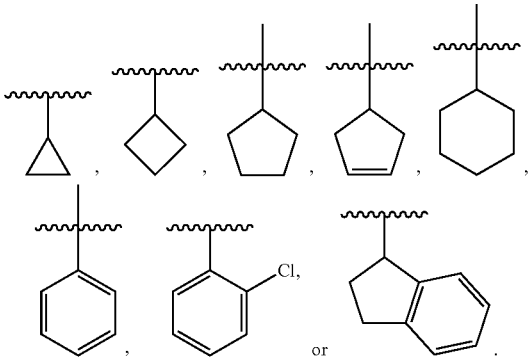

Some embodiments provide a compound having the structure of Formula (Ia-7):

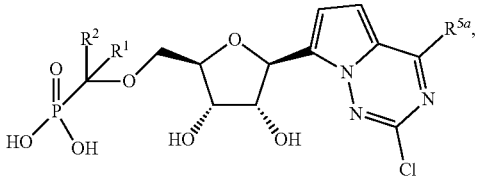

(Ia-7)

or a pharmaceutically acceptable salt thereof, wherein each of R and $R^2$ is defined above for the compound of Formula (I) or (Ia), and $R^{5a}$ is —H, —CH$_3$, or

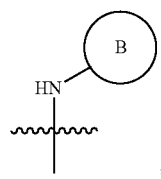

wherein ring B is

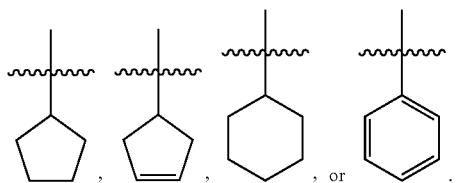

Some embodiments provide a compound having the structure of Formula (Ia-8) or (Ia-9):

(Ia-8)

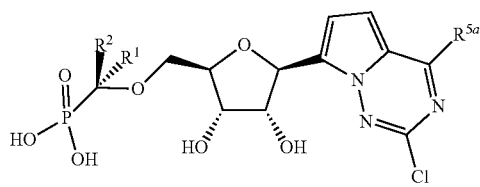

(Ia-9)

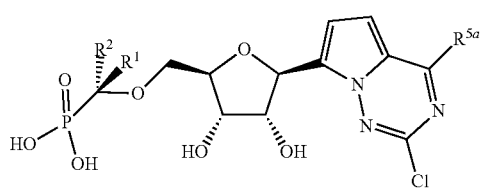

or a pharmaceutically acceptable salt thereof, wherein each of $R^1$ and $R^2$ are defined above for the compound of Formula (I) or (Ia), and $R^{5a}$ is defined above for the compound of Formula (Ia-7).

Some embodiments provide a compound having the structure of Formula (Ia-10) or (Ia-11):

(Ia-10)

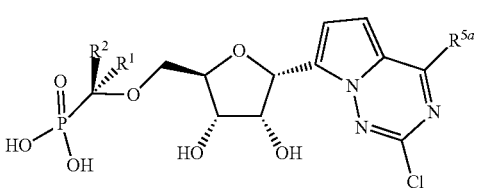

(Ia-11)

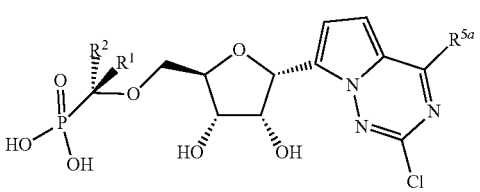

or a pharmaceutically acceptable salt thereof, wherein each of R and $R^2$ are defined above for the compound of Formula (I) or (Ia), and $R^{5a}$ is defined above for the compound of Formula (Ia-7).

Some embodiments provide a compound having the structure of Formula (Ib-1) or (Ib-2)

(Ib-1)

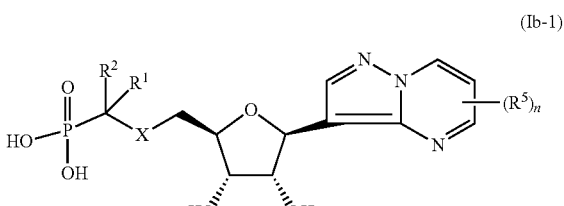

(Ib-2)

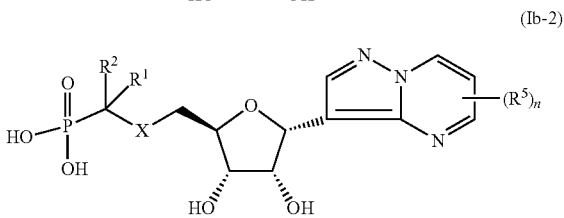

or a pharmaceutically acceptable salt thereof, wherein each of $R^1$, $R^2$, $R^5$, X, and n are defined above for the compound of Formula (I) and (Ib).

Some embodiments provide a compound having the structure of Formula (Ib-3) or (Ib-4):

(Ib-3)

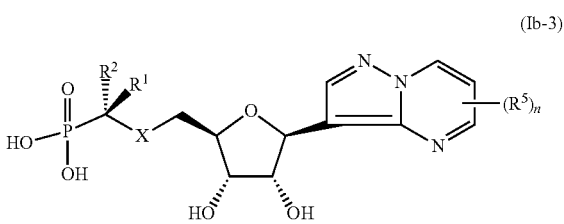

(Ib-4)

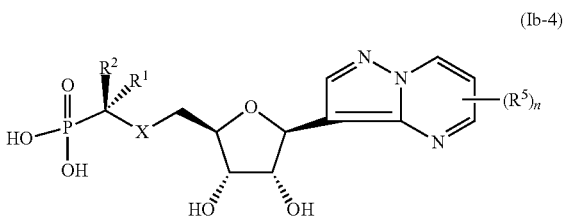

or a pharmaceutically acceptable salt thereof, wherein each of $R^1$, $R^2$, $R^5$, X, and n are defined above for the compound of Formula (I) and (Ib).

Some embodiments provide a compound having the structure of Formula (Ib-5) or (Ib-6):

(Ib-5)

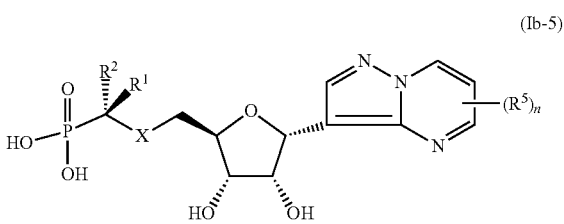

-continued (Ib-6)

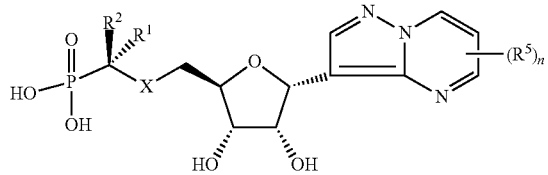

or a pharmaceutically acceptable salt thereof, wherein each of $R^1$, $R^2$, $R^5$, X, and n are defined above for the compound of Formula (I) and (Ib).

Some embodiments provide a compound having the structure of Formula (Ib-7):

(Ib-7)

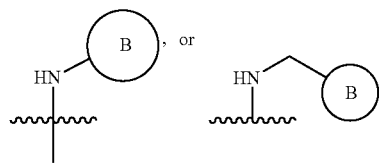

or a pharmaceutically acceptable salt thereof, wherein each of R and $R^2$ is defined above for the compound of Formula (I) or (Ib), and $R^{5a}$ is —H, —CH$_3$,

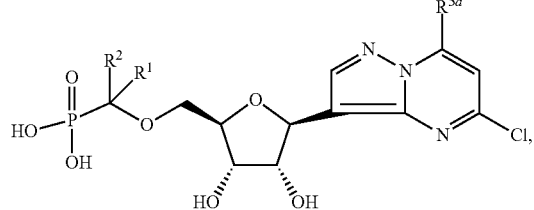, or

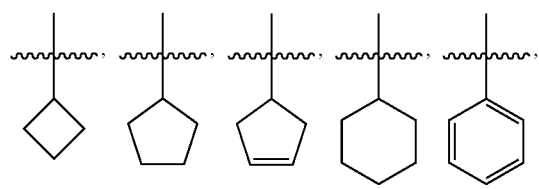

wherein ring B is

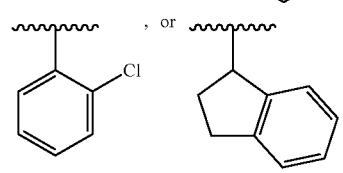

Some embodiments provide a compound having the structure of Formula (Ib-8) or (Ib-9):

(Ib-8)

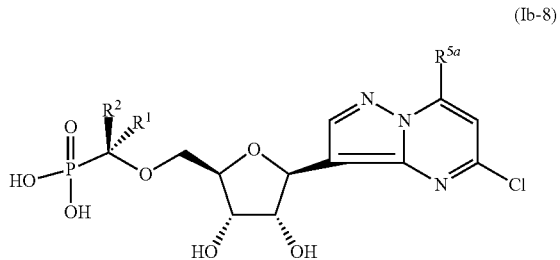

(Ib-9)

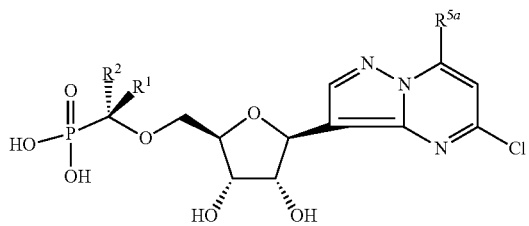

or a pharmaceutically acceptable salt thereof, wherein each of $R^1$ and $R^2$ are defined above for the compound of Formula (I) or (Ib), and $R^{5a}$ is defined above for the compound of Formula (Ib-7).

Some embodiments provide a compound having the structure of Formula (Ib-10) or (Ib-11):

(Ib-10)

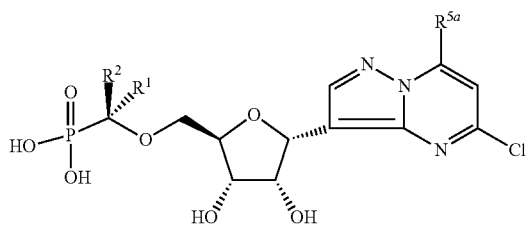

(Ib-11)

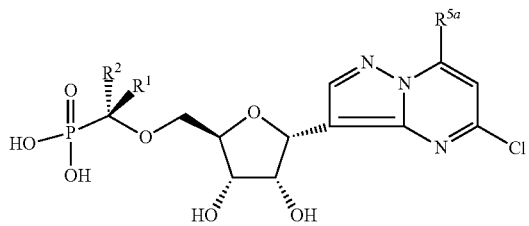

or a pharmaceutically acceptable salt thereof, wherein each of $R^1$ and $R^2$ are defined above for the compound of Formula (I) or (Ib), and $R^{5a}$ is defined above for the compound of Formula (Ib-7).

Some embodiments provide a compound as described in Table 1, or a pharmaceutically acceptable salt thereof.

TABLE 1

Example compounds of the present disclosure.

| Ex. | Structure | Name |
|---|---|---|
| 1 | | ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxy-3-(2H-tetrazol-5-yl)propan-2-yl)phosphonic acid |
| 2 | | ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxy-3-(2H-tetrazol-5-yl)propan-2-yl)phosphonic acid |
| 3 | | ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxy-3-(2H-tetrazol-5-yl)propan-2-yl)phosphonic acid |
| 4 | | ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxy-3-(2H-tetrazol-5-yl)propan-2-yl)phosphonic acid |
| 6 | | ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxy-3-methoxypropan-2-yl)phosphonic acid |

TABLE 1-continued

Example compounds of the present disclosure.

| Ex. | Structure | Name |
|---|---|---|
| 7 | | ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxy-3-methoxypropan-2-yl)phosphonic acid |
| 8 | | 2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxy-2-phosphonopropanoic acid |
| 9 | | ((S)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxypropan-2-yl)phosphonic acid |
| 10 | | ((R)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxypropan-2-yl)phosphonic acid |
| 11 | | (2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1,3-dihydroxypropan-2-yl)phosphonic acid |

TABLE 1-continued

Example compounds of the present disclosure.

| Ex. | Structure | Name |
|---|---|---|
| 13 | | (1-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-2-hydroxyethyl)phosphonic acid |
| 14 | | (1-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-2-methoxyethyl)phosphonic acid |
| 15 | | ((S)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxypropan-2-yl)phosphonic acid |
| 16 | | ((R)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxypropan-2-yl)phosphonic acid |
| 17 | | (2-(((2R,3S,4R,5S)-5-(5-chloro-7-(cyclopentylamino)pyrazolo[1,5-a]pyrimidin-3-yl)-3,4-dihydroxytetrahydrofuran-2-yl)methoxy)-1,3-dihydroxypropan-2-yl)phosphonic acid |

TABLE 1-continued

Example compounds of the present disclosure.

| Ex. | Structure | Name |
|---|---|---|
| 18 | | (2-(((2R,3S,4R,5R)-5-(5-chloro-7-(cyclopentylamino)pyrazolo[1,5-a]pyrimidin-3-yl)-3,4-dihydroxytetrahydrofuran-2-yl)methoxy)-1,3-dihydroxypropan-2-yl)phosphonic acid |
| 19 | | (2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxypropan-2-yl)phosphonic acid |
| 20 | | (1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxypropan-2-yl)phosphonic acid |
| 21 | | (2-(((2R,3S,4R,5S)-5-(4-(cyclopentylamino)-2-hydroxymethyl)pyrrolo[2,1-f][1,2,4]triazin-7-yl)-3,4-dihydroxytetrahydrofuran-2-yl)methoxy)-1-hydroxy-3-(2H-tetrazol-5-yl)propan-2-yl)phosphonic acid |

TABLE 1-continued

Example compounds of the present disclosure.

| Ex. | Structure | Name |
|---|---|---|
| 22 | | (2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxypropan-2-yl)phosphonic acid |
| 23 | | 2-(2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxy-2-phosphonopropoxy)acetic acid |
| 24 | | (2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-(2-ethoxy-2-oxoethoxy)-3-hydroxypropan-2-yl)phosphonic acid |
| 25 | | 2-((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxy-2-phosphonopropoxy)acetic acid |

TABLE 1-continued

Example compounds of the present disclosure.

| Ex. | Structure | Name |
|---|---|---|
| 26 | | ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-(2-ethoxy-2-oxoethoxy)-3-methoxypropan-2-yl)phosphonic acid |
| 27 | | (2-(((2R,3S,4R,5S)-5-(2-chloro-4-((2-chlorobenzyl)amino)pyrrolo[2,1-f][1,2,4]triazin-7-yl)-3,4-dihydroxytetrahydrofuran-2-yl)methoxy)-1,3-dihydroxypropan-2-yl)phosphonic acid |
| 28 | | (1,3-bis((1H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)propan-2-yl)phosphonic acid |
| 29 | | (1-(((1H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxy-5-methyltetrahydrofuran-2-yl)methoxy)-3-hydroxypropan-2-yl)phosphonic acid |

TABLE 1-continued

Example compounds of the present disclosure.

| Ex. | Structure | Name |
|---|---|---|
| 30 | | (2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1,3-dimethoxypropan-2-yl)phosphonic acid |
| 31 | | ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxypropan-2-yl)phosphonic acid |
| 32 | | ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxypropan-2-yl)phosphonic acid |
| 33 | | ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxypropan-2-yl)phosphonic acid |
| 34 | | ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxypropan-2-yl)phosphonic acid |

TABLE 1-continued

Example compounds of the present disclosure.

| Ex. | Structure | Name |
|---|---|---|
| 35 | | ((S)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-(cyclopropylmethoxy)propan-2-yl)phosphonic acid |
| 36 | | ((R)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxy-5-methyltetrahydrofuran-2-yl)methoxy)-3-hydroxypropan-2-yl)phosphonic acid |
| 37 | | ((S)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxy-5-methyltetrahydrofuran-2-yl)methoxy)-3-hydroxypropan-2-yl)phosphonic acid |
| 38 | | (1-((1H-tetrazol-5-yl)methoxy)-2-(((2R,3S,4R,5S)-5-(5-chloro-7-cyclopentylamino)pyrazolo[1,5-a]pyrimidin-3-yl)-3,4-dihydroxytetrahydrofuran-2-yl)methoxy)-3-hydroxypropan-2-yl)phosphonic acid |
| 39 | | (1-((1H-tetrazol-5-yl)methoxy)-2-(((2R,3S,4R,5S)-5-(2-chloro-4-((cyclobutylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |

TABLE 1-continued

Example compounds of the present disclosure.

| Ex. | Structure | Name |
|---|---|---|
| 40 | | ((R)-1-((2H-tetrazol-5-yl)methoxy)-2-(((2R,3S,4R,5S)-5-(2-chloro-4-(((R)-2,3-dihydro-1H-inden-l-yl)amino)pyrrolo[2,1-f][1,2,4]triazin-7-yl)-3,4-dihydroxytetrahydrofuran-2-yl)methoxy)-3-hydroxypropan-2-yl)phosphonic acid |
| 41 | | ((S)-1-((2H-tetrazol-5-yl)methoxy)-2-(((2R,3S,4R,5S)-5-(2-chloro-4-(((R)-2,3-dihydro-1H-inden-l-yl)amino)pyrrolo[2,1-f][1,2,4]triazin-7-yl)-3,4-dihydroxytetrahydrofuran-2-yl)methoxy)-3-hydroxypropan-2-yl)phosphonic acid |
| 42 | | (S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxy-2-phosphonopropanoic acid |
| 43 | | (1-((1H-tetrazol-5-yl)methoxy)-2-(((2R,3S,4R,5R)-5-(5-chloro-7-(cyclopentylamino)pyrazolo[1,5-a]pyrimidin-3-yl)-3,4-dihydroxytetrahydrofuran-2-yl)methoxy)-3-hydroxypropan-2-yl)phosphonic acid |
| 44 | | ((S)-2-(((2R,3S,4R,5S)-5-(2-chloro-4-((cyclopropylmethyl)amino)pyrrolo[2,1-f][1,2,4]triazin-7-yl)-3,4-dihydroxytetrahydrofuran-2-yl)methoxy)-1-hydroxy-3-((5-oxo-4,5-dihydro-1,2,4-oxadiazol-3-yl)methoxy)propan-2-yl)phosphonic acid |

TABLE 1-continued

Example compounds of the present disclosure.

| Ex. | Structure | Name |
|---|---|---|
| 45 | | (R)-3-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-4-methoxy-3-phosphonobutanoic acid |
| 46 | | ((S)-1-((2H-tetrazol-5-yl)methoxy)-2-(((2R,3S,4R,5S)-5-(2-chloro-4-((cyclopentylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |
| 47 | | (R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxy-2-phosphonopropanoic acid |
| 48 | | ((R)-1-((2H-tetrazol-5-yl)methoxy)-2-(((2R,3S,4R,5S)-5-(2-chloro-4-((cyclopentylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |
| 49 | | ((S)-1-((2H-tetrazol-5-yl)methoxy)-2-(((2R,3S,4R,5S)-5-(2-chloro-4-((cyclopropylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |

TABLE 1-continued

Example compounds of the present disclosure.

| Ex. | Structure | Name |
|---|---|---|
| 50 | | ((R)-1-((2H-tetrazol-5-yl)methoxy)-2-(((2R,3S,4R,5S)-5-(2-chloro-4-(cyclobutylamino)pyrrolo[2,1-f][1,2,4]triazin-7-yl)-3,4-dihydroxytetrahydrofuran-2-yl)methoxy)-3-hydroxypropan-2-yl)phosphonic acid |
| 51 | | ((S)-1-((2H-tetrazol-5-yl)methoxy)-2-(((2R,3S,4R,5S)-5-(2-chloro-4-(cyclobutylamino)pyrrolo[2,1-f][1,2,4]triazin-7-yl)-3,4-dihydroxytetrahydrofuran-2-yl)methoxy)-3-hydroxypropan-2-yl)phosphonic acid |
| 52 | | ((S)-1-((2H-tetrazol-5-yl)methoxy)-2-(((2R,3S,4R,5S)-5-(2-chloro-4-((cyclobutylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |
| 53 | | ((R)-1-((2H-tetrazol-5-yl)methoxy)-2-(((2R,3S,4R,5S)-5-(2-chloro-4-((cyclobutylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |
| 54 | | ((R)-1-((2H-tetrazol-5-yl)methoxy)-2-(((2R,3S,4R,5S)-5-(2-chloro-4-((cyclopropylmethyl)amino)pyrrolo[2,1-f][1,2,4]triazin-7-yl)-3,4-dihydroxytetrahydrofuran-2-yl)methoxy)-3-hydroxypropan-2-yl)phosphonic acid |

TABLE 1-continued

Example compounds of the present disclosure.

| Ex. | Structure | Name |
| --- | --- | --- |
| 55 | | ((S)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-(methoxy-d3)propan-2-yl)phosphonic acid |
| 56 | | (2-(((2R,3S,4R,5S)-5-(5-chloro-7-(cyclopentylamino)pyrazolo[1,5-a]pyrimidin-3-yl)-3,4-dihydroxytetrahydrofuran-2-yl)methoxy)-1-hydroxy-3-methoxypropan-2-yl)phosphonic acid |
| 57 | | (1-((2H-tetrazol-5-yl)methoxy)-2-(((2R,3S,4R,5S)-5-(5-chloro-7-(cyclopentylamino)pyrazolo[1,5-a]pyrimidin-3-yl)-3,4-dihydroxytetrahydrofuran-2-yl)methoxy)-3-methoxypropan-2-yl)phosphonic acid |

For compound nos. 1, 2, 3, 4, 6, 7, 9, and 10, the stereochemical designations for the alpha (α) carbon chiral centers (i.e., the carbon to which the phosphate groups are attached) are arbitrarily designated with a wedge or dash bond to illustrate the relative stereochemistry between isomer pairs, i.e., between compound nos. 1 and 2, compound nos. 3 and 4, compound nos. 6 and 7, and compound nos. 9 and 10.

Some embodiments provide a compound as described in below, or a pharmaceutically acceptable salt thereof:

General Synthetic Schemes

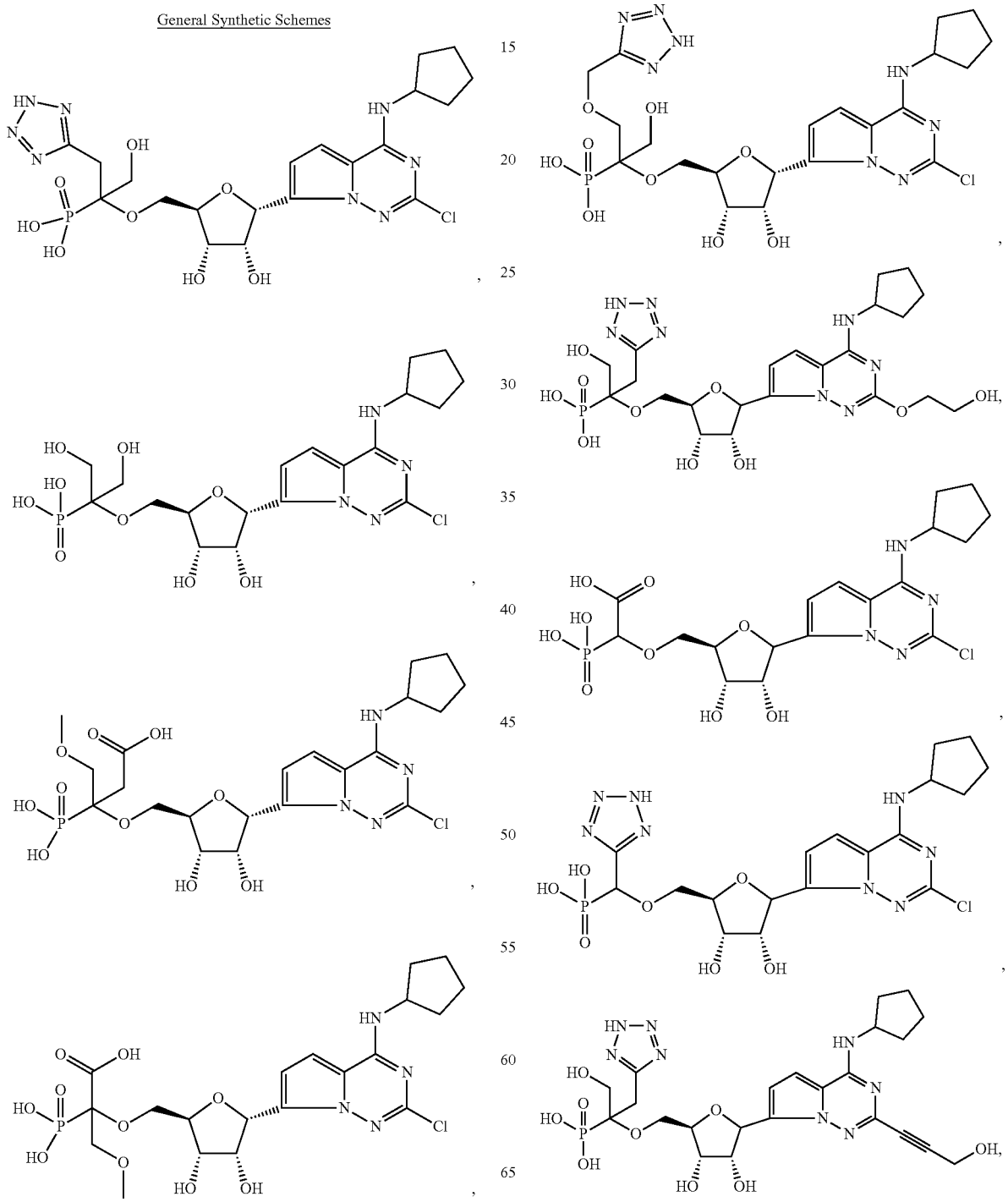

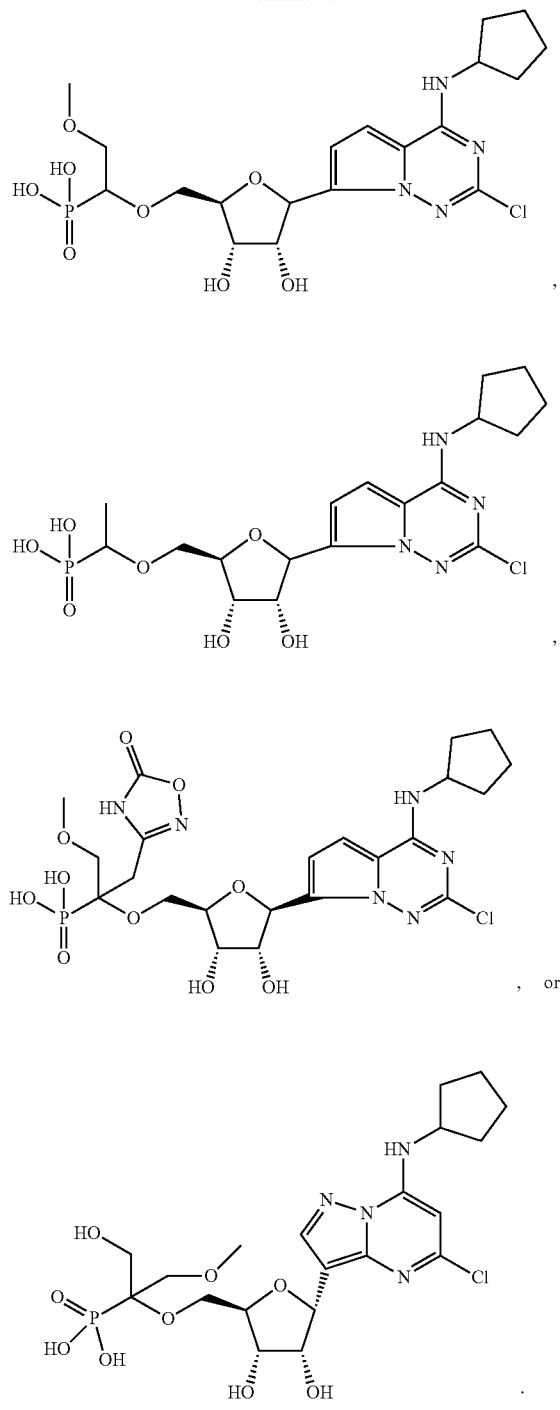

The compounds of Formula (I) may be readily synthesized from commercially available or known starting materials. Exemplary synthetic routes to produce compounds of Formula (I) are provided in the schemes below. The following general synthetic schemes are meant for illustrative purposes so the disclosure can be more fully understood, and are not meant to be limiting in any way. In the following general synthetic schemes, the variables $R^1$, $R^2$, $R^3$, $R^4$, and $R^{5a}$ are as defined herein. Compounds of formula (IIIi) can be synthesized according to the general synthetic procedures detailed in Scheme 1 and Scheme 2 below.

In compounds of formula (IIIa), PG is a suitable oxygen protecting group, such as a silyl group, e.g., tert-butyldimethylsilyl (TBS), and PG' and PG" are also suitable oxygen protecting groups. In some embodiments, PG' and PG" are formed from a single substituent that is bonded to both oxygens, such as an acetyl group. A compound of formula (IIIb) can be provided from a compound of (IIIa) by first reacting 7-bromo-2,4-dichloropyrrolo[2,1-f][1,2,4]triazine with a strong base, such as n-butyl lithium, in the presence of a solvent to form the corresponding organolithium compound that resulted from exchange with the bromide substituent. The organolithium compound can then be contacted with a compound of formula (IIIa) to provide a hemiacetal of formula (IIIb). The hydroxyl group of the hemiacetal of formula (IIIb) can be removed under reductive conditions in the presence of a lewis acid, such as $BF_3/Et_3SiH$ conditions, to form a compound of formula (IIIc). The compound of formula (IIIc) can then be reacted with a nucleophilic compound of formula $R^{5a}$—H to form a compound of formula (IIId). Where the compound of formula $R^{5a}$—H is a primary amine, step C may also include protection of the resulting secondary amine, e.g., Boc protection, using procedures well known in the art. Removal of the PG group from a compound of formula (IIId) using appropriate conditions, followed by chiral resolution, provides a compound of formula (IIIe-1) as a single diastereomer.

Synthetic Scheme 1-2:

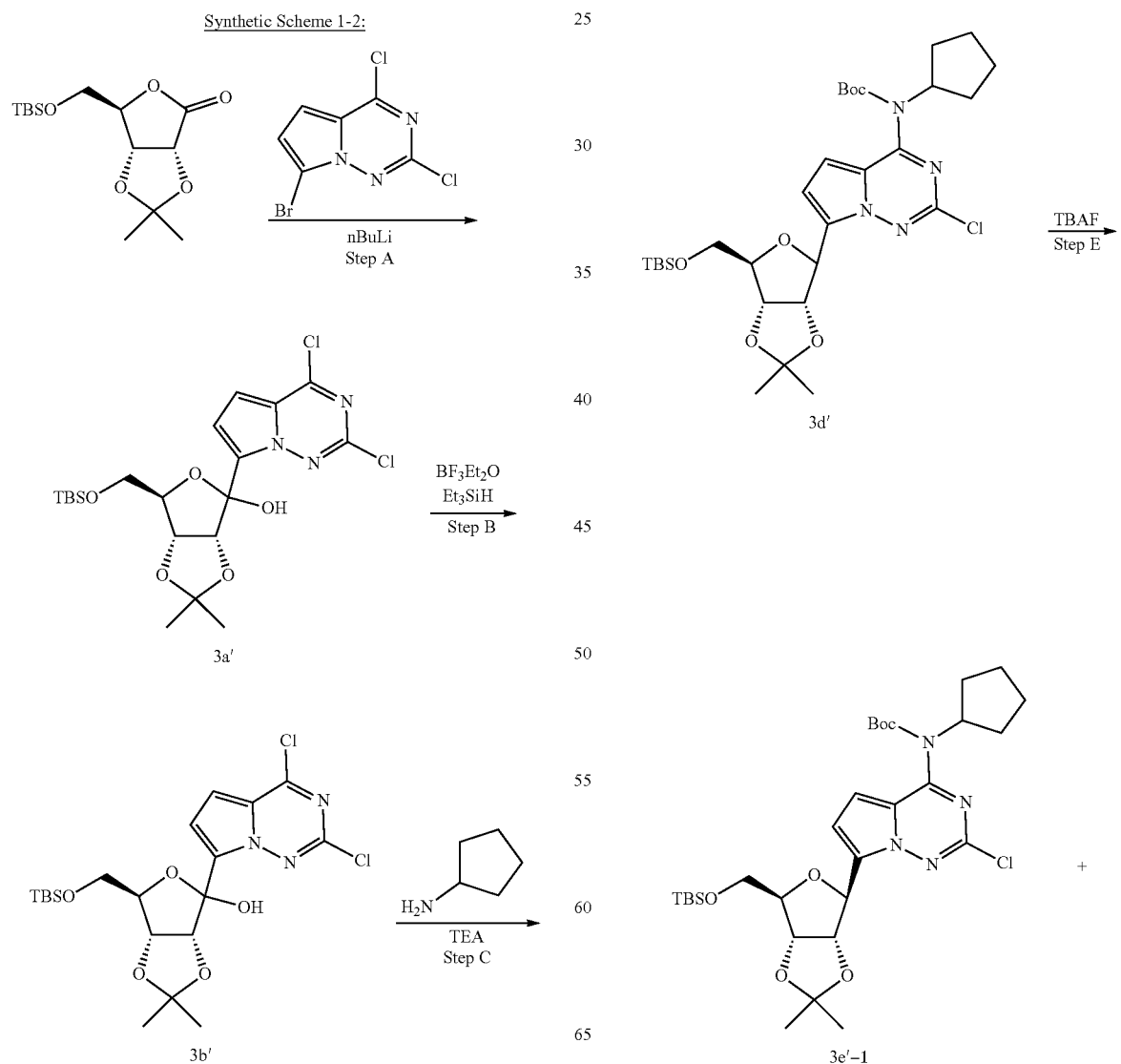

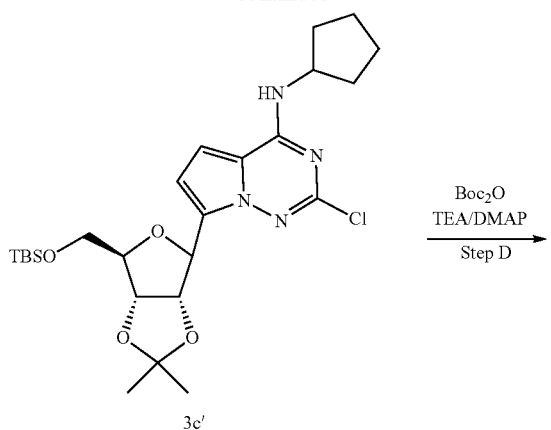

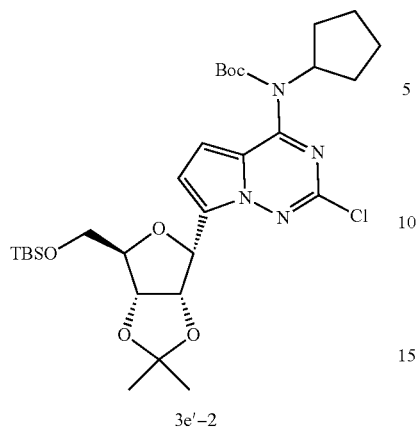

3e'-2

Synthetic Scheme 1-2 presents one example of the general synthetic scheme 1-1 above.

General Synthetic Scheme 2-1

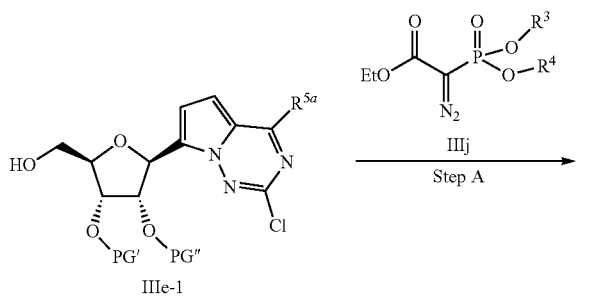

A compound of formula (IIIe-1) can be coupled to a compound of formula (IIIj) under appropriate coupling conditions, for example $Rh_2(OAc)_4$ conditions. The resulting compound of formula (IIIf) can be further functionalized with an $R^1$ substituent at the α-carbon (with respect to the phosphate group) by reacting with $R^1$—Br, in the presence of a base to provide a compound of formula (IIIg). The ethyl ester substituent of the compound of formula (IIIg) can then be converted to the appropriate $R^2$ substituent via a variety of conditions represented by step C to provide a compound of formula (IIIh). In some embodiments, step C involves hydrolytic conditions to provide a carboxylic acid. In other embodiments, step C involves reductive conditions to provide an alcohol substituent, and in further embodiments, the resulting alcohol can be functionalized by a vast array of possible substituents, e.g., alkyl, acyl, and the like. One having skill in the art can envision still other possible conditions in step C, such as amidation or transesterification. A compound of formula (IIIi) can then be provided by deprotection/hydrolysis of the compound of formula (IIIh) in step D to remove the PG' and PG" groups, the Boc group if present, and hydrolysis of the $R^1$ and $R^2$ substituents from the phosphate groups. Step D can be a single pot reaction, or require individual synthetic steps.

Synthetic Scheme 2-2

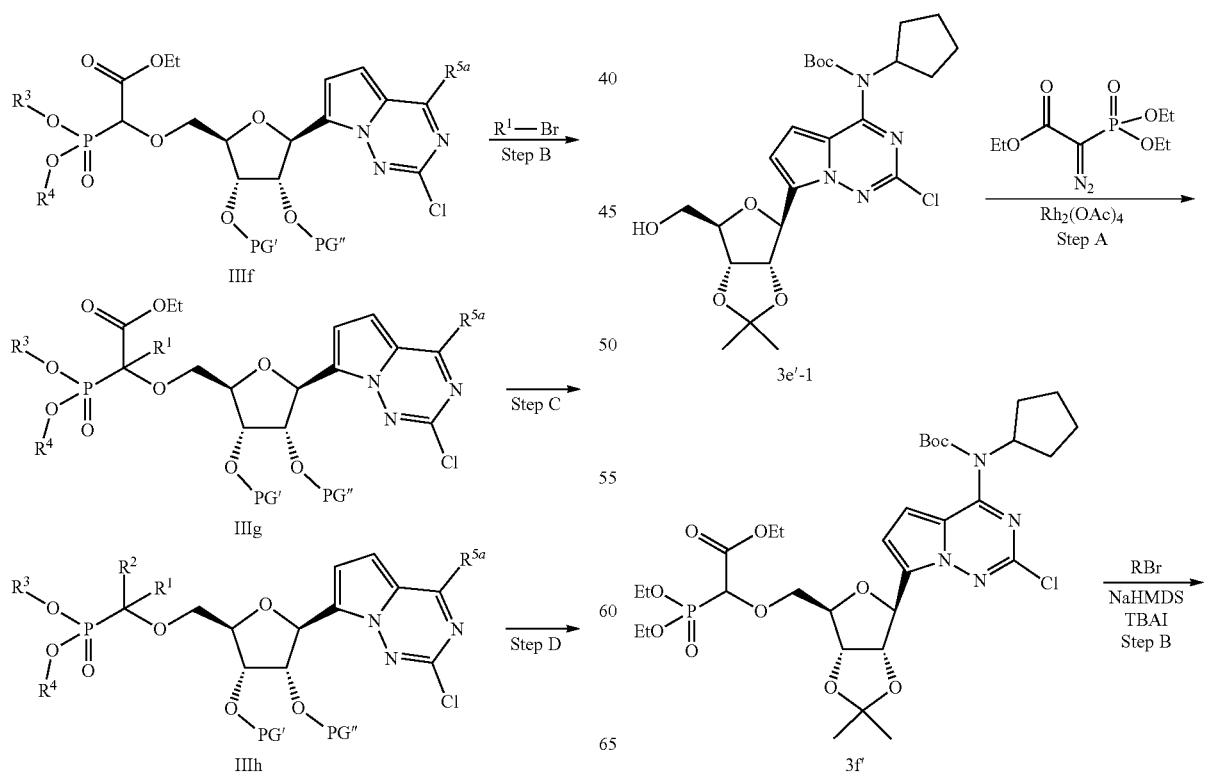

-continued

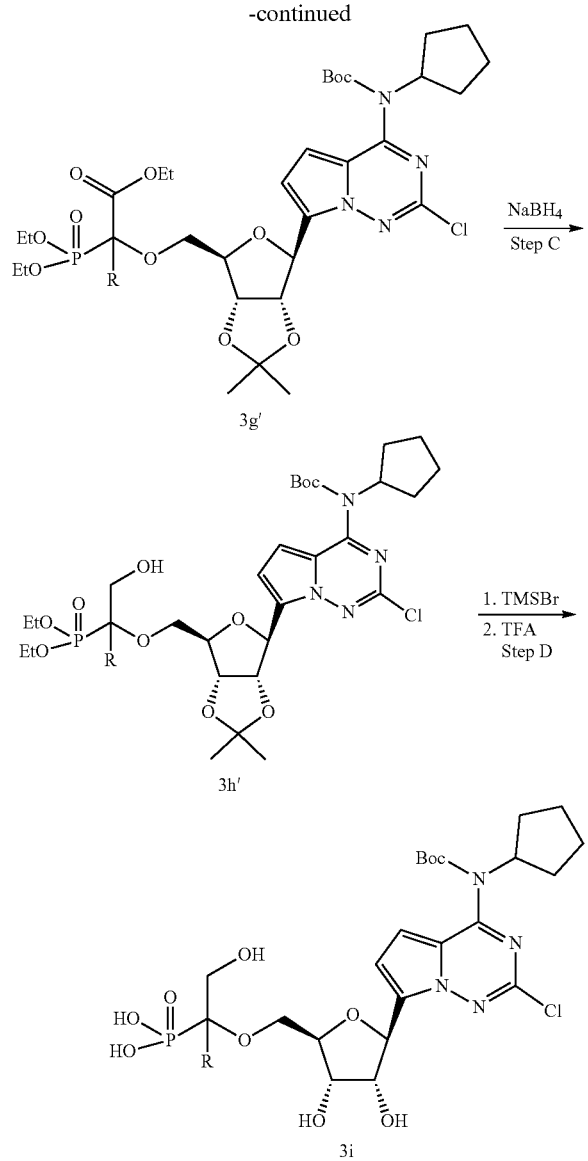

Synthetic Scheme 2-2 presents one example of the general synthetic scheme 2-1 above.

Uses, Formulations, and Administration

Pharmaceutical Compositions

In certain embodiments, a compound disclosed herein is administered as a pure (or substantially pure) compound (e.g., the compound contains less than about 5 wt %, less than about 1 wt %, or less than about 0.1 wt % of other small molecule organic compounds (e.g., unreacted starting materials and intermediates and other method artifacts). In other embodiments, the compounds described herein can be formulated into pharmaceutical compositions that further comprise a pharmaceutically acceptable carrier, diluent, adjuvant or vehicle. In one embodiment, the present disclosure provides a pharmaceutical composition comprising a compound of the disclosure described above, and a pharmaceutically acceptable carrier, diluent, adjuvant or vehicle. In one embodiment, the present disclosure is a pharmaceutical composition comprising an effective amount of a compound of the present disclosure or a pharmaceutically acceptable salt thereof and a pharmaceutically acceptable carrier, diluent, adjuvant or vehicle. Pharmaceutically acceptable carriers include, for example, pharmaceutical diluents, excipients or carriers suitably selected with respect to the intended form of administration, and consistent with conventional pharmaceutical practices.

Pharmaceutical compositions of this invention comprise a therapeutically effective amount of a compound disclosed herein, wherein a "therapeutically effective amount" is the amount required to confer a therapeutic and/or prophylactic effect on the treated patient, and is typically determined based on age, surface area, weight, and condition of the patient.

The term "patient," as used herein, means an animal, preferably a mammal, and most preferably a human.

It also will be appreciated that certain of the compounds of the present disclosure can exist in free form for treatment, or where appropriate, as a pharmaceutically acceptable derivative (e.g., a salt) thereof. According to the present disclosure, a pharmaceutically acceptable derivative includes, but is not limited to, pharmaceutically acceptable prodrugs, salts, esters, salts of such esters, or any other adduct or derivative that upon administration to a patient in need is capable of providing, directly or indirectly, a compound as otherwise described herein, or a metabolite or residue thereof.

As used herein, the term "pharmaceutically acceptable salt" refers to those salts that are, within the scope of sound medical judgement, suitable for use in contact with the tissues of humans and lower animals without undue toxicity, irritation, allergic response and the like.

Pharmaceutically acceptable salts are well known in the art. For example, S. M. Berge et al., describe pharmaceutically acceptable salts in detail in J. Pharmaceutical Sciences, 1977, 66, 1-19, incorporated herein by reference. Pharmaceutically acceptable salts of the compounds of this disclosure include those derived from suitable inorganic and organic acids and bases. Examples of pharmaceutically acceptable, nontoxic acid addition salts include salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and $N^+(C_{1-4}alkyl)_4$ salts. This disclosure also envisions the quaternization of any basic nitrogen-containing groups of the compounds disclosed herein. Water or oil-soluble or dispersible products may be obtained by such quaternization. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate and aryl sulfonate.

A pharmaceutically acceptable carrier may contain inert ingredients that do not unduly inhibit the biological activity of the compounds. The pharmaceutically acceptable carriers should be biocompatible, e.g., non-toxic, non-inflammatory, non-immunogenic or devoid of other undesired reactions or side-effects upon the administration to a subject. Standard pharmaceutical formulation techniques can be employed.

The pharmaceutically acceptable carrier, adjuvant, or vehicle, as used herein, includes any and all solvents, diluents, or other liquid vehicle, dispersion or suspension aids, surface active agents, isotonic agents, thickening or emulsifying agents, preservatives, solid binders, lubricants and the like, as suited to the particular dosage form desired. Remington's Pharmaceutical Sciences, Sixteenth Edition, E. W. Martin (Mack Publishing Co., Easton, Pa., 1980) discloses various carriers used in formulating pharmaceutically acceptable compositions and known techniques for the preparation thereof. Except insofar as any conventional carrier medium is incompatible with the compounds described herein, such as by producing any undesirable biological effect or otherwise interacting in a deleterious manner with any other component(s) of the pharmaceutically acceptable composition, the use of such conventional carrier medium is contemplated to be within the scope of this disclosure. As used herein, the phrase "side effects" encompasses unwanted and adverse effects of a therapy (e.g., a prophylactic or therapeutic agent). Side effects are always unwanted, but unwanted effects are not necessarily adverse. An adverse effect from a therapy (e.g., prophylactic or therapeutic agent) might be harmful, uncomfortable, or risky. Side effects include, but are not limited to, fever, chills, lethargy, gastrointestinal toxicities (including gastric and intestinal ulcerations and erosions), nausea, vomiting, neurotoxicities, nephrotoxicities, renal toxicities (including such conditions as papillary necrosis and chronic interstitial nephritis), hepatic toxicities (including elevated serum liver enzyme levels), myelotoxicities (including leukopenia, myelosuppression, thrombocytopenia and anemia), dry mouth, metallic taste, prolongation of gestation, weakness, somnolence, pain (including muscle pain, bone pain and headache), hair loss, asthenia, dizziness, extra-pyramidal symptoms, akathisia, cardiovascular disturbances and sexual dysfunction.

Some examples of materials that can serve as pharmaceutically acceptable carriers include, but are not limited to, ion exchangers, alumina, aluminum stearate, lecithin, serum proteins (such as human serum albumin), buffer substances (such as twin 80, phosphates, glycine, sorbic acid, or potassium sorbate), partial glyceride mixtures of saturated vegetable fatty acids, water, salts or electrolytes (such as protamine sulfate, disodium hydrogen phosphate, potassium hydrogen phosphate, sodium chloride, or zinc salts), colloidal silica, magnesium trisilicate, polyvinyl pyrrolidone, polyacrylates, waxes, polyethylene-polyoxypropylene-block polymers, methylcellulose, hydroxypropyl methylcellulose, wool fat, sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols; such a propylene glycol or polyethylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents. Preservatives and antioxidants can also be present in the composition, according to the judgment of the formulator.

Pharmaceutical compositions are administered in a manner appropriate to the disease being treated or prevented. An appropriate dose and a suitable duration and frequency of administration will be determined by such factors as the condition of the patient, the type and severity of the disease (or disease symptoms) being treated or prevented, the form of the active pharmaceutical ingredient(s), and the method of administration. For example, oral doses typically range from about 1.0 mg to about 1000 mg, one to four times, or more, per day.

The compositions of the present disclosure may be administered orally, parenterally, by inhalation spray, topically, rectally, nasally, buccally, vaginally or via an implanted reservoir. As used herein, the term "parenteral" includes subcutaneous, intravenous, intramuscular, intra-articular, intra-synovial, intrasternal, intrathecal, intraocular, intrahepatic, intralesional and intracranial injection or infusion techniques. Preferably, the compositions are administered orally, intraperitoneally or intravenously. Sterile injectable forms of the compositions of this disclosure may be aqueous or oleaginous suspension. These suspensions may be formulated according to techniques known in the art using suitable dispersing or wetting agents and suspending agents. The sterile injectable preparation also may be a sterile injectable solution or suspension in a non-toxic parenterally-acceptable diluent or solvent, for example as a solution in 1,3-butanediol. Among the acceptable vehicles and solvents that may be employed are water, Ringer's solution and isotonic sodium chloride solution. In addition, sterile, fixed oils are conventionally employed as a solvent or suspending medium.

For this purpose, any bland fixed oil may be employed including synthetic mono- or di-glycerides. Fatty acids, such as oleic acid and its glyceride derivatives, are useful in the preparation of injectables, as are natural pharmaceutically acceptable oils, such as olive oil or castor oil, especially in their polyoxyethylated versions. These oil solutions or suspensions also may contain a long-chain alcohol diluent or dispersant, such as carboxymethyl cellulose or similar dispersing agents that are commonly used in the formulation of pharmaceutically acceptable dosage forms including emulsions and suspensions. Other commonly used surfactants, such as Tweens, Spans and other emulsifying agents or bioavailability enhancers that are commonly used in the manufacture of pharmaceutically acceptable solid, liquid, or other dosage forms may also be used for the purposes of formulation.

The pharmaceutically acceptable compositions of this disclosure may be orally administered in any orally acceptable dosage form including, but not limited to, capsules, tablets, aqueous suspensions or solutions. In the case of tablets for oral use, carriers commonly used include lactose and corn starch. Lubricating agents, such as magnesium stearate, are also typically added. For oral administration in a capsule form, useful diluents include lactose and dried cornstarch. When aqueous suspensions are required for oral use, the active ingredient is combined with emulsifying and suspending agents. If desired, certain sweetening, flavoring or coloring agents also may be added.

Alternatively, the pharmaceutically acceptable compositions of this disclosure may be administered in the form of suppositories for rectal or vaginal administration. These can be prepared by mixing the agent with a suitable non-irritating excipient that is solid at room temperature but liquid at rectal temperature and therefore will melt in the rectum or vaginal cavity to release the drug. Such materials include cocoa butter, polyethylene glycol or a suppository wax that is solid at ambient temperature but liquid at body temperature and therefore melt in the rectum or vaginal cavity and release the active compound.

The pharmaceutically acceptable compositions of this disclosure also may be administered topically, especially when the target of treatment includes areas or organs readily accessible by topical application, including diseases of the eye, skin, or lower intestinal tract. Suitable topical formulations are readily prepared for each of these areas or organs.

Topical application for the lower intestinal tract can be effected in a rectal suppository formulation (see above) or in a suitable enema formulation. Topically-transdermal patches also may be used.

For topical applications, the pharmaceutically acceptable compositions may be formulated in a suitable ointment containing the active component suspended or dissolved in one or more carriers. Carriers for topical administration of the compounds of this disclosure include, but are not limited to, mineral oil, liquid petrolatum, white petrolatum, propylene glycol, polyoxyethylene, polyoxypropylene compound, emulsifying wax and water. Alternatively, the pharmaceutically acceptable compositions can be formulated in a suitable lotion or cream containing the active components suspended or dissolved in one or more pharmaceutically acceptable carriers. Suitable carriers include, but are not limited to, mineral oil, sorbitan monostearate, polysorbate 60, cetyl esters wax, cetearyl alcohol, 2-octyldodecanol, benzyl alcohol and water.

For ophthalmic use, the pharmaceutically acceptable compositions may be formulated, e.g., as micronized suspensions in isotonic, pH adjusted sterile saline or other aqueous solution, or, preferably, as solutions in isotonic, pH adjusted sterile saline or other aqueous solution, either with or without a preservative such as benzylalkonium chloride. Alternatively, for ophthalmic uses, the pharmaceutically acceptable compositions may be formulated in an ointment such as petrolatum. The pharmaceutically acceptable compositions of this disclosure also may be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other conventional solubilizing or dispersing agents.

Liquid dosage forms for oral administration include, but are not limited to, pharmaceutically acceptable emulsions, microemulsions, solutions, suspensions, syrups and elixirs. In addition to the active compounds, the liquid dosage forms may contain inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions also can include adjuvants such as wetting agents, emulsifying and suspending agents, sweetening, flavoring, and perfuming agents.

Injectable preparations, for example, sterile injectable aqueous or oleaginous suspensions, may be formulated according to the known art using suitable dispersing or wetting agents and suspending agents. The sterile injectable preparation also may be a sterile injectable solution, suspension or emulsion in a nontoxic parenterally acceptable diluent or solvent, for example, as a solution in 1,3-butanediol. Among the acceptable vehicles and solvents that may be employed are water, Ringer's solution, U.S.P. and isotonic sodium chloride solution. In addition, sterile, fixed oils are conventionally employed as a solvent or suspending medium. For this purpose any bland fixed oil can be employed including synthetic mono- or diglycerides. In addition, fatty acids such as oleic acid may be used in the preparation of injectables.

The injectable formulations can be sterilized, for example, by filtration through a bacterial-retaining filter, or by incorporating sterilizing agents in the form of sterile solid compositions that can be dissolved or dispersed in sterile water or other sterile injectable medium prior to use.

In order to prolong the effect of a compound of the present disclosure, it is often desirable to slow the absorption of the compound from subcutaneous or intramuscular injection. This may be accomplished by the use of a liquid suspension of crystalline or amorphous material with poor water solubility. The rate of absorption of the compound then depends upon its rate of dissolution that, in turn, may depend upon crystal size and crystalline form. Alternatively, delayed absorption of a parenterally administered compound form is accomplished by dissolving or suspending the compound in an oil vehicle. Injectable depot forms are made by forming microencapsule matrices of the compound in biodegradable polymers such as polylactide-polyglycolide. Depending upon the ratio of compound to polymer and the nature of the particular polymer employed, the rate of compound release can be controlled. Examples of other biodegradable polymers include poly(orthoesters) and poly(anhydrides). Depot injectable formulations also are prepared by entrapping the compound in liposomes or microemulsions that are compatible with body tissues.

Solid dosage forms for oral administration include capsules, tablets, pills, powders, and granules. In such solid dosage forms, the active compound is mixed with at least one inert, pharmaceutically acceptable excipient or carrier such as sodium citrate or dicalcium phosphate and/or a) fillers or extenders such as starches, lactose, sucrose, glucose, mannitol, and silicic acid, b) binders such as carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form also may comprise buffering agents.

Solid compositions of a similar type also may be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the pharmaceutical formulating art. Solid dosage forms optionally may contain opacifying agents. These solid dosage forms also can be of a composition such that they release the active ingredient(s) only, or preferentially, in a certain part of the intestinal tract, optionally, in a delayed manner. Examples of embedding compositions that can be used include polymeric substances and waxes. Solid compositions of a similar type also may be employed as fillers in soft and hard-filled gelatin capsules using such excipients as lactose or milk sugar as well as high molecular weight polethylene glycols and the like.

The active compounds also can be in micro-encapsulated form with one or more excipients as noted above. The solid dosage forms of tablets, dragees, capsules, pills, and granules can be prepared with coatings and shells such as enteric coatings, release controlling coatings and other coatings well known in the pharmaceutical formulating art. In such solid dosage forms the active compound may be admixed with at least one inert diluent such as sucrose, lactose or starch. Such dosage forms also may comprise, as is normal practice, additional substances other than inert diluents, e.g., tableting lubricants and other tableting aids such a magnesium stearate and microcrystalline cellulose. In the case of capsules, tablets and pills, the dosage forms also may comprise buffering agents. They may optionally contain opacifying agents and also can be of a composition such that they release the active ingredient(s) only, or preferentially, in a certain part of the intestinal tract, optionally, in a delayed manner. Examples of embedding compositions that can be used include polymeric substances and waxes.

Dosage forms for topical or transdermal administration of a compound of this disclosure include ointments, pastes, creams, lotions, gels, powders, solutions, sprays, inhalants or patches. The active component is admixed under sterile conditions with a pharmaceutically acceptable carrier and any needed preservatives or buffers as may be required. Ophthalmic formulation, ear drops, and eye drops also are contemplated as being within the scope of this disclosure. Additionally, the present disclosure contemplates the use of transdermal patches, which have the added advantage of providing controlled delivery of a compound to the body. Such dosage forms can be made by dissolving or dispensing the compound in the proper medium. Absorption enhancers also can be used to increase the flux of the compound across the skin. The rate can be controlled by either providing a rate controlling membrane or by dispersing the compound in a polymer matrix or gel.

The compounds of the disclosure preferably are formulated in dosage unit form for ease of administration and uniformity of dosage. As used herein, the phrase "dosage unit form" refers to a physically discrete unit of agent appropriate for the patient to be treated. It will be understood, however, that the total daily usage of the compounds and compositions of the present disclosure will be decided by the attending physician within the scope of sound medical judgment. The specific effective dose level for any particular patient or organism will depend upon a variety of factors including the disorder being treated and the severity of the disorder; the activity of the specific compound employed; the specific composition employed; the age, body weight, general health, sex and diet of the patient; the time of administration, route of administration, and rate of excretion of the specific compound employed; the duration of the treatment; drugs used in combination or coincidental with the specific compound employed, and like factors well known in the medical arts.

The amount of the compounds of the present disclosure that may be combined with the carrier materials to produce a composition in a single dosage form will vary depending upon the host treated, the particular mode of administration, and other factors. Preferably, the compositions should be formulated so that a dosage of between 0.01-100 mg/kg body weight/day of the inhibitor can be administered to a patient receiving these compositions.

Uses of the Compounds and Compositions—Methods of Treatment.

The compounds disclosed herein, or a pharmaceutically acceptable salt thereof, are useful as inhibitors of CD73 and, therefore, useful in the treatment of diseases or disorders in which it is believed CD73 activity plays a role. In some embodiments, the disease or disorder is cancer. In some embodiments, the disease or disorder is an infection. In some embodiments, the disease or disorder is a neurodegenerative disease. In some embodiments, the disease or disorder is a psychiatric disorder.

Disclosed herein are methods of treating a subject with a disorder mediated by CD73 comprising the step of administering to the subject an effective amount of a compound disclosed herein, or a pharmaceutically acceptable salt thereof.

Cancer.

CD73 has been found to be overexpressed in many cancer cell lines and tumor types including breast cancer, colorectal cancer, ovarian cancer, gastric cancer, and gallbladder cancer and associated with poor prognosis. Increasing evidence suggests that CD73 is a key protein molecule in cancer development.

Higher expression levels of CD73 are associated with tumor neovascularization, invasiveness, resistance to chemotherapy and metastasis, and with shorter patient survival time in cancer. In some embodiments, the compounds disclosed herein are useful in reducing tumor neovascularization, invasiveness, resistance to chemotherapy and metastasis, as well as to lengthen patient survival time in cancer patients. In some embodiments, the CD73 inhibitors disclosed herein are used to control tumor neovascularization, progression, resistance to chemotherapy, and metastasis.

One embodiment provides a method of treating cancer in a subject in need thereof, comprising administering to the subject a compound of disclosed herein, or a pharmaceutically acceptable salt thereof.

In some embodiments, the cancer is chemoresistant cancer, radio resistant cancer, anti-hormonal therapy resistant cancer, or treatment refractory cancer. In some embodiments, the cancer is relapsed cancer, persistent cancer, or recurrent cancer. Another embodiment provided herein describes a method of reducing incidences of cancer recurrence. Also provided here in some embodiments, is a method for treating a therapy-resistant cancer. In some embodiments, the cancer is metastatic cancer.

In certain embodiments, the cancer treatable with the methods provided herein includes, but is not limited to, (1) leukemias, including, but not limited to, acute leukemia, acute lymphocytic leukemia, acute myelocytic leukemias such as myeloblastic, promyelocytic, myelomonocytic, monocytic, erythroleukemia leukemias and myelodysplastic syndrome or a symptom thereof (such as anemia, thrombocytopenia, neutropenia, bicytopenia, or pancytopenia), refractory anemia (RA), RA with ringed sideroblasts (RARS), RA with excess blasts (RAEB), RAEB in trans-formation (RAEB-T), preleukemia, and chronic myelomonocytic leukemia (CMML); (2) chronic leukemias, including, but not limited to, chronic myelocytic (granulocytic) leukemia, chronic lymphocytic leukemia, and hairy cell leukemia; (3) polycythemia vera; (4) lymphomas, including, but not limited to, Hodgkin's disease and non-Hodgkin's disease; (5) multiple myelomas, including, but not limited to, smoldering multiple myeloma, non-secretory myeloma, osteosclerotic myeloma, plasma cell leukemia, solitary plasmacytoma, and extramedullary plasmacytoma; (6) Waldenstrom's macroglobulinernia; (7) monoclonal gammopathy of undetermined significance; (8) benign monoclonal gammopathy; (9) heavy chain disease; (10) bone and connective tissue sarcomas, including, but not limited to, bone sarcoma, osteosarcoma, chondrosarcoma, Ewing's sarcoma, malignant giant cell tumor, fibrosarcoma of bone, chordoma, periosteal sarcoma, soft-tissue sarcomas, angiosarcoma (hemangiosarcoma), fibrosarcoma, Kaposi's sarcoma, leiomyosarcoma, liposarcoma, lymphangiosarcoma, metastatic cancers, neurilemmoma, rhabdomyosarcoma, and synovial sarcoma; (11) brain tumors, including, but not limited to, glioma, astrocytoma, brain stem glioma, ependymoma, aligodendroglioma, nonglial tumor, acoustic neurinoma, craniopharyngioma, medulloblastoma, meningioma, pineocytoma, pineoblastoma, and primary brain lymphoma; (12) breast cancer, including, but not limited to, adenocarcinoma, lobular (small cell) carcinoma, intraductal carcinoma, medullary breast cancer, mutinous breast cancer, tubular breast cancer, papillary breast cancer, primary cancers, Paget's disease, and inflammatory breast cancer; (13) adrenal cancer, including, but not limited to, pheochromocytom and adrenocortical carcinoma; (14) thyroid cancer, including, but not limited to, papillary or follicular thyroid cancer, medullary thyroid cancer, and anaplastic thyroid cancer; (15) pancreatic cancer, including, but not limited to, insulinoma, gastrinoma, glucagonoma, vipoma, somatostatin-secreting tumor, and carcinoid or islet cell tumor; (16) pituitary cancer, including, but limited to, Cushing's disease, prol actin-secreting tumor, acromegaly, and diabetes insipidus; (17) eye cancer, including, but not limited, to ocular melanoma such as iris melanoma, choroidal melanoma, and ciliary body melanoma, and retinoblastoma; (18) vaginal cancer, including, but not limited to, squamous cell carcinoma, adenocarcinoma, and melanoma; (19) vulvar cancer, including, but not limited to, squamous cell carcinoma, melanoma, adenocarcinoma, basal cell carcinoma, sarcoma, and Paget's disease; (20) cervical cancers, including, but not limited to, squamous cell carcinoma, and adenocarcinoma; (21) uterine cancer, including, but not limited to, endometrial carcinoma and uterine sarcoma; (22) ovarian cancer, including, but not limited to, ovarian epithelial carcinoma, borderline tumor, germ cell tumor, and stromal tumor; (23) esophageal cancer, including, but not limited to, squamous cancer, adenocarcinoma, adenoid cystic carcinoma, mucoepidermoid carcinoma, adenosquamous carcinoma, sarcoma, melanoma, plasmacytoma, verrucous carcinoma, and oat cell (small cell) carcinoma; (24) stomach cancer, including, but not limited to, adenocarcinoma, fungating (polypoid), ulcerating, superficial spreading, diffusely spreading, malignant lymphoma, liposarcoma, fibrosarcoma, and carcinosarcoma; (25) colon cancer; (26) rectal cancer; (27) liver cancer, including, but not limited to, hepatocellular carcinoma and hepatoblastoma; (28) gallbladder cancer, including, but not limited to, adenocarcinoma; (29) cholangiocarcinomas, including, but not limited to, papillary, nodular, and diffuse; (30) lung cancer, including, but not limited to, non-small cell lung cancer, squamous cell carcinoma (epidermoid carcinoma), adenocarcinoma, large-cell carcinoma, and small-cell lung cancer; (31) testicular cancer, including, but not limited to, germinal tumor, seminoma, anaplastic, classic (typical), spermatocytic, non-seminoma, embryonal carcinoma, teratoma carcinoma, and choriocarcinoma (yolk-sac tumor); (32) prostate cancer, including, but not limited to, adenocarcinoma, leiomyosarcoma, and rhabdomyosarcorna; (33) penal cancer; (34) oral cancer, including, but not limited to, squamous cell carcinoma; (35) basal cancer; (36) salivary gland cancer, including, but not limited to, adenocarcinoma, mucoepidermoid carcinoma, and adenoidcystic carcinoma; (37) pharynx cancer, including, but not limited to, squamous cell cancer and verrucous; (38) skin cancer, including, but not limited to, basal cell carcinoma, squamous cell carcinoma and melanoma, superficial spreading melanoma, nodular melanoma, lentigo malignant melanoma, and acral lentiginous melanoma; (39) kidney cancer, including, but not limited to, renal cell cancer, adenocarcinoma, hypernephroma, fibrosarcoma, and transitional cell cancer (renal pelvis and/or uterer); (40) Wilms' tumor; (41) bladder cancer, including, but not limited to, transitional cell carcinoma, squamous cell cancer, adenocarcinoma, and carcinosarcoma; (42) reproductive cancers, such as cervical cancer, uterus cancer, ovarian cancer, or testicular cancer; (43) esophagus cancer; (44) laryngeal cancer; (45) head and neck cancers (including mouth, nose, throat, larynx, sinuses, or salivary glands cancers); and other cancer, including, not limited to, myxosarcoma, osteogenic sarcoma, endotheliosarcoma, lymphangio-endotheliosarcoma, mesothelioma, synovioma, hemangioblastoma, epithelial carcinoma, cystadenocarcinoma, bronchogenic carcinoma, sweat gland carcinoma, sebaceous gland carcinoma, papillary carcinoma, and papillary adenocarcinomas (See Fishman et al., 1985, Medicine, 2d Ed., J.B. Lippincott Co., Philadelphia and Murphy et al., 1997, Informed Decisions: The Complete Book of Cancer Diagnosis, Treatment, and Recovery, Viking Penguin, Penguin Books U.S.A., Inc., United States of America).

In certain embodiments, the cancer treatable with the methods provided herein is a hematological malignancy. In certain embodiments, the hematological malignancy is a T-cell malignancy. In certain embodiments, T-cell malignancies include peripheral T-cell lymphoma not otherwise specified (PTCL-NOS), anaplastic large cell lymphoma, angioimmunoblastic lymphoma, cutaneous T-cell lymphoma, adult T-cell leukemia/lymphoma (ATLL), blastic NK-cell lymphoma, enteropathy-type T-cell lymphoma, hematosplenic gamma-delta T-cell lymphoma, lymphoblastic lymphoma, nasal NK/T-cell lymphomas, or treatment-related T-cell lymphomas.

In certain embodiments, the hematological malignancy is a B-cell malignancy. In certain embodiments, B-cell malignancies include acute lymphoblastic leukemia (ALL), acute myelogenous leukemia (AML), chronic myelogenous leukemia (CML), acute monocytic leukemia (AMoL), chronic lymphocytic leukemia (CLL), high-risk chronic lymphocytic leukemia (CLL), small lymphocytic lymphoma (SLL), high-risk small lymphocytic lymphoma (SLL), follicular lymphoma (FL), diffuse large B-cell lymphoma (DLBCL), mantle cell lymphoma (MCL), Waldenstrom's macroglobulinemia, multiple myeloma, extranodal marginal zone B cell lymphoma, nodal marginal zone B cell lymphoma, Burkitfs lymphoma, non-Burkitt high grade B cell lymphoma, primary mediastinal B-cell lymphoma (PMBL), immunoblastic large cell lymphoma, precursor B-lymphoblastic lymphoma, B cell prolymphocytic leukemia, lymphoplasmacytic lymphoma, splenic marginal zone lymphoma, plasma cell myeloma, plasmacytoma, mediastinal (thymic) large B cell lymphoma, intravascular large B cell lymphoma, primary effusion lymphoma, or lymphomatoid granulomatosis. In certain embodiments, the B-cell malignancy is diffuse large B-cell lymphoma (DLBCL). In certain embodiments, the DLBCL is an activated B-cell DLBCL (ABC-DLBCL), a germinal center B-cell like DLBCL (GBC-DLBCL), a double hit DLBCL (DH-DLBCL), or a triple hit DLBCL (TH-DLBCL).

In certain embodiments, the cancer treatable with the methods provided herein is lung cancer, melanoma, breast cancer, ovarian cancer, colorectal cancer, gastric cancer, gallbladder cancer, or prostate cancer.

In certain embodiments, the cancer treatable with the methods provided herein expresses CD73. In certain embodiments, the cancer treatable with the methods provided herein overexpresses CD73. In certain embodiments, CD73 is upregulated in the cancer treatable with the methods provided herein.

Infections.

A number of studies have shown changes in the activity of the CD39/CD73 axis during infections induced by a variety of microorganisms. One embodiment provides a method of treating an infection in a subject in need thereof, comprising administering to the subject a compound of disclosed herein, or a pharmaceutically acceptable salt thereof.

In some embodiments, the infection is a viral infection, a bacterial infection, or a parasitic infection.

Parasitic Infections.

In some embodiments, the infection is a parasitic infection. In some embodiments, the parasitic infection is caused by infection of the subject with a protozoan organism. In some embodiments, the protozoan organism selected from the group consisting of the genera *Acanthamoeba, Babesia, Balantidium, Cryptosporidium, Dientamoeba, Eimeria, Entamoeba, Giardia, Isospora, Leishmania, Naegleria, Neospora, Plasmodium, Sarcocystis, Theileria, Toxoplasma, Trichomonas, Trypanosoma*, or any combinations thereof. In some embodiments, the parasitic infection is caused by an infection with *Toxoplasma gondii* (*T. gondii*). In some embodiments, the parasitic infection is toxoplasmosis. In some embodiments, the toxoplasmosis is acute toxoplasmosis, latent toxoplasmosis, or cutaneous toxoplasmosis.

Acute toxoplasmosis: acute toxoplasmosis is often asymptomatic in healthy adults. However, symptoms may manifest and are often influenza-like: swollen lymph nodes, headaches, fever, fatigue, or muscle aches and pains that last for a month or more. Rarely will a human with a fully functioning immune system develop severe symptoms following infection. People with weakened immune systems are likely to experience headache, confusion, poor coordination, seizures, lung problems that may resemble tuberculosis or *Pneumocystis jiroveci* pneumonia (a common opportunistic infection that occurs in people with AIDS), or blurred vision caused by severe inflammation of the retina (ocular toxoplasmosis). Young children and immunocompromised people, such as those with HIV/AIDS, those taking certain types of chemotherapy, or those who have recently received an organ transplant, may develop severe toxoplasmosis. In some instances, toxoplasmosis causes damage to the brain (encephalitis) or the eyes (necrotizing retinochoroiditis). Infants infected via placental transmission may be born with either of these problems, or with nasal malformations, although these complications are rare in newborns. The toxoplasmic trophozoites causing acute toxoplasmosis are referred to as tachyzoites, and are typically found in bodily fluids.

Latent toxoplasmosis: due to its asymptomatic nature, it is easy for a host to become infected with *Toxoplasma gondii* and develop toxoplasmosis without knowing it. Although mild, flu-like symptoms occasionally occur during the first few weeks following exposure, infection with *T. gondii* produces no readily observable symptoms in healthy human adults. In most immunocompetent people, the infection enters a latent phase, during which only bradyzoites (tissue cysts) are present; these tissue cysts and even lesions can occur in the retinas, alveolar lining of the lungs (where an acute infection may mimic a *Pneumocystis jirovecii* infection), heart, skeletal muscle, and the central nervous system (CNS), including the brain. Cysts form in the CNS(brain tissue) upon infection with *T. gondii* and persist for the lifetime of the host. Most infants who are infected while in the womb have no symptoms at birth, but may develop symptoms later in life.

Cutaneous toxoplasmosis: in some embodiments, skin lesions occur in the acquired form of the disease, including roseola and erythema multiforme-like eruptions, prurigo-like nodules, urticaria, and maculopapular lesions. Newborns may have punctate macules or ecchymoses. Diagnosis of cutaneous toxoplasmosis is based on the tachyzoite form of *T. gondii* being found in the epidermis.

Viral Infections.

In some embodiments, the infection is a viral infection. In certain embodiments, the viral infection treatable with the methods provided herein includes, but is not limited to, chickenpox, the flu (influenza), herpes, human immunodeficiency virus (HIV/AIDS), human papillomavirus (HPV), Infectious mononucleosis, mumps, measles, rubella, shingles, viral gastroenteritis (stomach flu), viral hepatitis, viral meningitis, and viral pneumonia.

Neurodegenerative Diseases.

In the central nervous system, adenosine plays a critical role in controlling a multitude of neural functions. Through the activation of P1 receptors, adenosine is involved in diverse physiological and pathological processes such as regulation of sleep, general arousal state and activity, local neuronal excitability, and coupling of the cerebral blood flow to the energy demand. In some embodiments, the manipulation of adenosine production via CD73 inhibitors has therapeutic potential in neurodegenerative diseases. One embodiment provides a method of treating a neurodegenerative disease in a subject in need thereof, comprising administering to the subject a compound of disclosed herein, or a pharmaceutically acceptable salt thereof. In certain embodiments, the neurodegenerative disease treatable with the methods provided herein includes, but is not limited to, Alzheimer's disease, Parkinson's disease, and Huntington's disease. One embodiment provides a method of treating a psychiatric disorder in a subject in need thereof, comprising administering to the subject a compound of disclosed herein, or a pharmaceutically acceptable salt thereof. In some embodiments, the psychiatric disorder is schizophrenia or autism.

Combination Therapies.

Depending upon the particular condition, or disease, to be treated or prevented, additional therapeutic agents, which are normally administered to treat or prevent that condition, also may be present in the compositions of this disclosure. As used herein, additional therapeutic agents that are normally administered to treat or prevent a particular disease, or condition, are known as "appropriate for the disease, or condition, being treated."

In certain instances, the compound disclosed herein, or a pharmaceutically acceptable salt thereof, is administered in combination with another (e.g. a second) therapeutic agent.

In some embodiments, the benefit experienced by a patient is increased by administering one of the compounds described herein with a second therapeutic agent (which also includes a therapeutic regimen) that also has therapeutic or prophylactic benefit.

In one specific embodiment, a compound disclosed herein, or a pharmaceutically acceptable salt thereof, is co-administered with a second therapeutic agent, wherein the compound disclosed herein, or a pharmaceutically acceptable salt thereof, and the second therapeutic agent modulate different aspects of the disease, disorder or condition being treated, thereby providing a greater overall benefit than administration of either therapeutic agent alone.

In any case, regardless of the disease, disorder or condition being treated, the overall benefit experienced by the patient is simply additive of the two therapeutic agents or the patient experiences a synergistic benefit.

In certain embodiments, different therapeutically-effective dosages of the compounds disclosed herein will be utilized in formulating a pharmaceutical composition and/or in treatment regimens when the compounds disclosed herein are administered in combination with a second therapeutic agent. Therapeutically-effective dosages of drugs and other agents for use in combination treatment regimens are optionally determined by means similar to those set forth hereinabove for the actives themselves. Furthermore, the methods of prevention/treatment described herein encompasses the use of metronomic dosing, i.e., providing more frequent, lower doses in order to minimize toxic side effects. In some embodiments, a combination treatment regimen encompasses treatment regimens in which administration of a compound disclosed herein, or a pharmaceutically acceptable salt thereof, is initiated prior to, during, or after treatment with a second agent described herein, and continues until any time during treatment with the second agent or after termination of treatment with the second agent. It also includes treatments in which a compound disclosed herein, or a pharmaceutically acceptable salt thereof, and the second agent being used in combination are administered simultaneously or at different times and/or at decreasing or increasing intervals during the treatment period. Combination treatment further includes periodic treatments that start and stop at various times to assist with the clinical management of the patient.

It is understood that the dosage regimen to treat, prevent, or ameliorate the condition(s) for which relief is sought, is modified in accordance with a variety of factors (e.g., the disease, disorder or condition from which the subject suffers; the age, weight, sex, diet, and medical condition of the subject). Thus, in some instances, the dosage regimen actually employed varies and, in some embodiments, deviates from the dosage regimens set forth herein.

For combination therapies described herein, dosages of the co-administered compounds vary depending on the type of co-drug employed, on the specific drug employed, on the disease or condition being treated, and so forth. In additional embodiments, when co-administered with a second therapeutic agent, the compound provided herein is administered either simultaneously with the second therapeutic agent, or sequentially.

In combination therapies, the multiple therapeutic agents (one of which is one of the compounds described herein) are administered in any order or even simultaneously. If administration is simultaneous, the multiple therapeutic agents are, by way of example only, provided in a single, unified form, or in multiple forms (e.g., as a single pill or as two separate pills).

The compounds disclosed herein, or a pharmaceutically acceptable salt thereof, as well as combination therapies, are administered before, during or after the occurrence of a disease or condition, and the timing of administering the composition containing a compound varies. Thus, in one embodiment, the compounds described herein are used as a prophylactic and are administered continuously to subjects with a propensity to develop conditions or diseases in order to prevent the occurrence of the disease or condition. In another embodiment, the compounds and compositions are administered to a subject during or as soon as possible after the onset of the symptoms. In specific embodiments, a compound described herein is administered as soon as is practicable after the onset of a disease or condition is detected or suspected, and for a length of time necessary for the treatment of the disease. In some embodiments, the length required for treatment varies, and the treatment length is adjusted to suit the specific needs of each subject. For example, in specific embodiments, a compound described herein or a formulation containing the compound is administered for at least 2 weeks, about 1 month to about 5 years.

In certain embodiments, the second therapeutic agent is an adjuvant. In certain embodiments, the second therapeutic agent is an anti-cancer agent. In certain embodiments, the second therapeutic agent is an antiemetic. In certain embodiments, the second therapeutic agent is an anti-infective agent. In certain embodiments, the second therapeutic agent is an antiviral agent. In certain embodiments, the second therapeutic agent is an antibacterial agent.

In some embodiments, the compound disclosed herein, or a pharmaceutically acceptable salt thereof, is administered in combination with an adjuvant. In one embodiment, the therapeutic effectiveness of one of the compounds described herein is enhanced by administration of an adjuvant (i.e., by itself the adjuvant has minimal therapeutic benefit, but in combination with another therapeutic agent, the overall therapeutic benefit to the patient is enhanced). In some embodiments, the compound disclosed herein, or a pharmaceutically acceptable salt thereof, is administered in combination with an anti-cancer agent.

In some embodiments, the anti-cancer agent is a hormone blocking therapy. Hormone blocking therapy includes the use of agents that block the production of estrogens or block the estrogen receptors. In some embodiments, hormone blocking therapy includes the use of estrogen receptor modulators and/or aromatase inhibitors. Estrogen receptor modulators include triphenylethylene derivatives (e.g., tamoxifen, toremifene, droloxifene, 3-hydroxytamoxifen, idoxifene, TAT-59 (a phosphorylated derivative of 4-hydroxytamoxifen) and GW5638 (a carboxylic acid derivative of tamoxifen)); non-steroidal estrogen receptor modulators (e.g., raloxifene, LY353381 (SERM3) and LY357489); steroidal estrogen receptor modulators (e.g., ICI-182,780). Aromatase inhibitors include steroidal aromatase inhibitors and non-steroidal aromatase inhibitors. Steroidal aromatase inhibitors include, but are not limited to, exemestane. Non-steroidal aromatase inhibitors include, but are not limited to, anastrozole and letrozole.

In certain embodiments, compounds disclosed herein are used in combination with one or more passive immunotherapies, including but not limited to, naked monoclonal antibody drugs and conjugated monoclonal antibody drugs. Examples of naked monoclonal antibody drugs that can be used include, but are not limited to, rituximab, an antibody against the CD20 antigen; trastuzumab, an antibody against the HER2 protein; alemtuzumab, an antibody against the CD52 antigen; cetuximab, an antibody against the EGFR protein; and bevacizumab which is an anti-angiogenesis inhibitor of VEGF protein.

Examples of conjugated monoclonal antibodies include, but are not limited to, radiolabeled antibody ibritumomab tiuxetan; radiolabeled antibody tositumomab; and immunotoxin gemtuzumab ozogamicin which contains calicheamicin; BL22, an anti-CD22 monoclonal antibody-immunotoxin conjugate; radiolabeled antibodies such as OncoScint (Registered trademark) and ProstaScint (Registered trademark); brentuximab vedotin; and ado-trastuzumab emtansine.

Further examples of therapeutic antibodies that can be used include, but are not limited to, abciximab, an antibody against the glycoprotein IIb/IIIa receptor on platelets; daclizumab, an immunosuppressive, humanized anti-CD25 monoclonal antibody; edrecolomab, a murine anti-17-IA cell surface antigen IgG2a antibody; BEC2, a murine anti-idiotype (GD3 epitope) IgG antibody; IMC-C225, a chimeric anti-EGFR IgG antibody; VITAXIN (Registered Trademark) a humanized anti-aVbeta 3 integrin antibody; Campath 1H/LDP-03, a humanized anti CD52 IgG1 antibody; Smart M195, a humanized anti-CD33 IgG antibody; epratuzumab, a humanized anti-CD22 IgG antibody; Lymphoscan; visilizumab; CM3, a humanized anti-ICAM3 antibody; IDEC-114 a primatized anti-CD80 antibody; IDEC-131 a humanized anti-CD40L antibody; IDEC-151 a primatized anti-CD4 antibody; IDEC-152 a primatized anti-CD23 antibody; SMART anti-CD3, a humanized anti-CD3 IgG; 5G1.1, a humanized anti-complement factor 5 (C5) antibody; D2E7, a humanized anti-TNF-alpha antibody; CDP870, a humanized anti-TNF-alpha Fab fragment; IDEC-151, a primatized anti-CD4 IgG1 antibody; MDX-CD4, a human anti-CD4 IgG antibody; CD20-streptdavidin (+biotin-yttrium 90); CDP571, a humanized anti-TNF-alpha IgG4 antibody; LDP-02, a humanized anti-alpha 4beta 7 antibody; OrthoClone OKT4A, a humanized anti-CD4 IgG antibody; ANTOVA (Registered Trademark), a humanized anti-CD40L IgG antibody; ANTEGREN (Registered Trademark), a humanized anti-VLA-4 IgG antibody; and CAT-152, a human anti-TGF-beta 2 antibody.

In some embodiments, the second therapeutic agent for use in combination with a compound disclosed herein, or a pharmaceutically acceptable salt thereof, include one or more of the following: abiraterone; abarelix; adriamycin; actinomycin; acivicin; aclarubicin; acodazole hydrochloride; acronine; adozelesin; aldesleukin; alemtuzumab; allopurinol; alitretinoin; altretamine; ambomycin; ametantrone acetate; aminoglutethimide; aminolevulinic acid; amifostine; amsacrine; anastrozole; anthramycin; aprepitant; arsenic trioxide; asparaginase; asperlin; azacitidine; azetepa; azotomycin; batimastat; bendamustine hydrochloride; benzodepa; bevacizumab; bexarotene; bicalutamide; bisantrene hydrochloride; bisnafide dimesylate; bizelesin; bleomycin; bleomycin sulfate; bortezomib; brequinar sodium; bropirimine; busulfan; cactinomycin; calusterone; caracemide; carbetimer; carboplatin; carmustine; carubicin hydrochloride; carzelesin; capecitabine; cedefingol; cetuximab; chlorambucil; cirolemycin; cisplatin; cladribine; clofarabine; crisnatol mesylate; cyclophosphamide; cytarabine; dacarbazine; dasatinib; daunorubicin hydrochloride; dactinomycin; darbepoetin alfa; decitabine; degarelix; denileukin diftitox; dexormaplatin; dexrazoxane hydrochloride; dezaguanine; dezaguanine mesylate; diaziquone; docetaxel; doxorubicin; doxorubicin hydrochloride; droloxifene; droloxifene citrate; dromostanolone propionate; duazomycin; edatrexate; eflornithine hydrochloride; elsamitrucin; eltrombopag olamine; enloplatin; enpromate; epipropidine; epirubicin hydrochloride; epoetin alfa; erbulozole; erlotinib hydrochloride; esorubicin hydrochloride; estramustine; estramustine phosphate sodium; etanidazole; etoposide; etoposide phosphate; etoprine; everolimus; exemestane; fadrozole hydrochloride; fazarabine; fenretinide; filgrastim; floxuridine; fludarabine phosphate; fluorouracil; fluorocitabine; fosquidone; fostriecin sodium; fulvestrant; gefitinib; gemcitabine; gemcitabine hydrochloride; gemcitabine cisplatin; gemtuzumab ozogamicin; goserelin acetate; histrelin acetate; hydroxyurea; idarubicin hydrochloride; ifosfamide; limofosine; ibritumomab tiuxetan; idarubicin; ifosfamide; imatinib mesylate; imiquimod; interleukin I1 (including recombinant interleukin II, or rIL2), interferon alfa-2a; interferon alfa-2b; interferon alfa-n1; interferon alfa-n3; interferon beta-1a; interferon gamma-1b; iproplatin; irinotecan hydrochloride; ixabepilone; lanreotide acetate; lapatinib; lenalidomide; letrozole; leuprolide acetate; leucovorin calcium; leuprolide acetate; levamisole; liposomal cytarabine; liarozole hydrochloride; lometrexol sodium; lomustine; losoxantrone hydrochloride; masoprocol; maytansine; mechlorethamine hydrochloride; megestrol acetate; melengestrol acetate; melphalan; menogaril; mercaptopurine; methotrexate; methotrexate sodium; methoxsalen; metoprine; meturedepa; mitindomide; mitocarcin; mitocromin; mitogillin; mitomalcin; mitomycin C; mitosper; mitotane; mitoxantrone hydrochloride; mycophenolic acid; nandrolone phenpropionate; nelarabine; nilotinib; nocodazole; nofetumomab; nogalamycin; ofatumumab; oprelvekin; ormaplatin; oxaliplatin; oxisuran; paclitaxel; palifermin; palonosetron hydrochloride; pamidronate; pegfilgrastim; pemetrexed disodium; pentostatin; panitumumab; pazopanib hydrochloride; pemetrexed disodium; plerixafor; pralatrexate; pegaspargase; peliomycin; pentamustine; peplomycin sulfate; perfosfamide; pipobroman; piposulfan; piroxantrone hydrochloride; plicamycin; plomestane; porfimer sodium; porfiromycin; prednimustine; procarbazine hydrochloride; puromycin; puromycin hydrochloride; pyrazofurin; quinacrine; raloxifene hydrochloride; rasburicase; recombinant HPV bivalent vaccine; recombinant HPV quadrivalent vaccine; riboprine; rogletimide; rituximab; romidepsin; romiplostim; safingol; safingol hydrochloride; sargramostim; semustine; simtrazene; sipuleucel-T; sorafenib; sparfosate sodium; sparsomycin; spirogermanium hydrochloride; spiromustine; spiroplatin; streptonigrin; streptozocin; sulofenur; sunitinib malate; talisomycin; tamoxifen citrate; tecogalan sodium; tegafur; teloxantrone hydrochloride; temozolomide; temoporfin; temsirolimus; teniposide; teroxirone; testolactone; thalidomide; thiamiprine; thioguanine; thiotepa; tiazofurin; tirapazamine; topotecan hydrochloride; toremifene; tositumomab and I 131 Iodine tositumomab; trastuzumab; trestolone acetate; tretinoin; triciribine phosphate; trimetrexate; trimetrexate glucuronate; triptorelin; tubulozole hydrochloride; uracil mustard; uredepa; valrubicin; vapreotide; verteporfin; vinblastine; vinblastine sulfate; vincristine sulfate; vindesine; vindesine sulfate; vinepidine sulfate; vinglycinate sulfate; vinleurosine sulfate; vinorelbine tartrate; vinrosidine sulfate; vinzolidine sulfate; vorinostat; vorozole; zeniplatin; zinostatin; zoledronic acid; and zorubicin hydrochloride.

In some embodiments, the second therapeutic agent is an alkylating agent. Examples of alkylating agents for use in combination with a compound disclosed herein, or a pharmaceutically acceptable salt thereof, include, but are not limited to, nitrogen mustards (e.g., mechloroethamine, cyclophosphamide, chlorambucil, meiphalan, etc.), ethylenimine and methylmelamines (e.g., hexamethlymelamine, thiotepa), alkyl sulfonates (e.g., busulfan), nitrosoureas (e.g., carmustine, lomusitne, semustine, streptozocin, etc.), or triazenes (decarbazine, etc.).

Other agents that are optionally used in the methods and compositions described herein for the treatment or prevention of cancer include platinum coordination complexes (e.g., cisplatin, carboblatin), anthracenedione (e.g., mitoxantrone), substituted urea (e.g., hydroxyurea), methyl hydrazine derivative (e.g., procarbazine), adrenocortical suppressant (e.g., mitotane, aminoglutethimide).

In some embodiments, the second therapeutic agent is an immunotherapy agent. Examples of immunotherapy agents for use in combination with a compound disclosed herein, or a pharmaceutically acceptable salt thereof, include, but are not limited to, checkpoint inhibitors (e.g., anti-PD1 and anti-PD-L1 inhibitors), cancer vaccines (e.g., sipuleucel-T), oncolytic viruses (e.g., talimogene laherparepvec), cytokines (e.g., IL-2 and INF-alpha), CAR-T cells.

In some embodiments, the second therapeutic agent is an immune checkpoint inhibitors.

In some embodiments, the immune checkpoint inhibitor is selected from the group consisting of PD-1 inhibitors, PD-L1 inhibitors, PD-L2 inhibitors, CTLA-4 inhibitors, OX40 agonists, and 4-1BB agonists.

In some embodiments, the checkpoint inhibitors is a programmed cell death protein 1 (PD-1) inhibitor or a programmed cell death ligand 1 (PD-L1) inhibitor. In some embodiments, the PD-1 inhibitor or the PD-L1 inhibitor is an antibody or antigen-binding fragment against PD-1 or PD-L1.

In some embodiments, the PD-1 inhibitor is selected from pembrolizumab, nivolumab, cemiplimab, lambrolizumab, AMP-224, sintilimab, toripalimab, camrelizumab, tislelizumab, dostarlimab (GSK), PDR001 (Novartis), MGA012 (Macrogenics/Incyte), GLS-010 (Arcus/Wuxi), AGEN2024 (Agenus), cetrelimab (Janssen), ABBV-181 (Abbvie), AMG-404 (Amgen). BI-754091 (Boehringer Ingelheim), CC-90006 (Celgene), JTX-4014 (Jounce), PF-06801591 (Pfizer), and genolimzumab (Apollomics/Genor BioPharma). In some embodiments, the PD-1 inhibitor is pembrolizumab. In some embodiments, the PD-1 inhibitor is nivolumab. In some embodiments, the PD-1 inhibitor is cemiplimab. In some embodiments, the PD-1 inhibitor is lambrolizumab. In some embodiments, the PD-1 inhibitor is AMP-224. In some embodiments, the PD-1 inhibitor is sintilimab.

In some embodiments, the PD-1 inhibitor is toripalimab. In some embodiments, the PD-1 inhibitor is camrelizumab. In some embodiments, the PD-1 inhibitor is tislelizumab.

In some embodiments, the PD-L1 inhibitor is selected from atezolizumab, avelumab, and durvalumab, ASC22 (Alphamab/Ascletis), CX-072 (Cytomx), CS1001 (Cstone), cosibelimab (Checkpoint Therapeutics), INCB86550 (Incyte), and TG-1501 (TG Therapeutics). In some embodiments, the PD-L1 inhibitor is atezolizumab. In some embodiments, the PD-L1 inhibitor is avelumab. In some embodiments, the PD-L1 inhibitor is durvalumab.

In some embodiments, the immune checkpoint inhibitor is a cytotoxic T-lymphocyte protein 4 (CTLA4) inhibitor. In some embodiments, the CTLA4 inhibitor is an antibody or antigen-binding fragment against CTLA4. In some embodiments, the CTLA4 inhibitor is ipilimumab or tremelimumab.

In some embodiments, the immune checkpoint inhibitor is a CTLA-4 inhibitor. In some embodiments, the CTLA-4 inhibitor is selected from tremelimumab, ipilimumab, and AGEN-1884 (Agenus). In some embodiments, the CTLA-4 inhibitor is tremelimumab. In some embodiments, the e CTLA-4 inhibitor is ipilimumab.

In some embodiments, the checkpoint inhibitors is a programmed cell death ligand 2 (PD-L2) inhibitor.

In some embodiments, the immune checkpoint inhibitor is a OX40 agonist.

In some embodiments, the immune checkpoint inhibitor is a 4-1BB agonist.

In some embodiments, a compound disclosed herein, or a pharmaceutically acceptable salt thereof, is used in combination with anti-emetic agents to treat nausea or emesis, which results from the use of a compound disclosed herein, or a pharmaceutically acceptable salt thereof, anti-cancer agent(s) and/or radiation therapy. Anti-emetic agents include, but are not limited to: neurokinin-1 receptor antagonists, 5HT3 receptor antagonists (such as ondansetron, granisetron, tropisetron, palonosetron, and zatisetron), GABAB receptor agonists (such as baclofen), corticosteroids (such as dexamethasone, prednisone, prednisolone, or others), dopamine antagonists (such as, but not limited to, domperidone, droperidol, haloperidol, chlorpromazine, promethazine, prochlorperazine, metoclopramide), antihistamines (H1 histamine receptor antagonists, such as but not limited to, cyclizine, diphenhydramine, dimenhydrinate, meclizine, promethazine, hydroxyzine), cannabinoids (such as but not limited to, cannabis, marinol, dronabinol), and others (such as, but not limited to, trimethobenzamide; ginger, emetrol, propofol).

In some embodiments, a compound disclosed herein, or a pharmaceutically acceptable salt thereof, is used in combination with an agent useful in the treatment of anemia. Such an anemia treatment agent is, for example, a continuous eythropoiesis receptor activator (such as epoetin-α).

In some embodiments, a compound disclosed herein, or a pharmaceutically acceptable salt thereof, is used in combination with an agent useful in the treatment of neutropenia. Examples of agents useful in the treatment of neutropenia include, but are not limited to, a hematopoietic growth factor which regulates the production and function of neutrophils such as a human granulocyte colony stimulating factor, (G-CSF). Examples of a G-CSF include filgrastim.

In one embodiment, a compound disclosed herein, or a pharmaceutically acceptable salt thereof, is administered to a mammal in combination with a non-steroidal anti-inflammatory drug (NSAID). NSAIDs include, but are not limited to: aspirin, salicylic acid, gentisic acid, choline magnesium salicylate, choline salicylate, choline magnesium salicylate, choline salicylate, magnesium salicylate, sodium salicylate, diflunisal, carprofen, fenoprofen, fenoprofen calcium, fluorobiprofen, ibuprofen, ketoprofen, nabutone, ketolorac, ketorolac tromethamine, naproxen, oxaprozin, diclofenac, etodolac, indomethacin, sulindac, tolmetin, meclofenamate, meclofenamate sodium, mefenamic acid, piroxicam, meloxicam, COX-2 specific inhibitors (such as, but not limited to, celecoxib, rofecoxib, valdecoxib, parecoxib, etoricoxib, lumiracoxib, CS-502, JTE-522, L-745 337, and NS398).

In some embodiments, a compound disclosed herein, or a pharmaceutically acceptable salt thereof, is used in combination with radiation therapy (or radiotherapy). Radiation therapy is the treatment of cancer and other diseases with ionizing radiation. Radiation therapy is optionally used to treat localized solid tumors, such as cancers of the skin, tongue, larynx, brain, breast, prostate, colon, uterus, and/or cervix. It is also optionally used to treat leukemia and lymphoma (cancers of the blood-forming cells and lymphatic system, respectively).

EXAMPLES

The compounds used in the reactions described herein are made according to organic synthesis techniques known to those skilled in this art, starting from commercially available chemicals and/or from compounds described in the chemical literature. Unless otherwise noted, reagents and solvents were used as received from commercial suppliers. Anhydrous solvents and oven-dried glassware were used for synthetic transformations sensitive to moisture and/or oxygen. Yields were not optimized. Reaction times are approximate and were not optimized. Column chromatography and thin layer chromatography (TLC) were performed on silica gel unless otherwise noted.

"Commercially available chemicals" are obtained from standard commercial sources including Acros Organics (Pittsburgh, PA), Aldrich Chemical (Milwaukee, WI, including Sigma Chemical and Fluka), Apin Chemicals Ltd. (Milton Park, UK), Avocado Research (Lancashire, U.K.), BDH Inc. (Toronto, Canada), Bionet (Cornwall, U.K.), Chemservice Inc. (West Chester, PA), Crescent Chemical Co. (Hauppauge, NY), Eastman Organic Chemicals, Eastman Kodak Company (Rochester, NY), Fisher Scientific Co. (Pittsburgh, PA), Fisons Chemicals (Leicestershire, UK), Frontier Scientific (Logan, UT), ICN Biomedicals, Inc. (Costa Mesa, CA), Key Organics (Cornwall, U.K.), Lancaster Synthesis (Windham, NH), Maybridge Chemical Co. Ltd. (Cornwall, U.K.), Parish Chemical Co. (Orem, UT), Pfaltz & Bauer, Inc. (Waterbury, CT), Polyorganix (Houston, TX), Pierce Chemical Co. (Rockford, IL), Riedel de Haen AG (Hanover, Germany), Spectrum Quality Product, Inc. (New Brunswick, NJ), TCI America (Portland, OR), Trans World Chemicals, Inc. (Rockville, MD), and Wako Chemicals USA, Inc. (Richmond, VA).

Specific and analogous reactants are optionally identified through the indices of known chemicals prepared by the Chemical Abstract Service of the American Chemical Society, which are available in most public and university libraries, as well as through on-line databases (contact the American Chemical Society, Washington, D.C. for more details). Chemicals that are known but not commercially available in catalogs are optionally prepared by custom chemical synthesis houses, where many of the standard chemical supply houses (e.g., those listed above) provide custom synthesis services. A reference for the preparation and selection of pharmaceutical salts of the compounds described herein is P. H. Stahl & C. G. Wermuth "Handbook of Pharmaceutical Salts", Verlag Helvetica Chimica Acta, Zurich, 2002.

Example 1. ((R)-2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-1-hydroxy-3-(2H-tetrazol-5-yl)propan-2-yl)phosphonic acid (1)

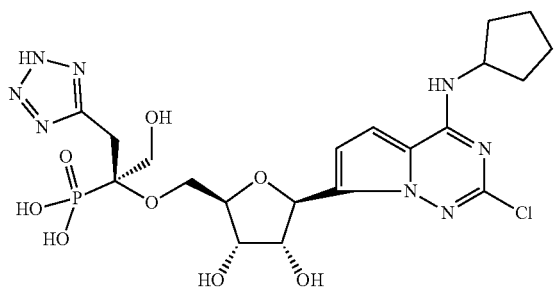 [SMILES: O=P(O)(O)[C@@](CO)(Cc1nn[nH]n1)OC[C@H]1O[C@@H](c2ccc3c(NC4CCCC4)nc(Cl)nn23)[C@H](O)[C@@H]1O]

Step A. Ethyl 2-((2-(trimethylsilyl)ethoxy)methyl)-2H-tetrazole-5-carboxylate (Ia-1) and ethyl 1-((2-(trimethylsilyl)ethoxy)methyl)-1H-tetrazole-5-carboxylate (1a-2)

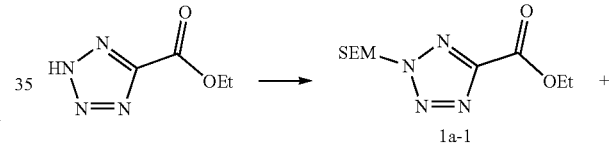

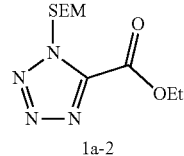

To a stirred solution of ethyl tetrazole-5-carboxylate (70 g, 493 mmol) in THF (850 mL) was added sodium hydride (60% in mineral oil, 22.7 g, 566 mmol) in three portions at 0° C. The mixture was allowed to warm to rt and stirred for 15 min. The mixture was cooled back to 0° C. and 2-(trimethylsilyl)ethoxymethyl chloride (99.4 mL, 566 mmol) was added dropwise over the period of 10 min. After the mixture was allowed to warm to rt and stirred for 2.5 h, the reaction mixture was quenched with water and extracted with EtOAc. The combined organic layer was washed (brine), dried ($Na_2SO_4$), and concentrated under reduced pressure. Purification of the residue by silica gel column chromatography (0% to 50% ethyl acetate/hexanes, a gradient elution) provided a mixture of 1a-1 and 1a-2 (114.8 g, 85%, 70:30 by $^1$H NMR) as a colorless oil.

Note: the regioisomer ratio of 1a-1 to 1a-2 is variable from 55:45 to 70:30 and the ratio depends on the reaction scale and temperature (probably higher reaction temperature would provide more 1a-1).

Step B. (2-((2-(Trimethylsilyl)ethoxy)methyl)-2H-tetrazol-5-yl)methanol (1b-1) and (1-((2-(trimethylsilyl)ethoxy)methyl)-2H-tetrazol-5-yl)methanol (1b-2)

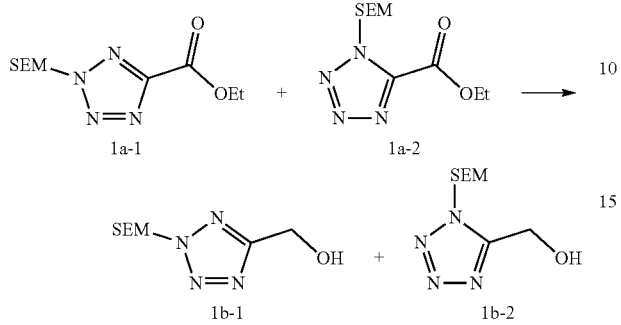

To a stirred solution of 1a-1 and 1a-2 (1a-1:1a-2=70:30, 57.4 g, 211 mmol) in MeOH (450 mL) was added NaBH₄ (15.9 g, 421 mmol) in three portions at 0° C. After stirring at 0° C. for 10 min, the reaction mixture was allowed to warm to rt and violent gas evolution was observed (exothermic reaction). The mixture was immediately put back in the ice-bath. After gas evolution was almost ceased, the reaction mixture was warmed to rt again and stirred at rt for additional 10 min. The mixture was cooled to 0° C. and then quenched with water. The solution was extracted with EtOAc, and the combined organic layer was washed (brine), dried (Na₂SO₄), and concentrated under reduced pressure to provide a mixture of 1b-1 and 1b-2 (48 g, 99%, 1b-1:1b-2=70:30) as a colorless oil.

Step C. 5-(Bromomethyl)-2-((2-(trimethylsilyl)ethoxy)methyl)-2H-tetrazole (1c-1) and 5-(Bromomethyl)-1-((2-(trimethylsilyl)ethoxy)methyl)-2H-tetrazole (1c-2)

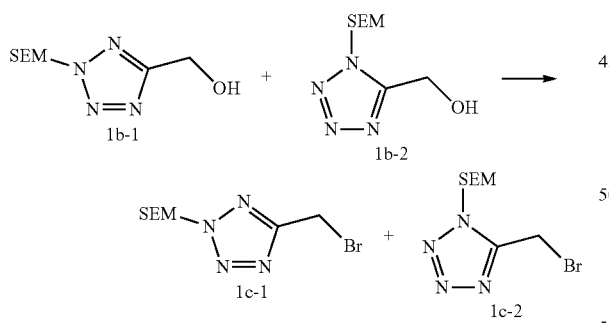

To a stirred solution of 1b-1 and 1b-2 (1b-1:1b-2=70:30, 32.8 g, 142 mmol) and triphenylphosphine (74.7 g, 285 mmol) in DCM (1 L) at −40° C. was added N-bromosuccinimide (50.7 g, 284 mmol) in three portions. After the mixture was stirred at the same temperature for 1.5 h, it was quenched by sat. NaHCO₃ aq. The solution was extracted (3×DCM), and the combined organic layer was washed (brine), dried (Na₂SO₄), and concentrated under reduced pressure to give off-white solid. The residue was suspended in hexanes (ca. 500 mL) and the suspension was vigorously stirred at rt for 1 h. The mixture was filtered and rinsed with hexanes. The filtrate was concentrated under reduced pressure and the residue was purified by silica gel column chromatography (0% to 40% ethyl acetate/hexanes, a gradient elution) to provide the title compound (1c-1) (faster eluting isomer, 25.3 g, 61%) and 1c-2 (slower eluting isomer, 11.1 g, 27%). ¹H NMR of 1c-1 (400 MHz, CDCl₃) δ ppm 5.88 (s, 2H), 4.66 (s, 2H), 3.58-3.80 (m, 2H), 0.81-1.05 (m, 2H), 0.01 (s, 9H). ¹H NMR of 1c-2 (400 MHz, CDCl₃) δ ppm 5.83 (s, 2H), 4.72 (s, 2H), 3.56-3.65 (m, 2H), 0.87-0.99 (m, 2H), 0.01 (s, 9H).

Step D. 7-Bromo-2,4-dichloropyrrolo[2,1-f][1,2,4]triazine (1d)

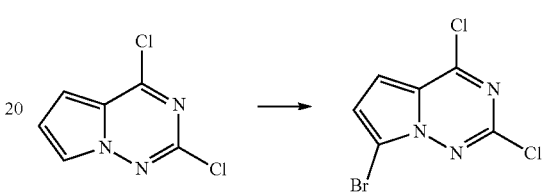

N-bromosuccinimide (3.0 g, 16.75 mmol) was added in portions to a solution of 2,4-dichloropyrrolo[1,2-f][1,2,4]triazine (3.0 g, 15.95 mmol) in acetonitrile (30 mL) over 1 h at 0° C. The reaction mixture was stirred for 2 h and concentrated. The residue was purified by column chromatography (20:1 to 10:1 petroleum ether/ethyl acetate, a gradient elution) to obtain the product isomer mixture, which was further purified by reverse phase HPLC to give the desired bromide (1d) (1.92 g, 45%) as a yellow solid. m/z (ESI, +ve ion)=266.0 [M+H]⁺.

Step E. (3aR,6R,6aR)-6-(((tert-Butyldimethylsilyl)oxy)methyl)-4-(2,4-dichloropyrrolo[2,1-f][1,2,4]triazin-7-yl)-2,2-dimethyltetrahydrofuro[3,4-d][1,3]dioxol-4-ol (1e)

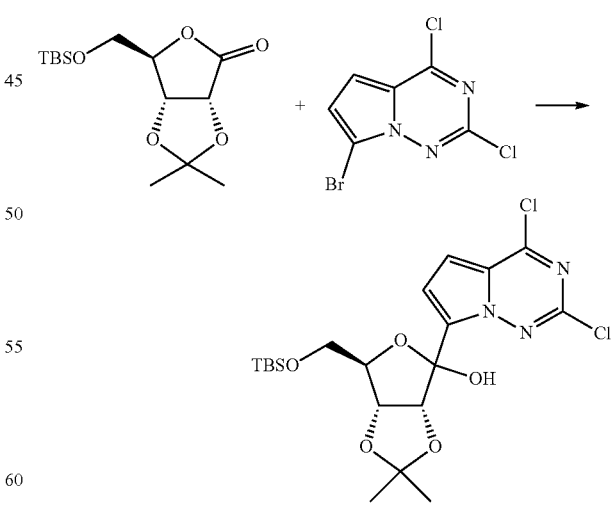

To an oven-dried flask was added (3aR,6R,6aR)-6-(((tert-butyldimethylsilyl)oxy)methyl)-2,2-dimethyldihydrofuro[3,4-d][1,3]dioxol-4(3aH)-one (5.07 g, 19.0 mmol) and 1d (8.62 g, 28.5 mmol). The combined materials were azeotroped from toluene and the resulting residue was dissolved in THF (125 mL). The mixture was cooled to −78° C. To this solution was added n-butyllithium (1.6 M in hexanes, 14.2 mL, 22.8 mmol) over 30 min with a syringe pump. After the mixture was stirred at −78° C. for 2 h, it was quenched with AcOH (1.5 mL) and warmed to rt. The resulting solution was partitioned between water and EtOAc. The organic layer was washed with brine and dried over MgSO₄, filtered and concentrated. The residue was purified by column chromatography (0-20% EtOAc/hexanes, a gradient elution) to afford an impure product (1e) as a yellow oil (12.1 g, 100%, 77% purity). m/z (ESI, +ve ion)=472.1 [M−H₂O]+.

Step F. 7-((3aS,6R,6aR)-6-(((tert-Butyldimethylsilyl)oxy)methyl)-2,2-dimethyltetrahydrofuro[3,4-d][1,3]dioxol-4-yl)-2,4-dichloropyrrolo[2,1-f][1,2,4]triazine (1f)

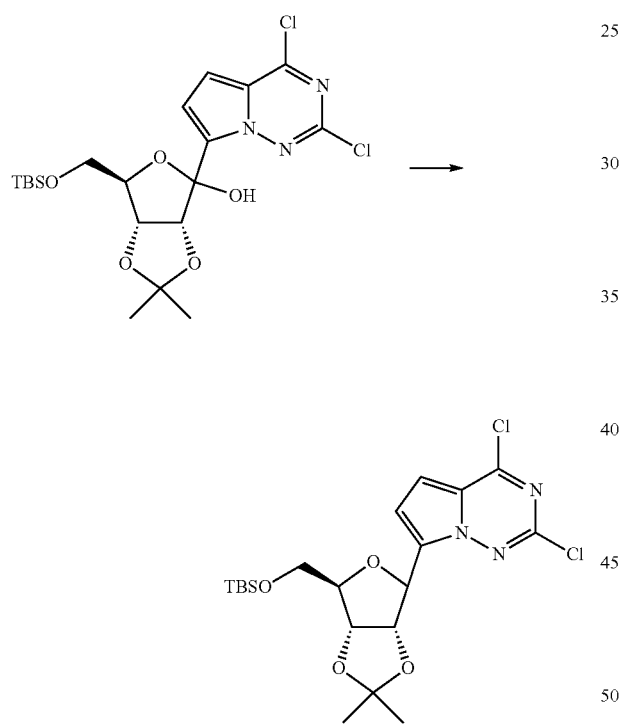

To an oven-dried flask was added 1e (12.1 g, 19.0 mmol, 77% purity) and DCM (200 mL). The solution was cooled to 0° C. and triethylsilane (12.1 mL, 76.0 mmol) was added at once. To the mixture was then added BF₃Et₂O (7.00 mL, 57.0 mmol) dropwise over 10 min. After the solution was stirred at 0° C. for 30 min, it was quenched with solid NaHCO₃ and warmed to rt. Water was added until solid NaHCO₃ fully dissolved and the organic layer was removed. The aqueous layer was extracted again with DCM and the combined organics were dried over MgSO₄ and concentrated. The resulting residue was purified by column chromatography (0-20% EtOAc/hexanes, a gradient elution) to provide a mixture of diastereomers (1f) (4.60 g, 51.0%). m/z (ESI, +ve ion)=474.1 [M+H]⁺.

Step G. 7-((3aS,6R,6aR)-6-(((tert-Butyldimethylsilyl)oxy)methyl)-2,2-dimethyltetrahydrofuro[3,4-d][1,3]dioxol-4-yl)-2-chloro-N-cyclopentylpyrrolo[2,1-f][1,2,4]triazin-4-amine (1g)

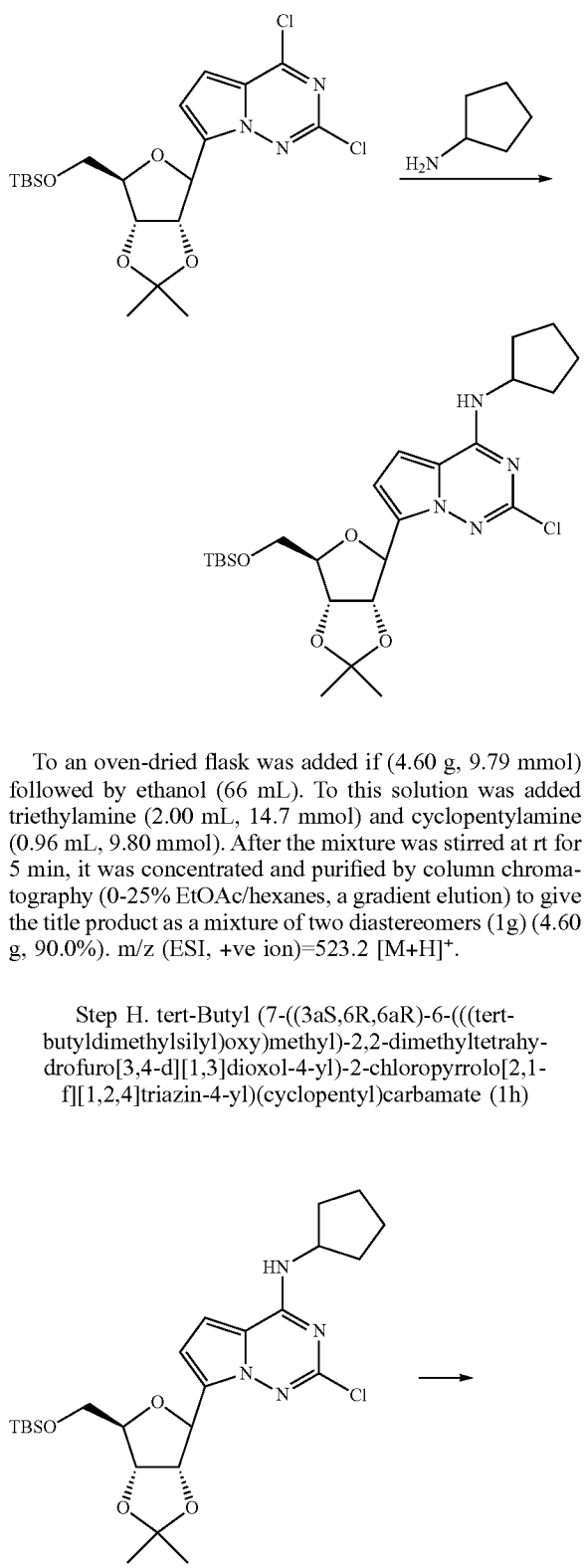

To an oven-dried flask was added 1f (4.60 g, 9.79 mmol) followed by ethanol (66 mL). To this solution was added triethylamine (2.00 mL, 14.7 mmol) and cyclopentylamine (0.96 mL, 9.80 mmol). After the mixture was stirred at rt for 5 min, it was concentrated and purified by column chromatography (0-25% EtOAc/hexanes, a gradient elution) to give the title product as a mixture of two diastereomers (1g) (4.60 g, 90.0%). m/z (ESI, +ve ion)=523.2 [M+H]⁺.

Step H. tert-Butyl (7-((3aS,6R,6aR)-6-(((tert-butyldimethylsilyl)oxy)methyl)-2,2-dimethyltetrahydrofuro[3,4-d][1,3]dioxol-4-yl)-2-chloropyrrolo[2,1-f][1,2,4]triazin-4-yl)(cyclopentyl)carbamate (1h)

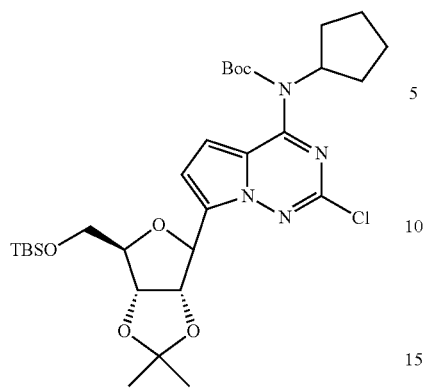

To a flask containing 1g (4.60 g, 8.79 mmol) was added THF (70 mL) followed by addition of triethylamine (3.07 mL, 22.0 mmol) and DMAP (215 mg, 1.76 mmol) at rt. To this mixture was added di-tert-butyl dicarbonate (9.6 g, 44.0 mmol). The flask was equipped with a reflux condenser and the mixture heated to 80° C. for 2 h. The mixture was cooled and then concentrated. The resulting residue was purified by column chromatography (0-20% EtOAc/hexanes, a gradient elution) to afford the product as a mixture of two diastereomers (1h) (5.40 g, 99%). m/z (ESI, +ve ion)=623.3 [M+H]$^+$.

Step I. tert-Butyl (2-chloro-7-((3aS,4R,6R,6aR)-6-(hydroxymethyl)-2,2-dimethyltetrahydrofuro[3,4-d][1,3]dioxol-4-yl)pyrrolo[2,1-f][1,2,4]triazin-4-yl)(cyclopentyl)carbamate (1i-1) and tert-butyl (2-chloro-7-((3aS,4S,6R,6aR)-6-(hydroxymethyl)-2,2-dimethyltetrahydrofuro[3,4-d][1,3]dioxol-4-yl)pyrrolo[2,1-f][1,2,4]triazin-4-yl)(cyclopentyl)carbamate (1i-2)

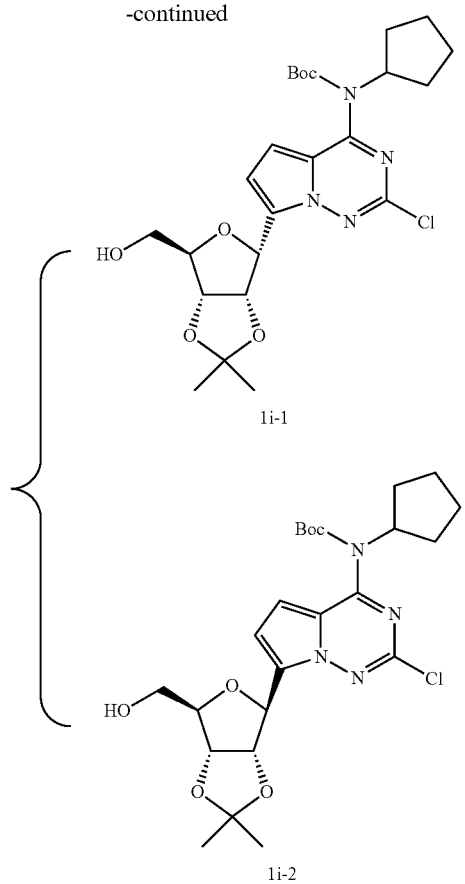

To a flask containing 1h (5.40 g, 8.66 mmol) in THF (150 mL) was added tetra-n-butylammonium fluoride (1.0 M in THF, 8.66 mL, 8.66 mmol) dropwise at 0° C. The mixture was allowed to stir at 0° C. for 30 min and then concentrated. The resulting residue was purified by silica gel column chromatography (0-10% IPA/hexanes, a gradient elution, a flow rate of 200 mL/min) and the isomers were separated. The minor diastereomer (1i-2) (1.20 g, 27.2%) eluted first from the column. m/z (ESI, +ve ion)=509.3 [M+H]$^+$. Further elution provided the title compound (1i-1) (2.52 g, 57.1%) as major diastereomer. m/z (ESI, +ve ion)=509.3 [M+H]$^+$. The structures and absolute configurations of 1i-1 and 1i-2 were assigned based on the single crystal X-ray structure of 6c-1.

Step J. Ethyl 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)acetate (1j)

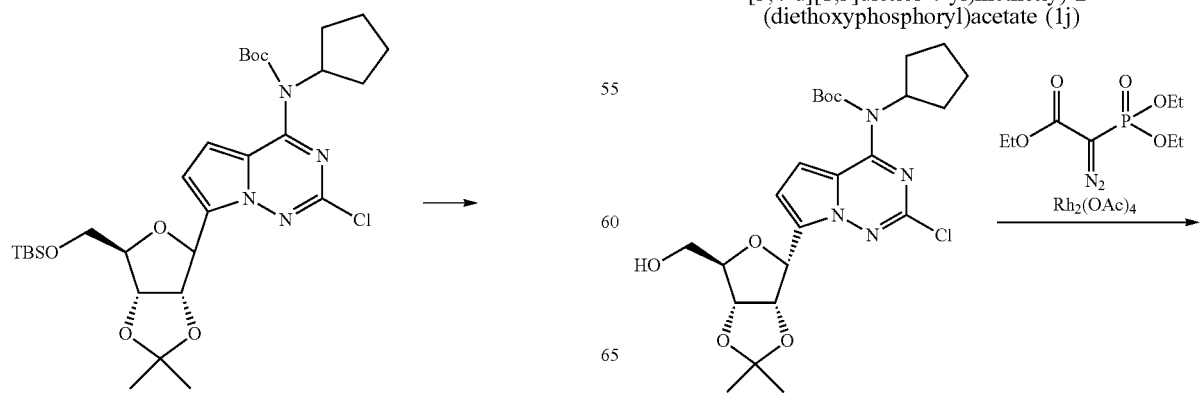

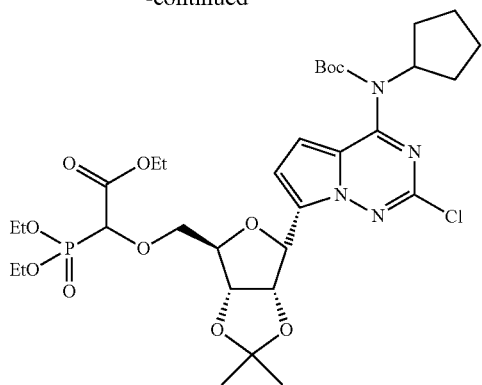

To an oven-dried flask was added 1i-1 (1.50 g, 2.95 mmol) which was azeotroped from toluene. To the flask was added toluene (25 mL) followed by ethyl 2-diazo-2-diethoxyphosphoryl-acetate (1.25 g, 5.01 mmol) and dirhodium tetraacetate (65.0 mg, 0.147 mmol). The resulting solution was degassed by bubbling argon and the vessel was capped with a reflux condenser. The reaction was heated at 100° C. for 3 h and then cooled to rt. The mixture was concentrated and the residue was purified by column chromatography (0-15% IPA/hexanes, a gradient elution) to afford the product (1j) as a yellow oil (2.09 g, 97.0%). m/z (ESI, +ve ion)=731.3 [M+H]$^+$.

Step K. Ethyl 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-(2-((2-(trimethylsilyl)ethoxy)methyl)-2H-tetrazol-5-yl)propanoate (1k)

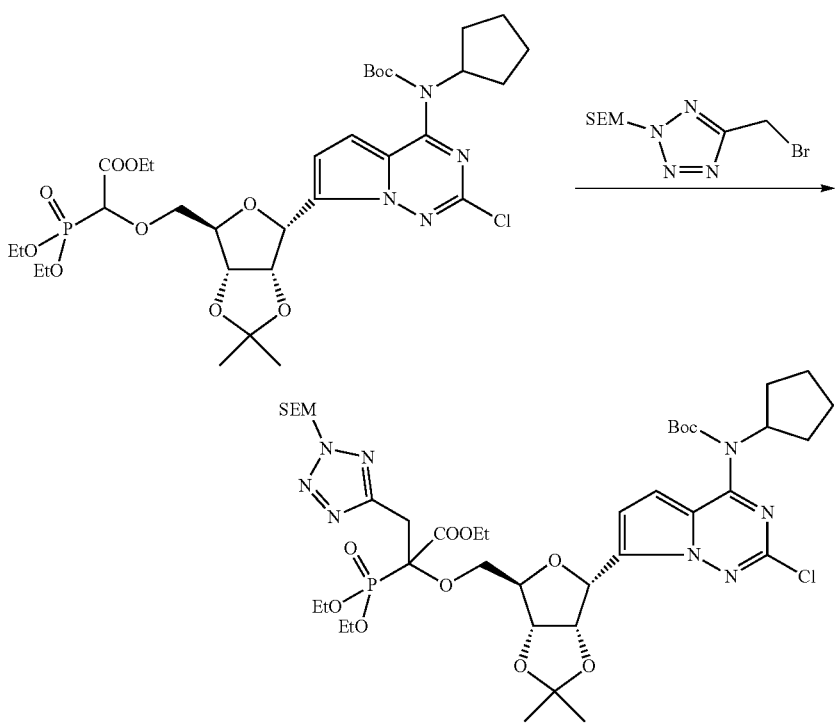

To stirred solution of 1j (3.54 g, 4.85 mmol) in THF (74 mL) at −15° C. (ice/salt bath) was added sodium bis(trimethylsilyl)amide (1 M in THF, 6.3 mL, 6.3 mmol). After the mixture was stirred at −15° C. for 25 min, TBAI (895 mg, 2.42 mmol) was added, followed by dropwise addition of a THF solution of 1c (2 mL). The mixture was stirred at −15° C. for 2 h and then quenched with Sat. NH$_4$Cl. The solution was extracted with EtOAc and the combined organics were washed with brine, dried over MgSO$_4$, filtered and concentrated. The residue was purified by column chromatography (30-70% EtOac/hexanes, a gradient elution) to afford the product (1k) as a yellow oil (3.15 g, 68.8%). m/z (ESI, +ve ion)=943.4 [M+H]$^+$.

Step L. Ethyl (R)-2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-(2-((2-(trimethylsilyl)ethoxy)methyl)-2H-tetrazol-5-yl)propanoate (1l-1) and ethyl (S)-2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-(2-((2-(trimethylsilyl)ethoxy)methyl)-2H-tetrazol-5-yl)propanoate (1l-2)

Step M. tert-butyl (2-Chloro-7-((3aS,4R,6R,6aR)-6-(((((R)-2-(diethoxyphosphoryl)-1-hydroxy-3-(2-((2-(trimethylsilyl)ethoxy)methyl)-2H-tetrazol-5-yl)propan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate

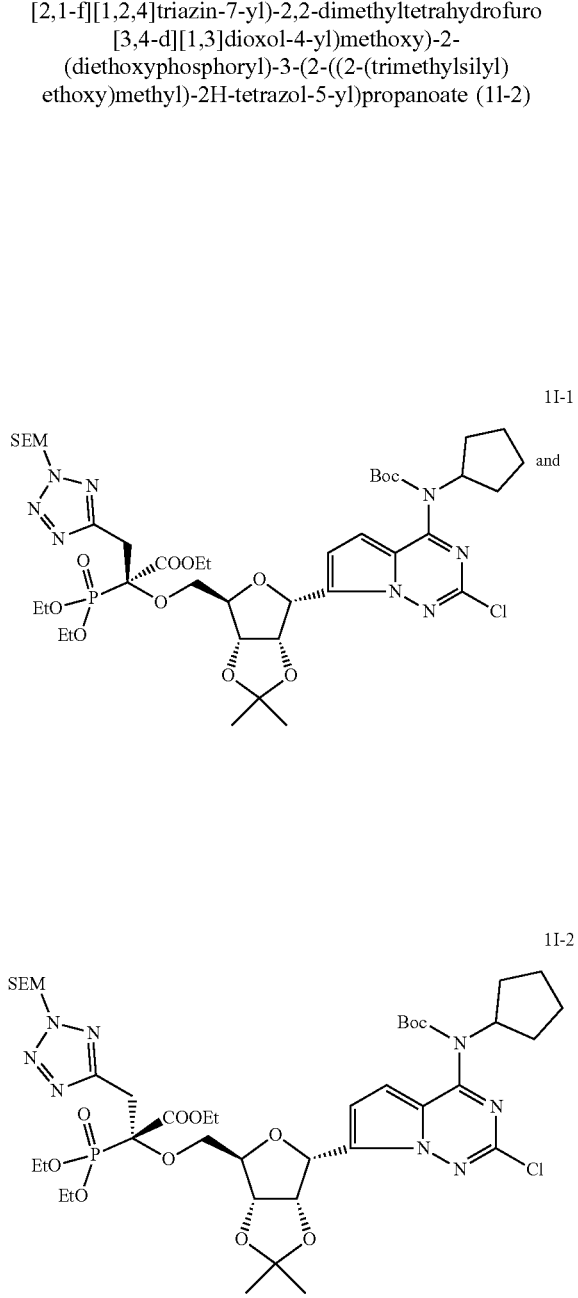

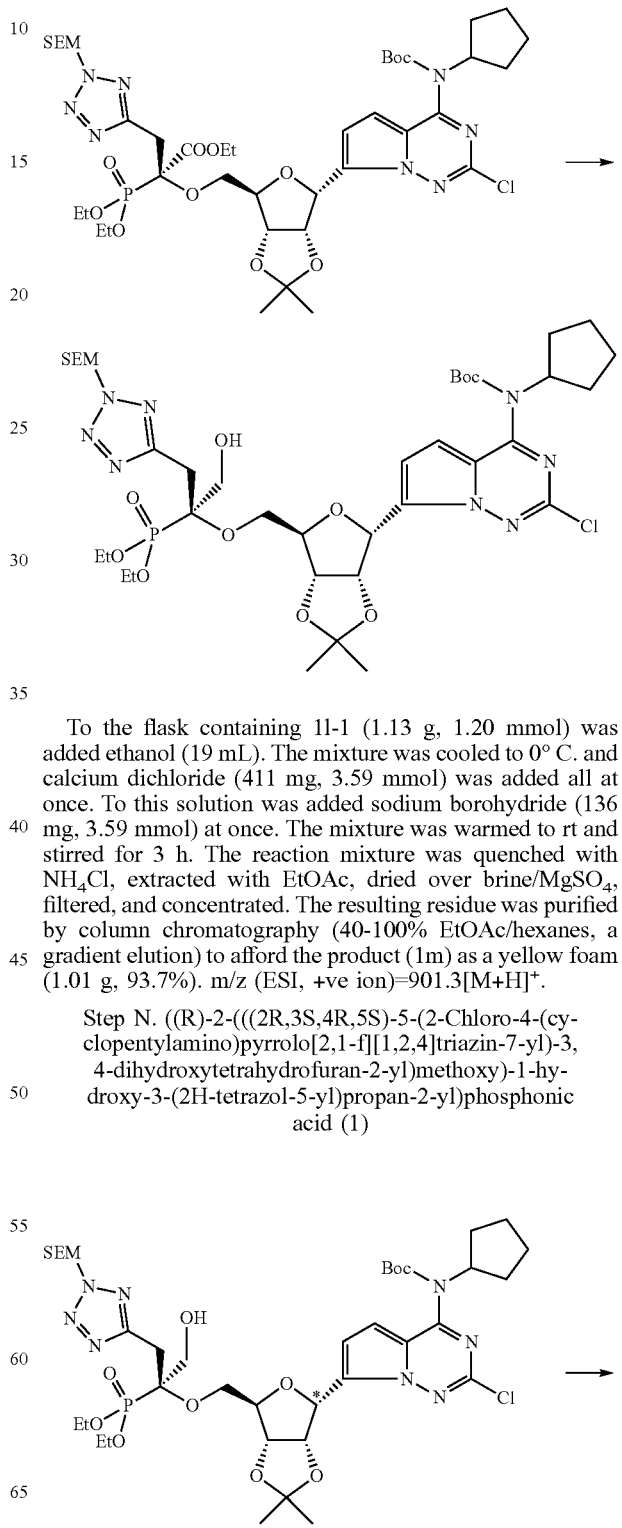

Diastereomers were separated by chiral column (CHIRALPAK AD-H, 21×250 mm, 5 μm, 10% IPA/hexanes, an isocratic elution, a flow rate of 20 mL/min). The diastereomer eluting first from the column was arbitrarily assigned as 1l-2 (retention time of 6.75 min) and the other isomer eluting second was arbitrarily assigned as 1l-1 (retention time of 12.0 min).

To the flask containing 1l-1 (1.13 g, 1.20 mmol) was added ethanol (19 mL). The mixture was cooled to 0° C. and calcium dichloride (411 mg, 3.59 mmol) was added all at once. To this solution was added sodium borohydride (136 mg, 3.59 mmol) at once. The mixture was warmed to rt and stirred for 3 h. The reaction mixture was quenched with NH$_4$Cl, extracted with EtOAc, dried over brine/MgSO$_4$, filtered, and concentrated. The resulting residue was purified by column chromatography (40-100% EtOAc/hexanes, a gradient elution) to afford the product (1m) as a yellow foam (1.01 g, 93.7%). m/z (ESI, +ve ion)=901.3[M+H]$^+$.

Step N. ((R)-2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-1-hydroxy-3-(2H-tetrazol-5-yl)propan-2-yl)phosphonic acid (1)

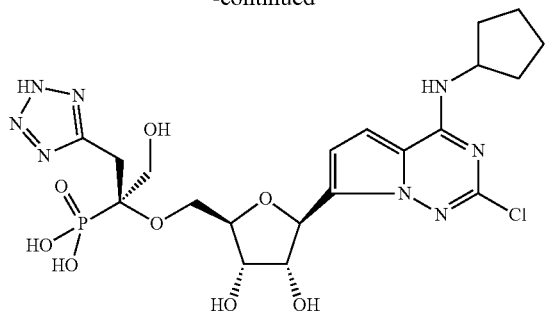

To a solution of 1m (586 mg, 0.65 mmol) in MeCN (30 mL) was added triethylamine (1.36 mL, 9.75 mmol), followed by TMSBr (0.85 mL, 6.50 mmol) under Ar. After the solution was stirred for 6 h, it was concentrated under reduced pressure. The resulting residue was dissolved in water/TFA (1/1, 30 mL) and the reaction mixture was stirred at rt for 1 h. The mixture was concentrated and the residue was purified by reverse phase HPLC(20-32% ACN/H$_2$O, 0.1% TFA, a gradient elution) to provide the title product (1) as a TFA salt (264 mg, 59.0%). m/z (ESI, +ve ion)=575.2 [M+H]$^+$. $^1$H NMR (400 MHz, MeOD) δ ppm 6.83-6.95 (m, 1H), 6.62-6.83 (m, 1H), 5.30-5.61 (m, 1H), 4.48-4.58 (m, 1H), 4.39-4.45 (m, 1H), 4.07-4.24 (m, 4H), 3.58-3.79 (m, 3H), 3.43-3.54 (m, 1H), 2.01-2.15 (m, 2H), 1.73-1.87 (m, 2H),° 1.54-1.72 (m, 4H).

Note: The isomerization at the indicated carbon (*) in 1m was observed in Step N. The structures and absolute configurations of 1 were assigned based on the cocrystal X-ray structure of 15 with CD73 protein.

Example 2. ((S)-2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-1-hydroxy-3-(2H-tetrazol-5-yl)propan-2-yl)phosphonic acid (2)

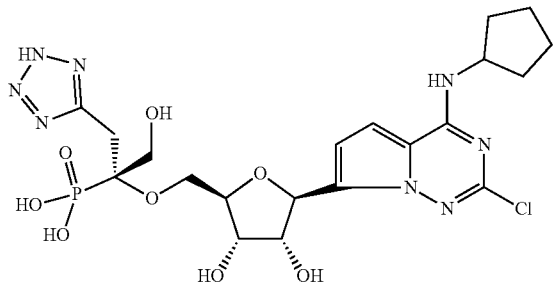 [SMILES: O=P(O)(O)[C@](CO)(Cc1nn[nH]n1)OC[C@H]1O[C@@H](c2ccc3c(NC4CCCC4)nc(Cl)nn23)[C@H](O)[C@@H]1O]

The title compound was prepared from 1l-2 by procedures similar to those described in Example 1, Steps M and N. m/z (ESI, +ve ion)=572.2 [M+H]$^+$. $^1$H NMR (400 MHz, MeOD) δ ppm 6.86-6.97 (m, 1H), 6.64-6.84 (m, 1H), 5.34 (d, J=6.14 Hz, 1H), 4.51-4.61 (m, 2H), 4.21-4.30 (m, 2H), 4.02-4.18 (m, 3H), 3.83-3.92 (m, 1H), 3.58-3.70 (m, 1H), 3.36-3.48 (m, 1H), 2.02-2.16 (m, 2H), 1.74-1.87 (m, 2H), 1.56 (m, 4H).

Example 3. ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxy-3-(2H-tetrazol-5-yl)propan-2-yl) phosphonic acid (3)

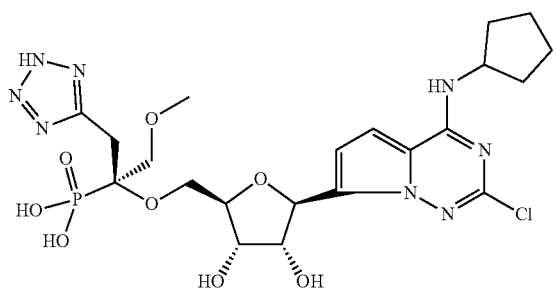 [SMILES: COC[C@](Cc1nn[nH]n1)(OC[C@H]1O[C@@H](c2ccc3c(NC4CCCC4)nc(Cl)nn23)[C@H](O)[C@@H]1O)P(=O)(O)O]

Step A. tert-Butyl (2-chloro-7-((3aS,4R,6R,6aR)-6-((((R)-2-(diethoxyphosphoryl)-1-methoxy-3-(2-((2-(trimethylsilyl)ethoxy)methyl)-2H-tetrazol-5-yl)propan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate (3a)

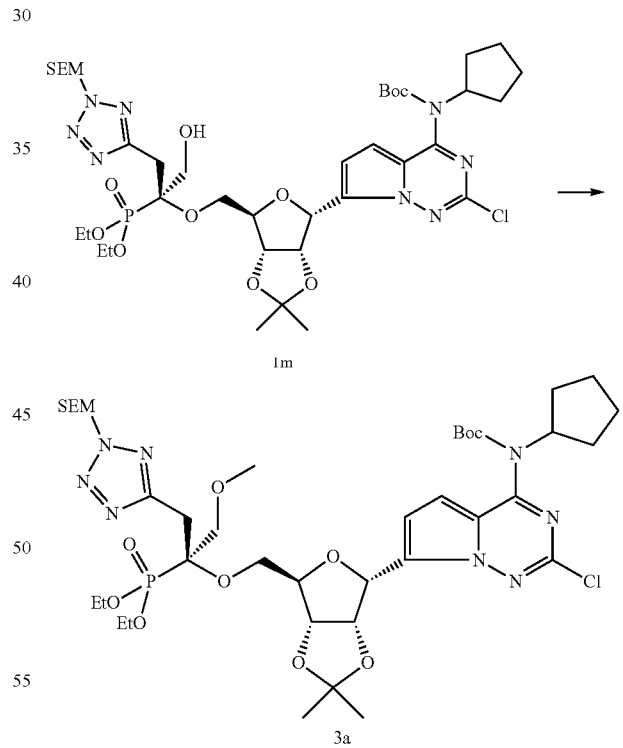

To a solution of 1m (100 mg, 0.111 mmol) in DMF (1 mL) was added methyl iodide (0.07 mL, 1.11 mmol). The reaction mixture was cooled to 0° C. and sodium hydride (60% in mineral oil, 13.3 mg, 0.333 mmol) was added in one portion. After the reaction mixture was stirred at 0° C. for 10 min, the mixture was quenched with sat. NH$_4$Cl and the aqueous solution was extracted with EtOAc. The combined organic layers were dried with brine and MgSO$_4$, filtered, and concentrated. The resulting residue was purified by column chromatography (30-100% EtOAc/hexanes, a gradient elution) to afford the product (3a) as a foamy yellow oil (100 mg, 98.5%). m/z (ESI, +ve ion)=915.4 [M+H]⁺.

Step B. ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-methoxy-3-(2H-tetrazol-5-yl)propan-2-yl)phosphonic acid (3)

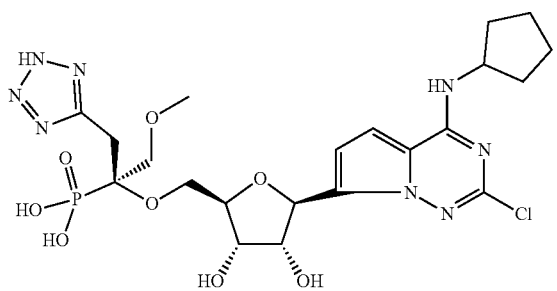 [SMILES: COC[C@](Cc1nn[nH]n1)(OC[C@H]1O[C@@H](c2ccc3c(NC4CCCC4)nc(Cl)nn23)[C@H](O)[C@@H]1O)P(=O)(O)O]

The title compound was prepared from 3a by procedure similar to that described in Example 1, Step N. m/z (ESI, +ve ion)=589.2 [M+H]⁺. ¹H NMR (400 MHz, MeOD) δ ppm 6.86-6.96 (m, 1H), 6.64-6.84 (m, 1H), 5.29-5.35 (m, 1H), 4.49-4.58 (m, 2H), 4.27-4.32 (m, 1H), 4.14-4.21 (m, 2H,) 4.01-4.07 (m, 1H), 3.68-3.75 (m, 1H), 3.56-3.62 (m, 1H), 3.49-3.54 (m, 2H), 3.19-3.22 (m, 3H), 2.02-2.16 (m, 2H), 1.74-1.86 (m, 2H), 1.54-1.72 (m, 4H).

Example 4. ((S)-2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-1-methoxy-3-(2H-tetrazol-5-yl)propan-2-yl)phosphonic acid (4)

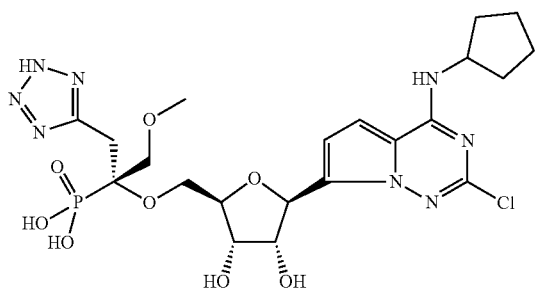 [SMILES: COC[C@@](Cc1nn[nH]n1)(OC[C@H]1O[C@@H](c2ccc3c(NC4CCCC4)nc(Cl)nn23)[C@H](O)[C@@H]1O)P(=O)(O)O]

The title compound was prepared from 1l-2 by procedures similar to those described in Example 1, Step M followed by Steps A and B in Example 3. m/z (ESI, +ve ion)=589.2 [M+H]⁺. ¹H NMR (400 MHz, MeOD) δ ppm 6.87-6.97 (m, 1H), 6.64-6.85 (m, 1H), 5.33-5.37 (m, 1H), 4.56-4.61 (m, 1H), 4.52-4.56 (m, 1H), 4.24-4.29 (m, 1H), 4.20-4.24 (m, 1H), 4.13-4.18 (m, 1H), 3.97-4.04 (m, 1H), 3.78-3.86 (m, 1H), 3.67-3.73 (m, 1H), 3.56-3.66 (m, 1H), 3.38-3.46 (m, 1H), 3.29-3.30 (m, 3H), 2.03-2.14 (m, 2H), 1.77-1.85 (m, 2H), 1.58-1.72 (m, 4H).

Example 6. ((R)-2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-1-hydroxy-3-methoxypropan-2-yl)phosphonic acid (6)

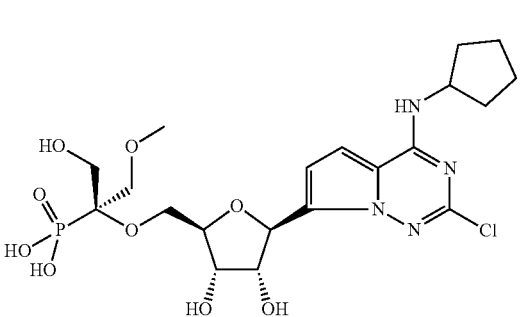 [SMILES: COC[C@](CO)(OC[C@H]1O[C@@H](c2ccc3c(NC4CCCC4)nc(Cl)nn23)[C@H](O)[C@@H]1O)P(=O)(O)O]

Step A. Ethyl 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-methoxypropanoate (6a)

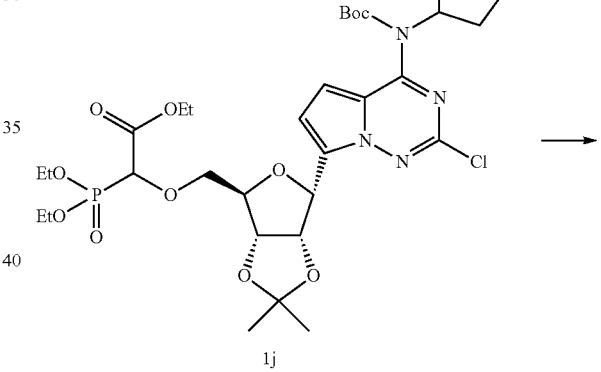

1j

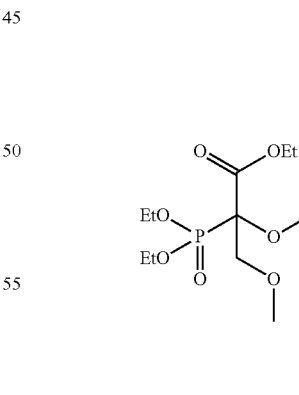 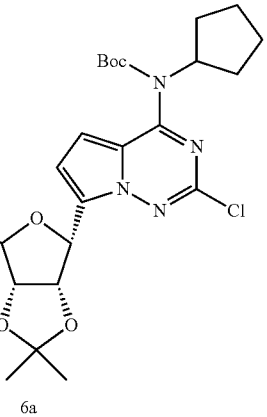

6a

To an oven-dried flask was added 1j (1 g, 1.37 mmol) and THF (24 mL). The mixture was cooled to −15° C. in a salt/ice bath. To this solution was added sodium bis(trimethylsilyl)amide (1.0 M in THF, 1.78 mL, 1.78 mmol) over 15 min. The mixture was allowed to stir at −15° C. for 30 min and TBAI (253 mg, 0.680 mmol) was added, followed by addition of MOMCl (0.33 mL, 4.8 mmol). The reaction was stirred for another hour and quenched with sat. NH4Cl. The mixture was extracted with EtOAc. The combined organics were washed with brine, dried over MgSO4, filtered, and concentrated. The residue was purified by column chromatography (20-100% EtOAc/hexanes, a gradient elution) to give the title compound (6a) (821 mg, 77.4%). m/z (ESI, +ve ion)=775.3 [M+H]+.

Step B. tert-Butyl (2-chloro-7-((3aS,4R,6R,6aR)-6-(((2-(diethoxyphosphoryl)-1-hydroxy-3-methoxypropan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate (6b)

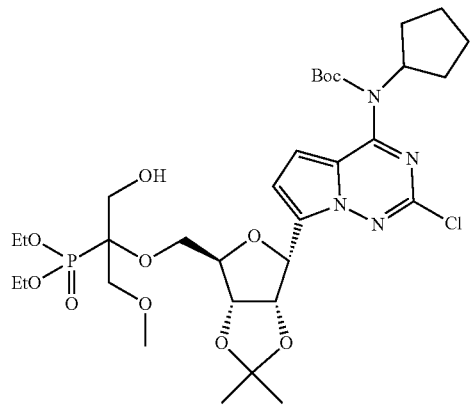 [SMILES: CCOP(=O)(OCC)C(CO)(COC)OC[C@H]1O[C@H](c2ccc3c(N(C(=O)OC(C)(C)C)C4CCCC4)nc(Cl)nn23)[C@@H]2OC(C)(C)O[C@@H]21]

The title compound was prepared from 6a by procedure similar to that described in Example 1, Step M.

Step C. tert-Butyl (2-chloro-7-((3aS,4R,6R,6aR)-6-((((R)-2-(diethoxyphosphoryl)-1-hydroxy-3-methoxypropan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate (6c-1) and tert-butyl (2-chloro-7-((3aS,4R,6R,6aR)-6-((((S)-2-(diethoxyphosphoryl)-1-hydroxy-3-methoxypropan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate (6c-2)

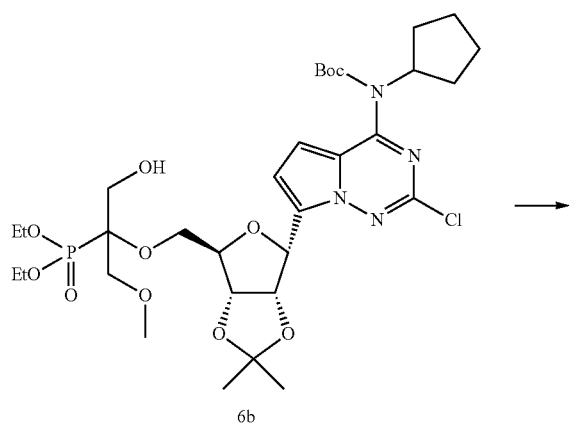

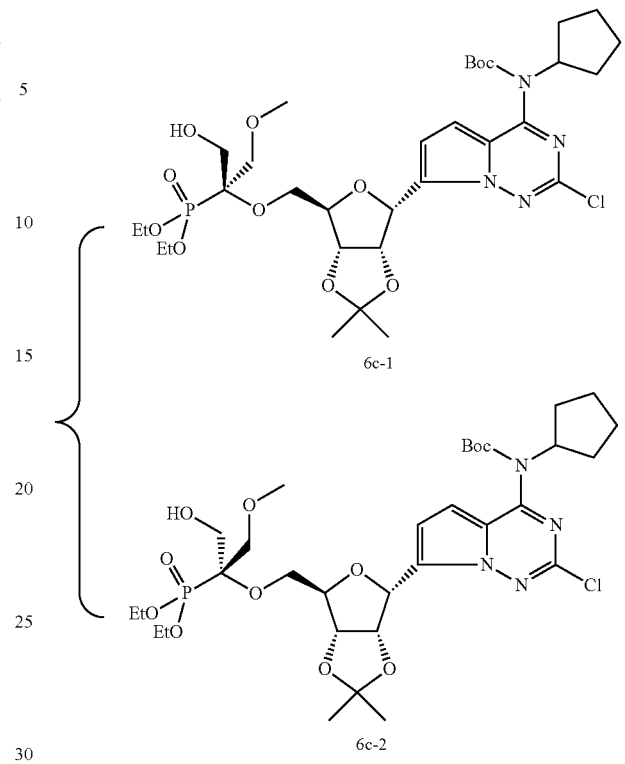

The mixture of 6c-1 and 6c-2 was prepared from 6b by procedure similar to that described in Example 1, Step L. Diastereomers were separated by chiral column (CHIRALPAK AD-H, 21×250 mm, 5 µm, 10% IPA/hexanes, an isocratic elution, a flow rate of 21 mL/min). The diastereomer eluting first from the column was assigned as 6c-2 (retention time of 7.0 min) and the other isomer eluting second was assigned as 6c-1 (retention time of 11.4 min). The structures and absolute configurations of 6c-1 and 6c-2 were assigned based on the single crystal X-ray structure of 6c-1.

Step C. ((R)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxy-3-methoxypropan-2-yl)phosphonic acid (6)

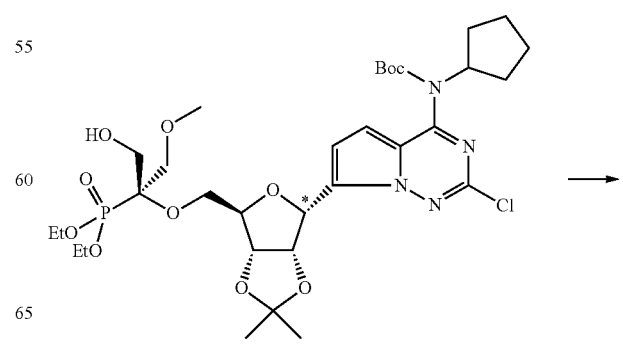

105

-continued

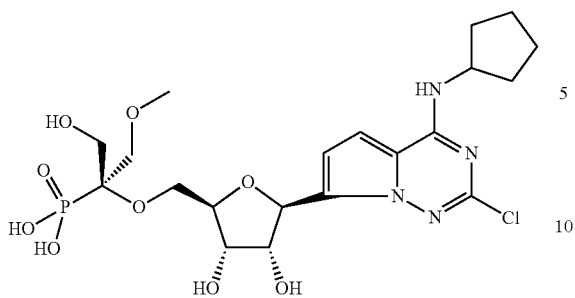

The title compound was prepared from 6c-1 by procedure similar to that described in Example 1, Step N. m/z (ESI, +ve ion)=537.2 [M+H]+. 1H NMR (400 MHz, MeOD) δ ppm 6.89-6.94 (m, 1H), 6.73-6.78 (m, 1H), 5.28-5.32 (m, 1H), 4.56 (t, J=7.09 Hz, 1H), 4.36-4.46 (m, 1H), 4.21-4.26 (m, 1H), 4.08-4.15 (m, 1H), 3.86-4.05 (m, 4H), 3.76-3.86 (m, 2H), 3.35-3.40 (m, 3H), 2.04-2.14 (m, 2H), 1.75-1.87 (m, 2H), 1.56-1.73 (m, 4H).

Note: The isomerization at the indicated carbon (*) in 6c-1 was observed in Step C. The structures and absolute configurations of 6 were assigned based on the cocrystal X-ray structure of 15 with CD73 protein.

Example 7. ((S)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1-hydroxy-3-methoxypropan-2-yl)phosphonic acid (7)

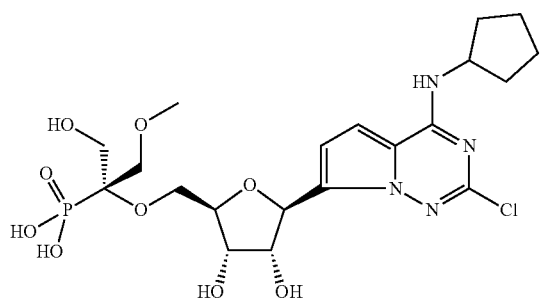 [SMILES: COC[C@@](CO)(OC[C@H]1O[C@@H](c2ccc3c(NC4CCCC4)nc(Cl)nn23)[C@H](O)[C@@H]1O)P(=O)(O)O]

The title compound was prepared from 6c-2 by procedure similar to that described in Example 1, Step N. m/z (ESI, +ve ion)=537.3 [M+H]+. 1H NMR (400 MHz, MeOD) δ ppm 6.90-6.96 (m, 1H), 6.71-6.78 (m, 1H), 5.28-5.32 (m, 1H), 4.51-4.61 (m, 1H), 4.36-4.46 (m, 1H), 4.25 (t, J=4.97 Hz, 1H), 4.05-4.16 (m, 2H), 3.87-3.97 (m, 3H), 3.75-3.84 (m, 2H), 3.37-3.40 (m, 3H), 2.04-2.14 (m, 2H), 1.75-1.87 (m, 2H), 1.56-1.73 (m, 4H).

106

Example 8. 2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-3-methoxy-2-phosphonopropanoic acid (8)

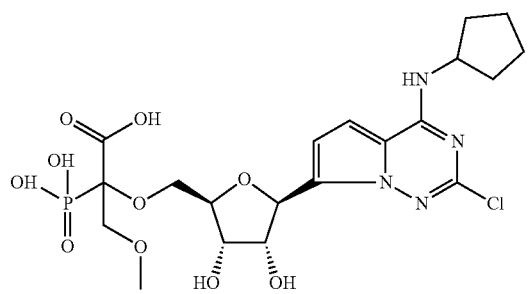 [SMILES: COCC(OC[C@H]1O[C@@H](c2ccc3c(NC4CCCC4)nc(Cl)nn23)[C@H](O)[C@@H]1O)(C(=O)O)P(=O)(O)O]

Step A. 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-methoxypropanoic acid (8a)

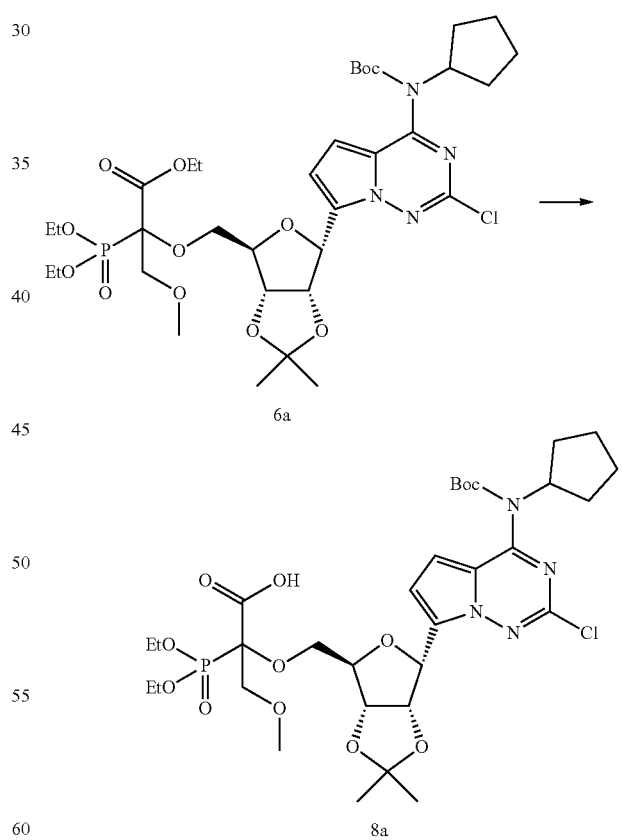

To a flask containing 6a (0.27 g, 0.35 mmol) was added THF (8.4 mL) and water (4.2 mL). To this solution was added LiOH solution (2 M aqueous solution, 0.6 mL). After the solution was allowed to stir at 40° C. overnight, it was neutralized at 0° C. and extracted with EtOAc. The organics were washed, dried, and concentrated. The crude material was taken forward without further purification. m/z (ESI, +ve ion)=547.3. [M+H]⁺.

Step B. 2-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-3-methoxy-2-phosphonopropanoic acid (8)

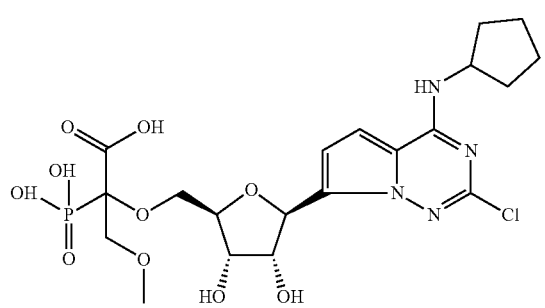 [SMILES: COCC(OC[C@H]1O[C@@H](c2ccc3c(NC4CCCC4)nc(Cl)nn23)[C@H](O)[C@@H]1O)(C(=O)O)P(=O)(O)O]

The title compound was prepared from 8a by procedure similar to that described in Example 6, Step N. m/z (ESI, +ve ion)=551.1 [M+H]⁺. ¹H NMR (400 MHz, MeOD) δ ppm 6.91-6.94 (m, 1H), 6.73-6.83 (m, 1H), 5.30-5.35 (m, 1H), 4.53-4.62 (m, 1H), 4.43-4.51 (m, 1H), 4.28-4.34 (m, 1H), 4.14-4.23 (m, 2H), 4.09-4.14 (m, 1H), 4.01-4.08 (m, 1H), 3.89-3.94 (m, 1H), 3.35-3.41 (m, 3H), 2.04-2.15 (m, 2H), 1.75-1.85 (m, 2H), 1.55-1.72 (m, 4H).

Example 9. ((S)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxypropan-2-yl)phosphonic acid

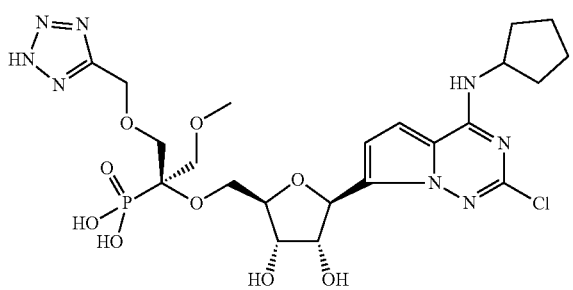 [SMILES: COC[C@](COCc1nn[nH]n1)(OC[C@H]1O[C@@H](c2ccc3c(NC4CCCC4)nc(Cl)nn23)[C@H](O)[C@@H]1O)P(=O)(O)O]

m/z (ESI, +ve ion)=619.2 [M+H]⁺. ¹H NMR (400 MHz, MeOD) δ ppm 6.85-6.92 (m, 1H), 6.68-6.75 (m, 1H,) 5.26-5.59 (m, 1H), 4.93-5.02 (m, 2H), 4.51-4.60 (m, 1H), 4.35-4.45 (m, 1H), 4.23 (t, J=5.19 Hz, 1H), 3.94-4.13 (m, 5H), 3.76-3.85 (m, 2H), 3.33-3.37 (m, 3H), 2.03-2.15 (m, 2H), 1.76-1.87 (m, 2H), 1.56-1.73 (m, 4H).

Example 10. ((R)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-methoxypropan-2-yl) phosphonic acid

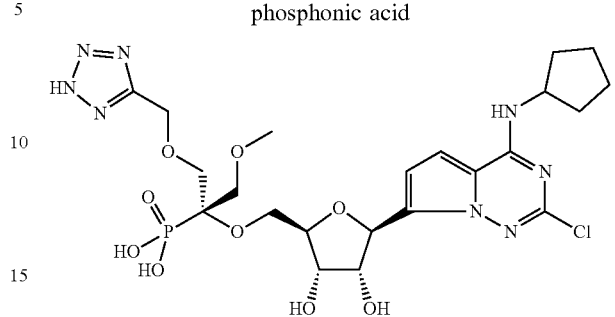

m/z (ESI, +ve ion)=619.2 [M+H]⁺. ¹H NMR (400 MHz, MeOD) δ ppm 6.86-6.93 (m, 1H), 6.68-6.75 (m, 1H), 5.29 (d, J=5.99 Hz, 1H), 4.93-5.04 (m, 2H), 4.51-4.60 (m, 1H), 4.36-4.46 (m, 1H), 4.21-4.25 (m, 1H), 3.92-4.13 (m, 5H), 3.76-3.84 (m, 2H), 3.33-3.39 (m, 3H), 2.03-2.16 (m, 2H), 1.77-1.87 (m, 2H), 1.55-1.74 (m, 4H).

Example 11. (2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-1,3-dihydroxypropan-2-yl)phosphonic acid

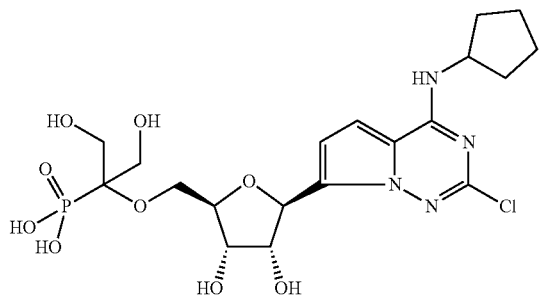 [SMILES: O=P(O)(O)C(CO)(CO)OC[C@H]1O[C@@H](c2ccc3c(NC4CCCC4)nc(Cl)nn23)[C@H](O)[C@@H]1O]

m/z (ESI, +ve ion)=522.7 [M+H]⁺. ¹H NMR (400 MHz, D₂O) δ ppm 6.64-6.73 (m, 2H), 5.11-5.45 (m, 1H), 4.44-4.49 (m, 1H), 4.20-4.39 (m, 2H), 4.08-4.11 (m, 1H), 3.65-4.01 (m, 6H), 1.82-2.08 (m, 2H), 1.39-1.75 (m, 6H).

Example 13. (1-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-2-hydroxyethyl)phosphonic acid

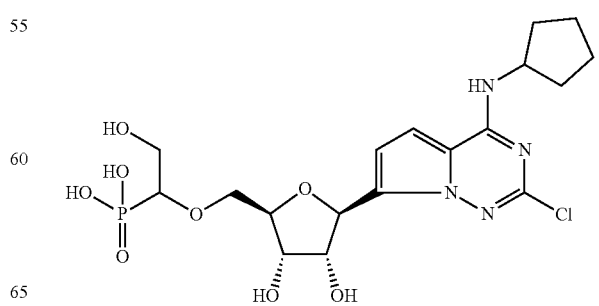

m/z (ESI, +ve ion)=493.1 [M+H]⁺. ¹H NMR (400 MHz, MeOD) δ ppm 6.92 (dd, J=4.53, 2.05 Hz, 1H), 6.71-6.77 (m, 1H), 5.26-5.65 (m, 1H), 4.50-4.64 (m, 1H), 4.31-4.48 (m, 1H), 4.17-4.29 (m, 2H), 3.98-4.11 (m, 1H), 3.69-3.96 (m, 4H), 2.02-2.16 (m, 2H), 1.57-1.85 (m, 6H).

Example 14. (2-(((2R,3S,4R,5R)-5-(2-chloro-4-(cyclopentylamino)pyrrolo[2,1-f][1,2,4]triazin-7-yl)-3,4-dihydroxytetrahydrofuran-2-yl)methoxy)-1,3-dihydroxypropan-2-yl)phosphonic acid

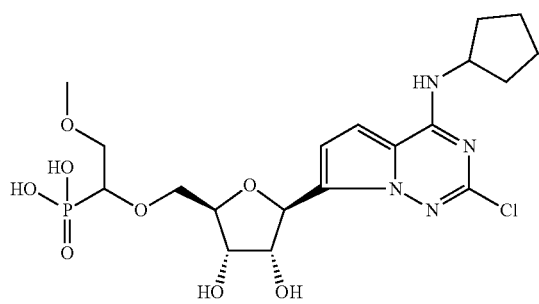 [SMILES: COCC(OC[C@H]1O[C@@H](c2ccc3c(NC4CCCC4)nc(Cl)nn23)[C@H](O)[C@@H]1O)P(=O)(O)O]

m/z (ESI, +ve ion)=506.9 [M+H]⁺. ¹H NMR (400 MHz, MeOD) δ ppm 6.90-6.93 (m, 1H), 6.73-6.78 (m, 1H), 5.27-5.64 (m, 1H), 4.51-4.60 (m, 1H), 4.34-4.47 (m, 1H), 4.18-4.27 (m, 1H), 4.06-4.14 (m, 1H), 3.62-4.04 (m, 5H), 3.35-3.41 (m, 3H), 2.02-2.15 (m, 2H), 1.75-1.85 (m, 2H), 1.56-1.73 (m, 4H).

Example 15. ((S)-1-((2H-Tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxypropan-2-yl)phosphonic acid

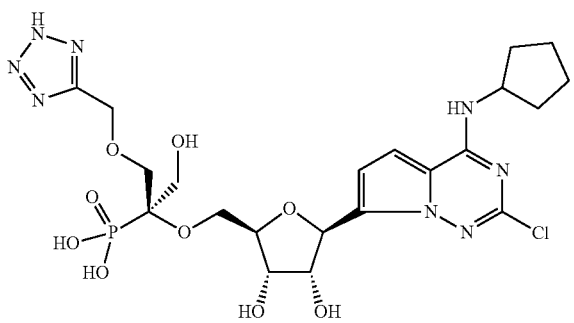 [SMILES: O=P(O)(O)[C@@](CO)(COCc1nn[nH]n1)OC[C@H]1O[C@@H](c2ccc3c(NC4CCCC4)nc(Cl)nn23)[C@H](O)[C@@H]1O]

Step A. 2-Chloro-N-cyclopentylpyrrolo[2,1-f][1,2,4]triazin-4-amine (15a)

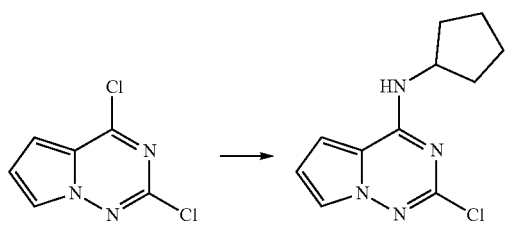 [SMILES: Clc1nc(Cl)c2cccn2n1 ; Clc1nc(NC2CCCC2)c2cccn2n1]

2,4-Dichloropyrrolo[2,1-f][1,2,4]triazine (24.3 g, 129 mmol) was dissolved in ethanol (517 mL). To the solution at 0° C. was added triethylamine (21.6 mL, 155 mmol), followed by addition of cyclopentylamine (14.1 mL, 142 mmol). The mixture was stirred for 5 min at 0° C., and then warmed up to rt and stirred for another hour. The mixture was concentrated and the residue was diluted with EtOAc and water. The pH of the solution was adjusted to 4-5 using 10% citric acid. The solution was extracted with EtOAc and the organics were washed with sat. NaHCO₃, brine, dried over Na₂SO₄. The solution was filtered through a pad of celite and concentrated to provide the crude material (15a) as a yellow solid. m/z (ESI, +ve ion)=237.2 [M+H]⁺.

Step B. tert-Butyl (2-chloropyrrolo[2,1-f][1,2,4]triazin-4-yl)(cyclopentyl)carbamate (15b)

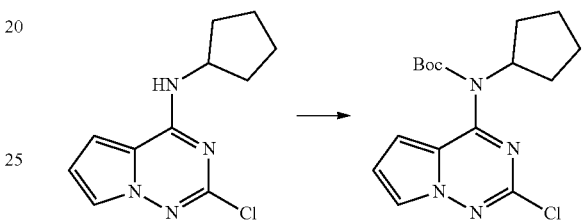

15a (30.6 g, 129 mmol) was dissolved in dry THF (323 mL). To the solution 4-dimethylaminopyridine (1.5 g, 12.9 mmol) and triethylamine (54 mL, 38.7 mmol) were added, followed by addition of di-tert-butyl dicarbonate (59.4 mL, 259 mmol). After the reaction mixture was heated to reflux overnight, it was concentrated at 45° C. to remove most of THF. Imidazole (1.75 g, 25.8 mmol) was added to the remaining THF solution and the resulting mixture was stirred at rt for 20 min, then extracted with EtOAc. The organic layer was washed (1% HCl (aq), water, and brine), dried (Na₂SO₄), and concentrated. The residue was purified by column chromatography (0-10% EtOAc/hexanes, a gradient elution) to provide the title compound (15b) (40.5 g, 93%). m/z (ESI, +ve ion)=281.1 [M-ᵗBu+H]⁺.

Step C. tert-Butyl (7-bromo-2-chloropyrrolo[2,1-f][1,2,4]triazin-4-yl)(cyclopentyl)carbamate (15c)

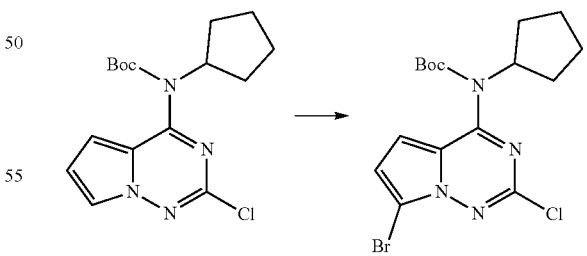

To a solution 15b (25.3 g, 75.1 mmol) in anhydrous MeCN (250 mL) at −20° C. was added N-bromosuccinimide (12 g, 67.6 mmol). The reaction was allowed to warm to rt and stirred for 40 min. DMF (3 mL) was added and the reaction was stirred for 5 min. The mixture was diluted with EtOAc and sat. NaHCO₃. The organics were washed (NaHCO₃(aq) and brine), dried (Na₂SO₄), and concentrated. The residue was purified by column chromatography (0-10% EtOAc/hexanes, a gradient elution) to provide the title compound (15c) (28.1 g, 90%) as a yellow solid. m/z (ESI, +ve ion)=361.0 [M-'Bu+H]⁺.

Step D. tert-Butyl (7-((3aR,6R,6aR)-6-(((tert-butyldimethylsilyl)oxy)methyl)-4-hydroxy-2,2-dimethyltetrahydrofuro[3,4-d][1,3]dioxol-4-yl)-2-chloropyrrolo[2,1-f][1,2,4]triazin-4-yl)(cyclopentyl)carbamate (15d)

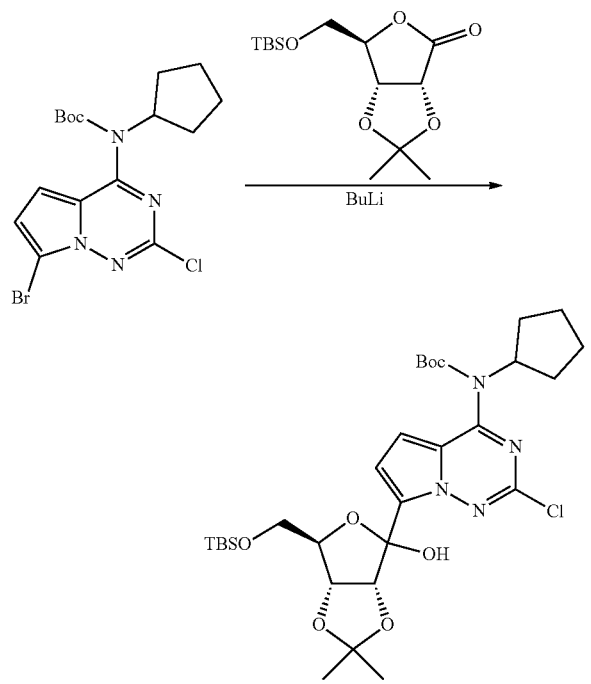

The title compound was prepared from 15c and (3aR,6R,6aR)-6-(((tert-butyldimethylsilyl)oxy)methyl)-2,2-dimethyldihydrofuro[3,4-d][1,3]dioxol-4(3aH)-one by procedure similar to that described in Example 1, Step E.

Step E. tert-Butyl (7-((3aS,4R,6R,6aR)-6-(((tert-butyldimethylsilyl)oxy)methyl)-2,2-dimethyltetrahydrofuro[3,4-d][1,3]dioxol-4-yl)-2-chloropyrrolo[2,1-f][1,2,4]triazin-4-yl)(cyclopentyl)carbamate (15e)

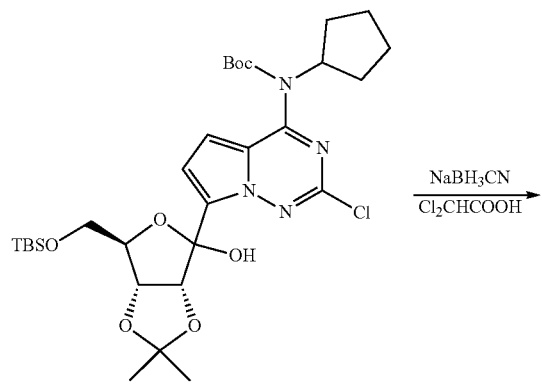

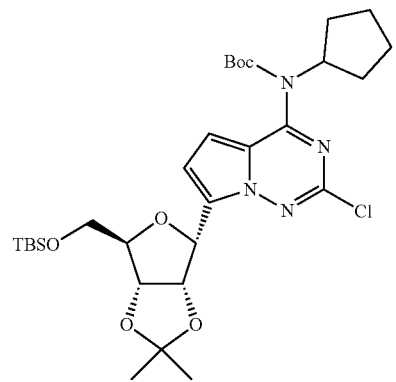

To a 100 mL flask charged with 15d (1.09 g, 1.71 mmol) was added 2,2,2-trifluoroethanol (8.5 mL, 1.7 mmol). Sonication was required for complete dissolution of 15d in 2,2,2-trifluoroethanol. To the solution was added at −20° C. sodium cyanoborohydride (339 mg, 5.13 mmol), followed by addition of dichloroacetic acid (0.43 mL, 5.13 mmol). After the solution was stirred at −20 C for 1 h, it was quenched with sat aq. NaHCO₃. The solution was extracted with EtOAc, the organics were washed, dried and concentrated. The residue was purified by column chromatography (0-20% EtOAc/hexanes, a gradient elution) to the title compound (15e) (600 mg, 56%). m/z (ESI, +ve ion)=623.3 [M+H]⁺.

Step F. Ethyl 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)acetate (15f)

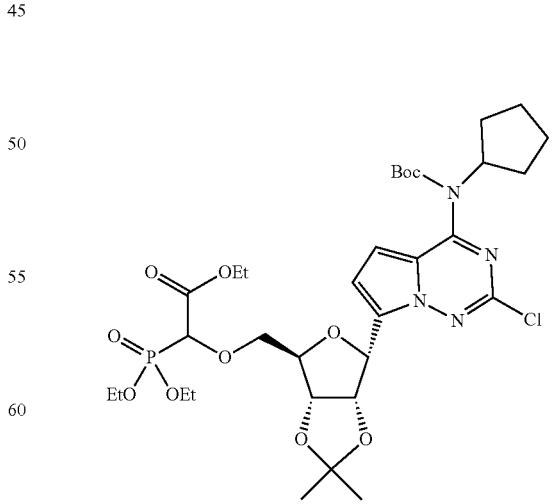

The title compound was prepared from 15e by procedure similar to that described in Example 1, Steps I and J.

Step G. Ethyl 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-(2-(trimethylsilyl)ethoxy)propanoate (15g)

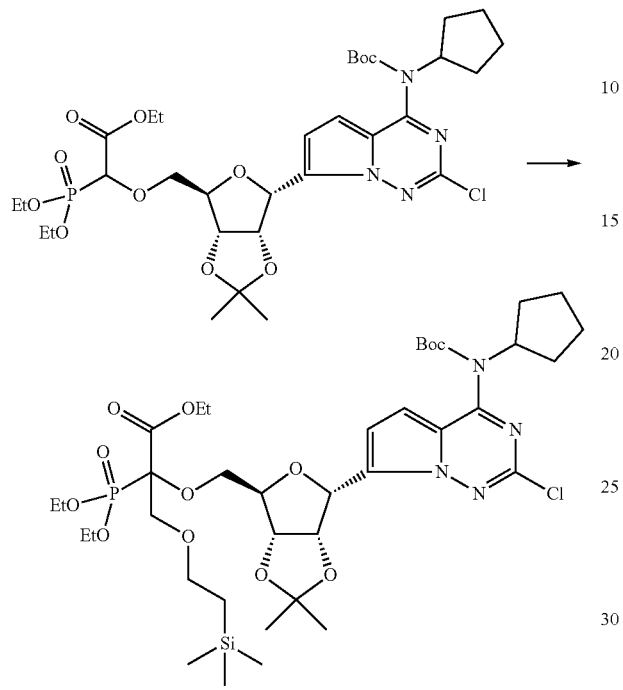

To a stirred solution of 15f (1.13 g, 1.55 mmol) in THF (20 mL) at −20° C. was added sodium bis(trimethylsilyl)amide (1 M in THF, 2 mL, 2 mmol). The solution was allowed to stir at −20° C. for 25 min. At this time, TBAI (285 mg, 0.772 mmol) was added in one portion, followed by dropwise addition of SEMCl (0.61 mL, 3.9 mmol). After the solution was stirred for 40 min, it was quenched with sat. NH₄Cl and diluted with EtOAc. The organics were washed with brine, dried over Na₂SO₄, filtered and concentrated. The resulting light brown oil was purified by flash chromatography (0-45% EtOAc/hexanes, a gradient elution) to provide the title compound (15g) as a mixture of diastereomers (1.1 g, 1.28 mmol, 83%). m/z (ESI, +ve ion)=833.3 [M+H]⁺.

Step H. Ethyl (R)-2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-(2-(trimethylsilyl)ethoxy)propanoate (15h-1) and ethyl (S)-2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)-3-(2-(trimethylsilyl)ethoxy)propanoate (15h-2)

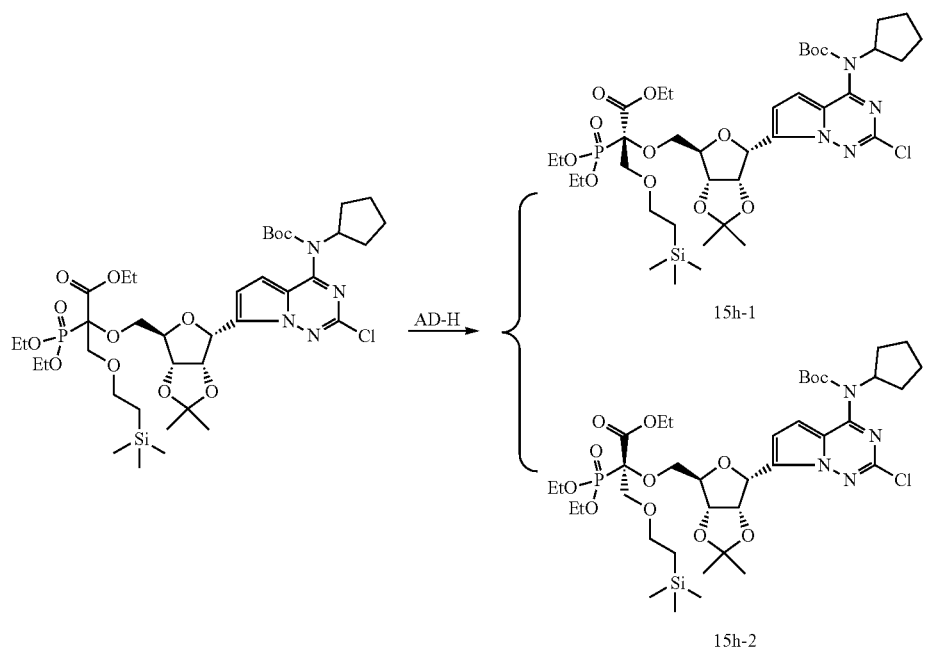

Diastereomers were separated by ADH column with 5% IPA/hexanes as the mobile phase (isocratic). The diastereomer eluting first from the column was arbitrarily assigned as 15h-2 (retention time of 2.7 min) and the other isomer eluting second was arbitrarily assigned as 15h-1 (retention time of 6.8 min).

Step I. tert-Butyl (2-chloro-7-((3aS,4R,6R,6aR)-6-((((R)-2-(diethoxyphosphoryl)-1-hydroxy-3-(2-(trimethylsilyl)ethoxy)propan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate (15i)

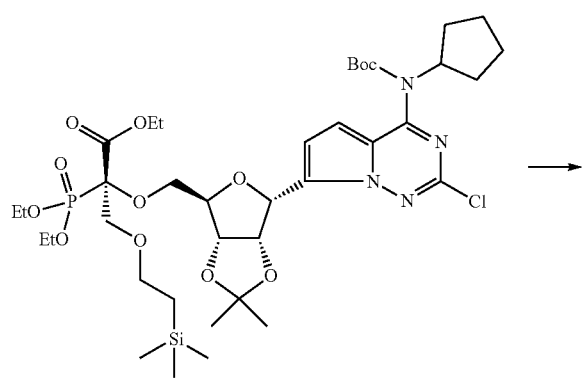

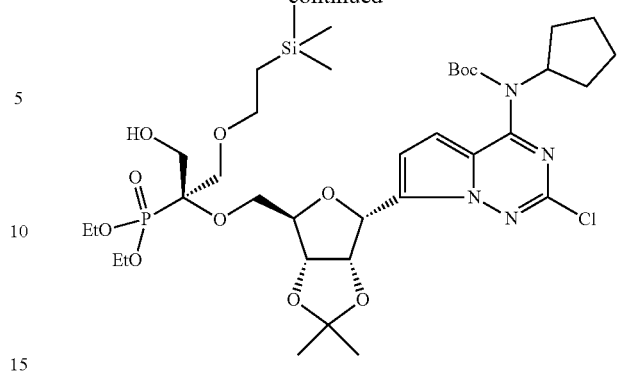

To a flask containing 15h-2 (525 mg, 0.61 mmol) was added ethanol (10 mL). The solution was cooled to 0° C. and calcium dichloride (210 mg, 1.83 mmol) was added, followed by addition of sodium borohydride (69 mg, 1.8 mmol) in a single portion. After the reaction mixture allowed to warm to rt and stirred for 2 h, it was quenched at 0° C. with sat. $NH_4Cl$. The solution was extracted with EtOAc and the organic layer was dried with $MgSO_4$, filtered and concentrated. The resulting residue was purified by flash chromatography (50-100% EtOAc/hexanes, a gradient elution) to afford the title compound (15i) (445 mg, 0.543 mmol, 89%). m/z (ESI, +ve ion)=791.3 $[M+H]^+$.

Step J. tert-Butyl (2-chloro-7-((3aS,4R,6R,6aR)-6-((((R)-2-(diethoxyphosphoryl)-1-(2-(trimethylsilyl)ethoxy)-3-((2-((2-(trimethylsilyl)ethoxy)methyl)-2H-tetrazol-5-yl)methoxy)propan-2-yl)oxy)methyl)-2,2-dimethyltetrahydrofuro[3,4-d][1,3]dioxol-4-yl)pyrrolo[2,1-f][1,2,4]triazin-4-yl)(cyclopentyl)carbamate (15j)

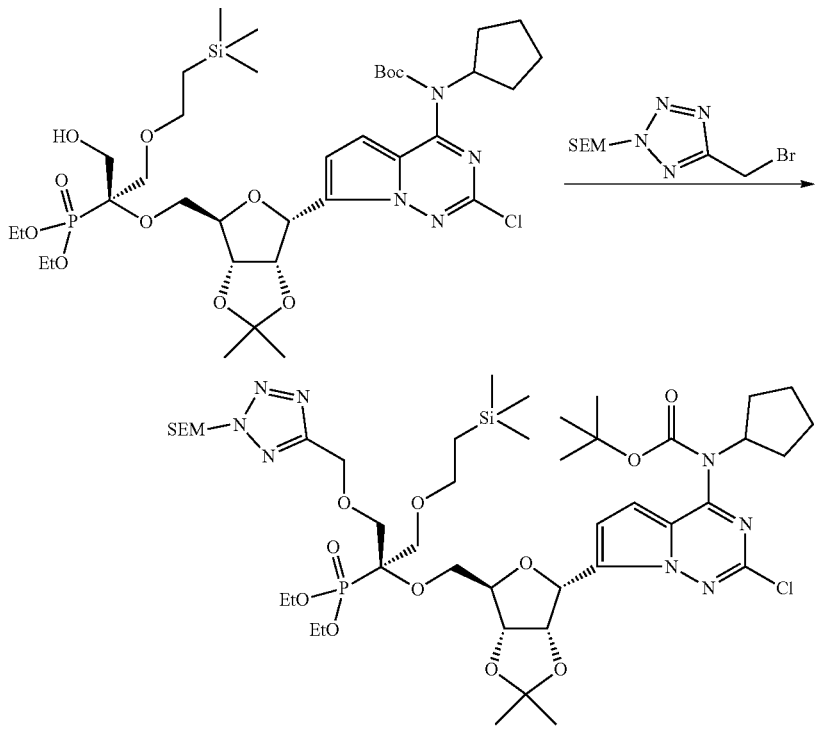

A solution of 15i (445 mg, 0.543 mmol) and 1c-1 (318 mg, 1.09 mmol) in DMF (6 mL) was cooled to 0° C. NaH (60% mineral oil, 33 mg, 0.815 mmol) was added to the solution in one portion. After the solution was allowed to stir at 0° C. for 30 min, it was quenched with sat. NH₄Cl aq. The solution was extracted 3× with EtOAc and the combined organic layers were washed with water, brine, and dried over MgSO₄. The solution was filtered and concentrated and the residue was purified by flash chromatography (0-100% EtOAc/hexanes, a gradient elution) to provide the title compound (15j) (411 mg, 0.398 mmol, 73%).

Step K. Diethyl ((S)-1-((2H-tetrazol-5-yl)methoxy)-2-(((3aR,4R,6R,6aS)-6-(2-chloro-4-(cyclopentylamino)pyrrolo[2,1-f][1,2,4]triazin-7-yl)-2,2-dimethyltetrahydrofuro[3,4-d][1,3]dioxol-4-yl)methoxy)-3-hydroxypropan-2-yl)phosphonate (15k)

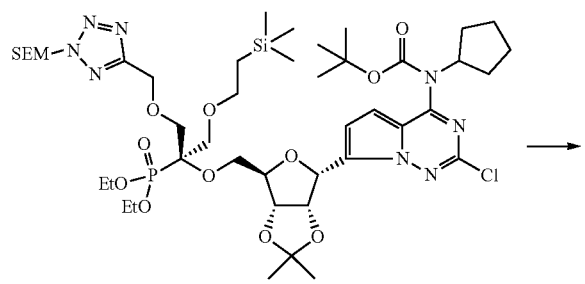

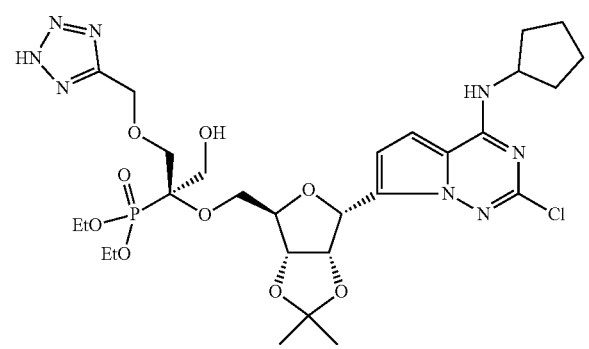

To a solution of 15j (411 mg, 0.398 mmol) in DCM (18 ml) stirred at 0 C.° was added BF₃Et₂O dropwise. The reaction mixture was warmed to rt and then quenched with NaHCO₃ and partitioned between DCM and H₂O. The aqueous layer was extracted again with DCM and the combined organics were dried with MgSO₄, filtered and concentrated. The resulting residue was purified by flash chromatography (0-20% MeOH/DCM, a gradient elution) to afford the title compound (15k) (279 mg, 0.398 mmol, 99.9%) as a foamy white solid. m/z (ESI, +ve ion)=701.3 [M+H]⁺.

Step L. ((S)-1-((2H-Tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxypropan-2-yl) phosphonic acid (15)

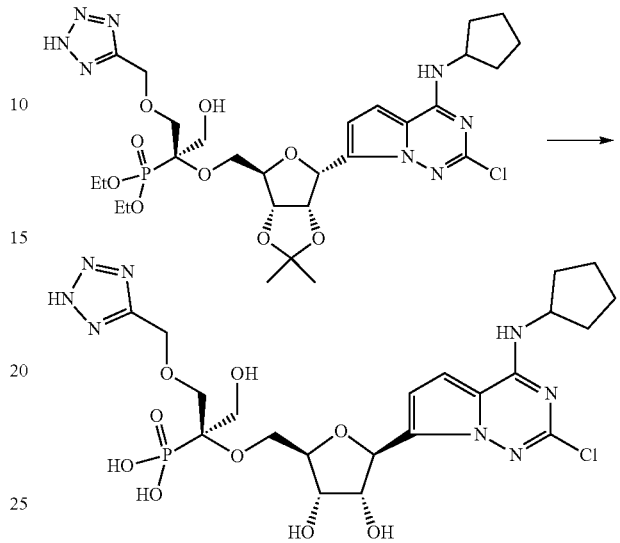

To a solution of 15k (279 mg, 0.398 mmol) in MeCN (13 mL) was added triethylamine (0.21 mL, 1.52 mmol), followed by addition of bromo(trimethyl)silane (0.13 mL, 1.02 mmol). After the mixture was stirred at rt for 8 h, it was concentrated and resuspended in H₂O (6 mL) and TFA (6 mL). This mixture was allowed to stir overnight and then solvent was removed in vacuo. The resulting residue was purified by prep HPLC(20-35% ACN/H₂O, 0.1% TFA) to provide the title compound (15) as a TFA salt. m/z (ESI, +ve ion)=605.2 [M+H]⁺. ¹H NMR (400 MHz, MeOD) δ ppm 6.86-6.93 (m, 1H), 6.66-6.76 (m, 1H), 5.28 (d, J=5.85 Hz, 1H), 4.95-5.05 (m, 2H), 4.50-4.61 (m, 1H), 4.40-4.46 (m, 1H), 4.22-4.27 (m, 1H), 4.07-4.13 (m, 2H), 3.85-4.06 (m, 5H), 2.04-2.15 (m, 2H), 1.75-1.87 (m, 2H), 1.56-1.73 (m, 4H). The structures and absolute configurations of 15 were assigned based on the cocrystal X-ray structure of 15 with the CD73 protein.

Example 16. ((R)-1-((2H-tetrazol-5-yl)methoxy)-2-(((2R,3S,4R,5S)-5-(2-chloro-4-(cyclopentylamino)pyrrolo[2,1-f][1,2,4]triazin-7-yl)-3,4-dihydroxytetrahydrofuran-2-yl)methoxy)-3-hydroxypropan-2-yl) phosphonic acid

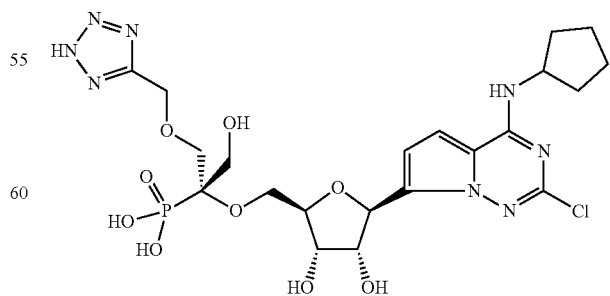

The title compound was prepared from 15h-1 by procedures similar to those described in Example 15, Steps I-L.

m/z (ESI, +ve ion)=605.2 [M+H]⁺. ¹H NMR (400 MHz, MeOD) δ ppm 6.87-6.93 (m, 1H), 6.68-6.75 (m, 1H), 5.29 (d, J=5.85 Hz, 1H), 4.95-5.04 (m, 2H), 4.52-4.60 (m, 1H), 4.43 (t, J=5.63 Hz, 1H), 4.22 (t, J=5.19 Hz, 1H), 3.96-4.14 (m, 6H), 3.84-3.95 (m, 1H), 2.02-2.16 (m, 2H), 1.77-1.87 (m, 2H), 1.57-1.73 (m, 4H).

Example 17. (2-(((2R,3S,4R,5S)-5-(5-Chloro-7-(cyclopentylamino)pyrazolo[1,5-a]pyrimidin-3-yl)-3,4-dihydroxytetrahydrofuran-2-yl)methoxy)-1,3-dihydroxypropan-2-yl)phosphonic acid

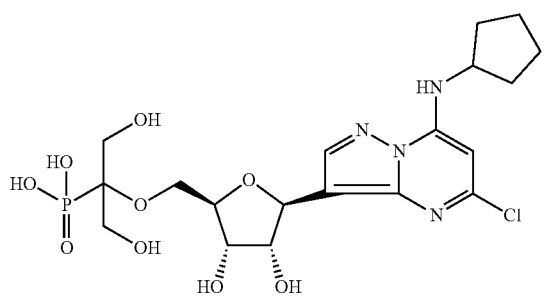 [SMILES: O=P(O)(O)C(CO)(CO)OC[C@H]1O[C@@H](c2cnn3c(NC4CCCC4)cc(Cl)nc23)[C@H](O)[C@@H]1O]

The title compound was prepared by procedures similar to those described in Example 1, Steps A-N. m/z (ESI, +ve ion)=523.2 [M+H]⁺. ¹H NMR (400 MHz, CD₃OD) δ ppm 8.21 (s, 1H), 6.18 (s, 1H), 5.19-5.03 (m, 1H), 4.51-3.80 (m, 10H), 2.24-2.01 (m, 2H), 1.92-1.62 (m, 6H).

Example 18. (2-(((2R,3S,4R,5R)-5-(5-Chloro-7-(cyclopentylamino)pyrazolo[1,5-a]pyrimidin-3-yl)-3,4-dihydroxytetrahydrofuran-2-yl)methoxy)-1,3-dihydroxypropan-2-yl)phosphonic acid

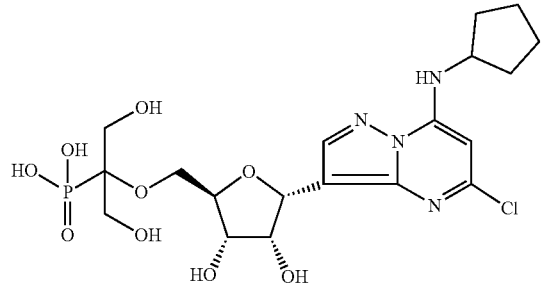 [SMILES: O=P(O)(O)C(CO)(CO)OC[C@H]1O[C@H](c2cnn3c(NC4CCCC4)cc(Cl)nc23)[C@H](O)[C@@H]1O]

The title compound was prepared by procedures similar to those described in Example 1, Steps A-N. m/z (ESI, +ve ion)=523.2 [M+H]⁺. ¹H NMR (400 MHz, CD₃OD) δ ppm 7.98 (s, 1H), 6.16 (s, 1H), 4.47-4.31 (m, 1H), 4.27-3.76 (m, 10H), 2.25-2.05 (m, 2H), 1.92-1.63 (m, 6H).

Examples 19-44 where synthesized as described for example 1-4, 6-11, and 13-18. LC-MS data is shown in the table below:

| Ex. | M + H Found | MW |
| --- | --- | --- |
| 19 | 507.20 | 506.87 |
| 20 | 605.20 | 604.94 |
| 21 | 571.40 | 570.49 |
| 22 | 521.30 | 520.9 |

-continued

| Ex. | M + H Found | MW |
| --- | --- | --- |
| 23 | 581.2 | 580.91 |
| 24 | 609.3 | 608.96 |
| 25 | 595.2 | 594.94 |
| 26 | 595.2 | 622.99 |
| 27 | 579.30 | 579.32 |
| 28 | 687.3 | 687 |
| 29 | 619.2 | 618.96 |
| 30 | 551.20 | 550.93 |
| 31 | 521.10 | 520.9 |
| 32 | 521.00 | 520.9 |
| 33 | 506.90 | 506.87 |
| 34 | 507.20 | 506.87 |
| 35 | 659.20 | 659.03 |
| 36 | 619.20 | 618.97 |
| 37 | 619.20 | 618.97 |
| 38 | 605.20 | 604.94 |
| 39 | 605.20 | 604.94 |
| 40 | 653.10 | 652.99 |
| 41 | 653.10 | 652.99 |
| 42 | 551.20 | 550.89 |
| 43 | 605.20 | 604.94 |
| 44 | 607.20 | 606.91 |

Example 45. (R)-3-(((2R,3S,4R,5S)-5-(2-Chloro-4-(Cyclopentylamino)pyrrolo[2,1-f][1,2,4]triazin-7-yl)-3,4-dihydroxytetrahydrofuran-2-yl)methoxy)-4-methoxy-3-phosphonobutanoic acid

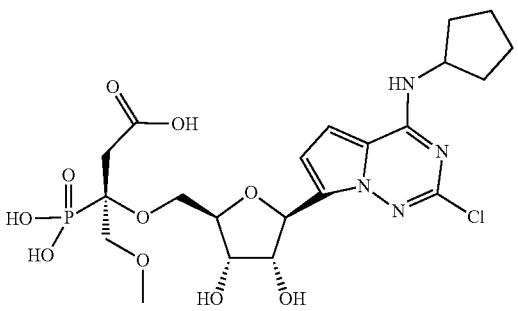

Step A. Ethyl 2-(((3aR,4R,6R,6aS)-6-(4-((tert-butoxycarbonyl)(cyclopentyl)amino)-2-chloropyrrolo[2,1-f][1,2,4]triazin-7-yl)-2,2-dimethyltetrahydrofuro[3,4-d][1,3]dioxol-4-yl)methoxy)-2-(diethoxyphosphoryl)pent-4-enoate (45a)

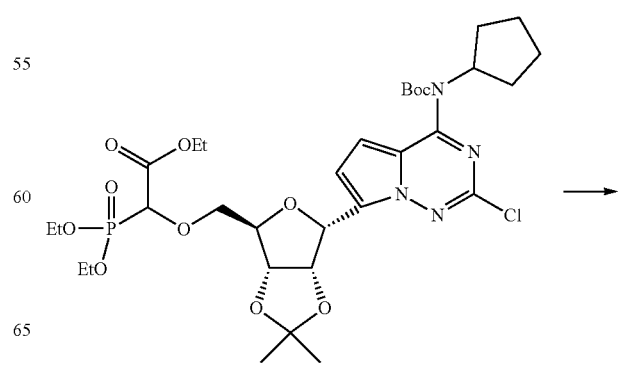

121

-continued

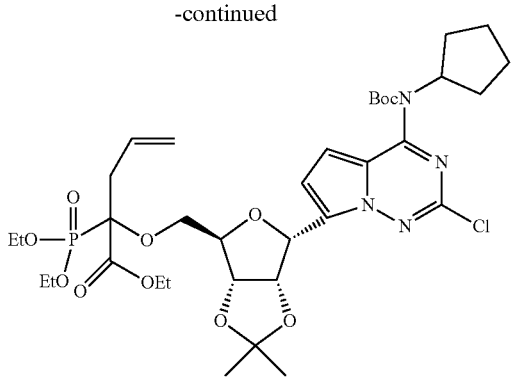

A dry flask was charged with 1j (1.3 g, 1.8 mmol) and added THF (30 mL) under Ar. The solution was cooled to −15° C., and NaHMDS(1M in THF, 2.4 mL, 2.4 mmol) was added dropwise, followed by addition of allyl iodide (0.5 mL, 5.5 mmol). After the solution was allowed to stir at −15° C. for 1 h, it was quenched with sat. NH₄Cl. The solution was allowed to stir while warming to rt after adding EtOAc. Water was then added to the solution, and the organics were extracted with EtOAc (2×). The organic layer was combined, washed with brine, dried with Na₂SO₄, filtered and concentrated to give a crude oil. The crude was purified by flash chromatography (0-60% EtOAc/hexanes, a gradient elution) to give the title compound (45a) 1.2 g, 86% yield) as a viscous, clear oil. m/z (ESI, +ve ion)=771.3 [M+H]⁺

Step B. (R)-3-(((3aR,4R,6R,6aS)-6-(4-((tert-Butoxycarbonyl)(cyclopentyl)amino)-2-chloropyrrolo[2,1-f] [1,2,4]triazin-7-yl)-2,2-dimethyltetrahydrofuro[3,4-d][1,3]dioxol-4-yl)methoxy)-3-(diethoxyphosphoryl)-4-methoxybutanoic acid (45b)

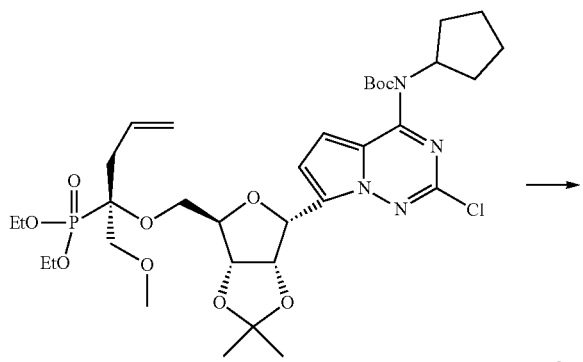

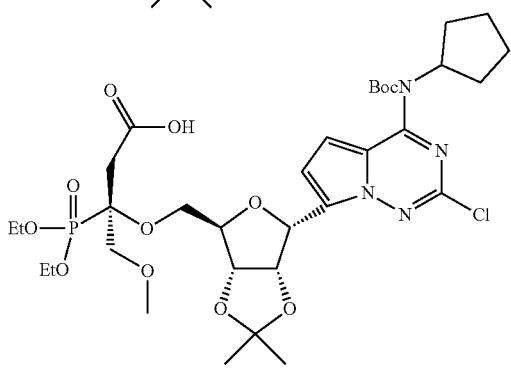

122

A vial was charged with 45a (73 mg, 0.1 mmol) and RuCl₃ (2.2 mg, 0.01 mmol). A solvent mixture of H₂O/CHCl₃/MeCN(1.5:1:1, 2.8 mL) was added to the vial along with NaIO₄ (96.6 mg, 0.5 mmol). The vial was sealed and allowed to stir at rt for 4.5 h. Additional NaIO₄ (23 mg) was added to the vial. After the mixture was stirred overnight, 27 mg of NaIO4 was added, and the reaction mixture continued to stir for another 2 h. The reaction mixture was filtered through a pad of celite, and the filtrate was added 10% aqueous NaHSO₃ (0.5 mL) before extracting with EtOAC (3×). The organics were combined, washed with brine, dried with Na₂SO₄, filtered and concentrated to a crude oil. The crude was purified by reverse phase HPLC(47-62% ACN/H₂O with 0.1% formic acid, a gradient elution) to give the title compound (45b) (13 mg, 17%) as an oil. m/z (ESI, +ve ion)=761.3 [M+H]⁺

Step C. (R)-3-(((2R,3S,4R,5S)-5-(2-Chloro-4-(cyclopentylamino)pyrrolo[2,1-f][1,2,4]triazin-7-yl)-3,4-dihydroxytetrahydrofuran-2-yl)methoxy)-4-methoxy-3-phosphonobutanoic acid (45)

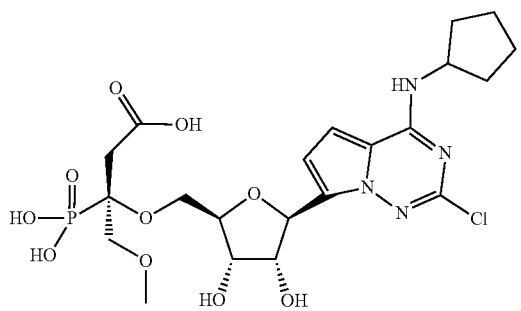

The title compound was prepared from 45b by procedure similar to that described in Example 1, Step N. m/z (ESI, +ve ion)=565.2 [M+H]⁺. ¹H NMR (400 MHz, MeOD) δ ppm 6.82 (1H, d, J=4.68 Hz), 6.66 (d, 1H, J=4.68 Hz), 5.19 (1H, d, J=6.29 Hz), 4.49-4.42 (1H, m), 4.33-4.28 (1H, m), 4.18-4.15 (1H, m), 4.01-3.98 (1H, m), 3.95-3.73 (4H, m), 3.26 (3H, s), 2.88-2.74 (2H, m), 2.09-1.96 (2H, m), 1.75-1.47 (6H, m).

Examples 46-57 where synthesized as described for examples 1-4, 6-11, 13-18, and 45. LC-MS data is shown in the table below:

| Ex. | M + H Found | MW |
|---|---|---|
| 46 | 618.9 | 618.97 |
| 47 | 551 | 550.89 |
| 48 | 619.1 | 618.97 |
| 49 | 591.2 | 590.91 |
| 50 | 591.1 | 590.91 |
| 51 | 591.2 | 590.91 |
| 52 | 605.2 | 604.94 |
| 53 | 605.2 | 604.94 |
| 54 | 591.2 | 590.91 |
| 55 | 622.2 | 621.99 |
| 56 | 537.1 | 536.9 |
| 57 | 619.6 | 618.97 |

Example A: Biological Evaluation

Assay Reaction Conditions
    Assay Volume: 70 µl
    Reaction Volume: 50 µl
    CD73: 0.3208 nM
    AMP: 15 µM
    Assay Buffer: 2 5 mM Tris-HCL, pH 7.4, 0.01% Brij-35, 0.01% BSA, 5 mM $MgCl_2$ Assay Procedure:

A clear 384 well plate was used in this assay.

Made dose titration of testing compounds in assay buffer, 10 points ½ log titrations in duplicates starting at 100 µM. Total volume for each well was 25 µl, with CD73 then added to each well for a final concentration of 320 pM. The solution was then incubated at RT for 15 min. 25 µl of AMP was added to each well for a final concentration of 15 µM, and then incubated at rt for 10 min. 10 µl of Malachite Green Reagent A was then added and allowed to incubate at rt for 10 min. 10 µl of Malachite Green Reagent B was then added and allowed to incubate at rt for 45 min. The absorbance for each sample was read on an Envision plate reader using excitation filter: Cy5 620 nM.

The ability of the compounds disclosed herein to inhibit CD73 activity was quantified and the respective $IC_{50}$ values were determined. Table 2 provides the biochemical $IC_{50}$ values of compounds disclosed herein.

TABLE 2

| Ex | Biochemical $IC_{50}$ |
| --- | --- |
| 1 | A |
| 2 | C |
| 3 | A |
| 4 | C |
| 6 | A |
| 7 | C |
| 8 | B |
| 9 | A |
| 10 | C |
| 11 | B |
| 13 | C |
| 14 | B |
| 15 | A |
| 16 | B |
| 17 | B |
| 18 | C |
| 19 | C |
| 20 | A |
| 21 | B |
| 22 | A |
| 23 | B |
| 24 | C |
| 25 | A |
| 26 | A |
| 27 | C |
| 28 | A |
| 29 | D |
| 30 | A |
| 31 | C |
| 32 | A |
| 33 | C |
| 34 | B |
| 35 | A |
| 36 | D |
| 37 | D |
| 38 | A |
| 39 | A |
| 40 | A |
| 41 | A |
| 42 | A |
| 43 | C |
| 44 | A |
| 45 | A |
| 46 | A |
| 47 | C |
| 48 | C |
| 49 | A |
| 50 | B |
| 51 | A |
| 52 | A |
| 53 | C |
| 54 | C |
| 55 | A |
| 56 | C |
| 57 | A |

A: $IC_{50} \leq 0.5$ nM;
B: $0.5$ nM $< IC_{50} \leq 1$ nM
C: $1$ nM $< IC_{50} \leq 100$ nM
D: $100$ nM $< IC_{50} \leq 1$ µM Example B: Cellular CD73 Assays Activity of cell bound CD73 was assessed by direct measurement of adenosine produced from AMP using liquid chromatography with tandem mass-spectrometry (LC-MS/MS). Human NSCLC H1568 cells expressing endogenous CD73 on their surface were obtained from ATCC(CRL-5876) and cultured in growth medium (RPMI, 10% FBS, 1 mM L-glutamine, 100 mL penicillin-streptomycin). Cells were seeded onto 96-well tissue culture plates at 10,000 cells/well and allowed to adhere for 20-24 h. 500× serial compound dilutions were prepared in DMSO in a 12-point 3-fold titration, and then diluted 1:50 into RPMI supplemented with 10% human plasma (BioIVT, cat #HMPLEDTA5) generating 10× compound dilutions. Growth medium was removed from the cells and replaced with 80 mL of RPMI/10% human plasma. 10 mL of 10× compound dilutions were then added to the cells and incubated for 15 min at 37° C., 5% $CO_2$. Then 10 mL of 100 mM AMP/50 mM EHNA (Sigma-Aldrich, A1752 and E114) were added to a final concentration of 10 mM AMP/5 mM EHNA. After 1 h incubation at 37° C., 5% $CO_2$, 80 mL of supernatant was removed from the cells and transferred to a deep well polypropylene 96-well plate (Costar #3961) pre-filled with 240 mL of organic solvent composed of methanol:acetonitrile (1:1, v/v) with 0.1% formic acid, plus 150 ng/mL of Adenosine-15N and AMP-13C as internal standards. Amount of unlabeled adenosine and AMP in each well was measured on AB Sciex API 4000 QTrap with Shimadzu LC-30AD UPLC system. Limits of adenosine and AMP detection were 10-10,000 nM and 20-10,000 nM, respectively. The $IC_{50}$ values were determined based on amount of adenosine in the supernatant using four parameter non-linear regression curve fit. DMSO treated cells produced 3000-4000 nM adenosine under these conditions with negligible variability on the same day assays. Small amount of adenosine generated from AMP in the absence of cells (less than 100 nM) was used as 100% inhibition control.

To determine inhibitory activity of anti-CD73 antibody, H1568 cells were pre-incubated with antibody for 2 h at 37° C., 5% $CO_2$ before adding AMP/EHNA, thus allowing CD73 internalization which was described as one of the antibody's mechanism of action. Table 3 provides the cellular $EC_{50}$ values of compounds disclosed herein.

TABLE 3

| Example | H1568 EC$_{50}$ (nM) |
|---|---|
| 9 | A |
| 51 | A |
| 15 | B |

A: IC$_{50}$ ≤ 0.5 nM;

B: 0.5 nM < IC$_{50}$ ≤ 1 nM

C: 1 nM < IC$_{50}$ ≤ 100 nM

D: 100 nM < IC$_{50}$ ≤ 1 μM

To determine activity of compounds on mouse CD73 mouse EMT6 breast cancer cells which express endogenous CD73 on their surface (ATCC, CRL-2755) were used. Cells were grown in Waymouth's MB752/1 medium with 2 mM L-glutamine and 15% FBS. They were seeded onto 96-well tissue culture plates at 5,000 cells/well and allowed to adhere for 20-24 h. Then growth medium was replaced with PBS/3% BSA, and the assay and adenosine measurement were performed as described above. DMSO treated cells produced 1000-1500 nM adenosine under these conditions with negligible variability on the same day assays. Table 4 provides the EMT6 EC$_{50}$ values of compounds disclosed herein.

TABLE 4

| Example | EMT6 EC$_{50}$ (nM) |
|---|---|
| 9 | A |
| 51 | B |
| 15 | C |

A: IC$_{50}$ ≤ 0.5 nM;

B: 0.5 nM < IC$_{50}$ ≤ 1 nM

C: 1 nM < IC$_{50}$ ≤ 100 nM

D: 100 nM < IC$_{50}$ ≤ 1 μM

Primary human peripheral blood CD8+ T-cells cells were obtained from StemCell Technologies (cat #70027). Cells were thawed and cultured for 24 h in complete growth medium (Stemline T-cell expansion medium (Sigma, S1694) supplemented with 1 mM L-glutamine, 50 IU/ml IL-2 and 25 ml/ml of human CD3/CD28/CD2 T-Cell Activator (StemCell Technologies cat #10970)) at density 106 cells/ml. Then cells were gently pelleted and resuspended in Stemline T-cell expansion medium without T-cell activator. Cells were seeded onto U-bottom 96-well plates at 80,000 viable cells/90 ml/well. Compound dilutions were made in Stemline T-cell expansion medium. The assay and adenosine measurement were performed as described above. DMSO treated cells produced 4000-4500 nM adenosine under these conditions with negligible variability on the same day assays.

It is to be understood that while the disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A compound of Formula (I),

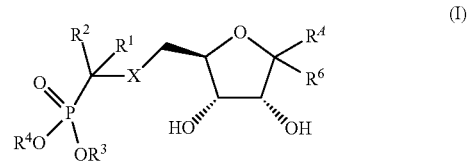

or a pharmaceutically acceptable salt thereof, wherein

X is —O—, —CH$_2$—, —S—, —S(O)$_2$—, or —NR';

R$^1$ is -L$^1$R$^{10}$;

L' is a bond or an optionally substituted branched or straight C$_{1-6}$ alkylene chain, wherein up to two carbon atoms of L$^1$ are optionally and independently replaced by —NR'—, —S—, —O—, —OC(O)—, —C(O)O—, —C(O)—, —C(O)C(O)—, —C(O)NR'—, —NR'C(O)—, —NR'C(O)O—, —S(O)$_2$NR'—, -NR'S(O)$_2$—, —C(O)NR'NR'—, —NR'C(O)NR'—, —OC(O)NR'—, —NR'NR'—, -NR'S(O)$_2$NR'—, —S(O)—, or —S(O)$_2$—;

R$^{10}$ is selected from R', halo, —CN, and —CF$_3$;

each R' is independently selected from —H, and an optionally substituted group selected from a C$_{1-6}$ alkyl, a C$_{2-6}$ alkenyl, a C$_{2-6}$ alkynyl, a 3-8-membered saturated, partially unsaturated, or fully unsaturated monocyclic ring having 0-4 heteroatoms independently selected from nitrogen, oxygen, and sulfur, and an 8-12 membered saturated, partially unsaturated, or fully unsaturated bicyclic ring system having 0-5 heteroatoms independently selected from nitrogen, oxygen, and sulfur; or two occurrences of R' are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, and sulfur;

R$^2$ is -L$^2$-R$^{20}$;

L$^2$ is a bond or an optionally substituted branched or straight C$_{1-6}$ alkylene chain, wherein up to two carbon atoms of L$^2$ are optionally and independently replaced by —NR"—; —S—, —O—, —OC(O)—, —C(O)O—, —C(O)—, —C(O)C(O)—, —C(O)NR"—, —NR"C(O)—, —NR"C(O)O—, —S(O)$_2$NR"—, —NR"S(O)$_2$—, —C(O)NR"NR"—, —NR"C(O)NR"—, —OC(O)NR"—, —NR"NR"—, —NR"S(O)$_2$NR"—, —S(O)—, or —S(O)$_2$—;

R$^{20}$ is independently selected from R", halo, —CN, and —CF$_3$, each R" is independently selected from —H, and an optionally substituted group selected from a C$_{1-6}$ alkyl, a C$_{2-6}$ alkenyl, a C$_{2-6}$ alkynyl, a 3-8-membered saturated, partially unsaturated, or fully unsaturated monocyclic ring having 0-4 heteroatoms independently selected from nitrogen, oxygen, and sulfur, or an 8-12 membered saturated, partially unsaturated, or fully unsaturated bicyclic ring system having 0-5 heteroatoms independently selected from nitrogen, oxygen, and sulfur, or two occurrences of R" are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, and sulfur;

each of $R^3$ and $R^4$ is independently selected from —H, $C_{1-3}$ alkyl, and a 3-8-membered saturated, partially unsaturated, or fully unsaturated monocyclic ring having 0-4 heteroatoms independently selected from nitrogen, oxygen, and sulfur;

$R^4$ is

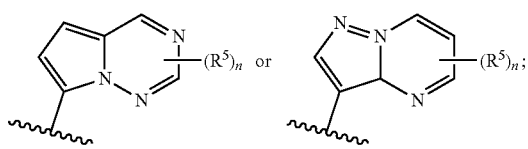

n is 1, 2, or 3;

each $R^5$ is independently -$L^3$-$R^{30}$;

each $L^3$ is independently a bond or an optionally substituted branched or straight $C_{1-6}$ alkylene chain, wherein up to two carbon atoms of $L^3$ are optionally and independently replaced by —NR'"—, —S—, —O—, —OC(O)—, —C(O)O—, —C(O)—, —C(O)C(O)—, —C(O)NR'"—, —NR'"C(O)—, —NR'"C(O)O—, —S(O)$_2$NR'"—, —NR'"S(O)$_2$—, —C(O)NR'"NR'"—, —NR'"C(O)NR'"—, —OC(O)NR'"—, —NR'"NR">-, —NR'"S(O)$_2$NR'"—, —S(O)—, or —S(O)$_2$—;

each $R^{30}$ is independently selected from R'", halo, —CN, and —CF$_3$;

each R'" is independently selected from —H, and an optionally substituted group selected from a $C_{1-6}$ alkyl, a $C_{2-6}$ alkenyl, a $C_{2-6}$ alkynyl, a 3-8-membered saturated, partially unsaturated, or fully unsaturated monocyclic ring having 0-4 heteroatoms independently selected from nitrogen, oxygen, and sulfur, or an 8-12 membered saturated, partially unsaturated, or fully unsaturated bicyclic ring system having 0-5 heteroatoms independently selected from nitrogen, oxygen, and sulfur; or two occurrences of R" are taken together with the atom(s) to which they are bound to form an optionally substituted 3-12 membered saturated, partially unsaturated, or fully unsaturated monocyclic or bicyclic ring having 0-4 heteroatoms independently selected from nitrogen, oxygen, and sulfur, and $R^6$ is —H, —CN, halo, or $C_{1-6}$ alkyl;

provided that if $R^1$ is —H, then $R^2$ is other than —H.

2. The compound of claim 1, or a pharmaceutically acceptable salt thereof, wherein X is —O—.

3. The compound of claim 1, or a pharmaceutically acceptable salt thereof, wherein $L^1$ is an optionally substituted branched or straight $C_{1-4}$ alkylene chain, wherein up to one carbon atom of $L^1$ is optionally and independently replaced by —NR'—, —S—, —O—, —OC(O)—, —C(O)O—, —C(O)—, —C(O)C(O)—, —C(O)NR'—, or —NR'C(O)—;

$R^{10}$ is R'; and each R' is independently selected from —H, and an optionally substituted group selected from a $C_{1-3}$ alkyl or a 3-8-membered saturated, partially unsaturated, or fully unsaturated monocyclic ring having 0-4 heteroatoms independently selected from nitrogen, oxygen, and sulfur.

4. The compound of claim 1 or a pharmaceutically acceptable salt thereof, wherein $L^1$ is an optionally substituted branched or straight $C_{1-4}$ alkylene chain, wherein one carbon atom of $L^1$ is optionally and independently replaced by —O—, —OC(O)—, —C(O)O—, or ~ C(O)—; and $R^{10}$ is independently selected from —H, —CH$_3$, —CH$_2$CH$_3$, and an optionally substituted group selected from

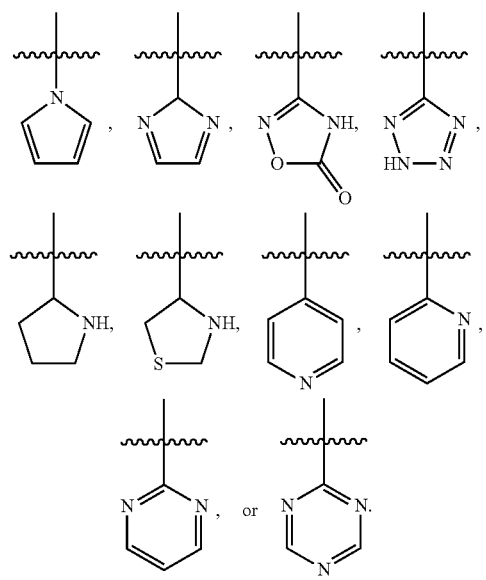

5. The compound of claim 1, or a pharmaceutically acceptable salt thereof, wherein $L^1$ is an optionally substituted branched or straight $C_{1-3}$ alkylene chain, wherein one carbon atom of $L^1$ is optionally and independently replaced by —O—, —OC(O)—, —C(O)O—, or —C(O)—; and $R^{10}$ is —H or

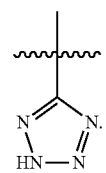

6. The compound of claim 1, or a pharmaceutically acceptable salt thereof, wherein $R^1$ is —H, —CH$_3$, —CH$_2$—OH, —CH$_2$—CH$_3$, —CH$_2$—O—CH$_3$, —CH$_2$C(O) OH, —CH$_2$—O—CH$_2$—C(O) OH, —CH$_2$—O—CH$_2$—C(O) CH$_3$, —C(O) OH,

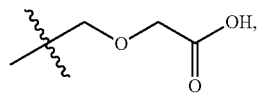

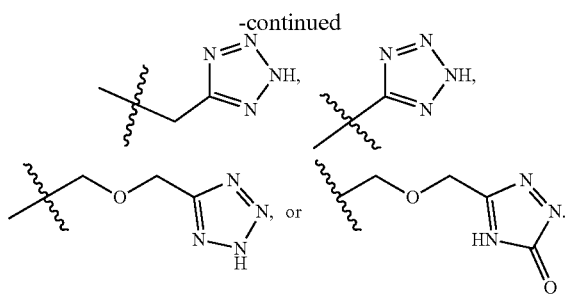

7. The compound of claim 1, or a pharmaceutically acceptable salt thereof, wherein
L² is an optionally substituted branched or straight Cua alkylene chain, wherein one carbon atom of L² is optionally replaced by —NR" ", —O—, —OC(O)—, —C(O)O—, —C(O)—, —C(O)NR"-, or —NR"C(O)—;
$R^{20}$ is R"; and
each R" is independently selected from —H, an optionally substituted $C_{1-3}$ alkyl, and an optionally substituted 5-membered heteroaryl.

8. The compound of claim 1, or a pharmaceutically acceptable salt thereof, wherein
L² is an optionally substituted branched or straight $C_{1-4}$ alkylene chain, wherein one carbon atom of L² is optionally replaced by —O—, —OC(O)—, —C(O)O—, or —C(O)—; and
$R^{20}$ is —H or an optionally substituted $C_{1-3}$ alkyl.

9. The compound of claim 1, or a pharmaceutically acceptable salt thereof, wherein $R^2$ is —H, —CH₃, —CH₂—OH, —CH₂—O—CH₃, —CH₂C(O) OH, —C(O) OH,

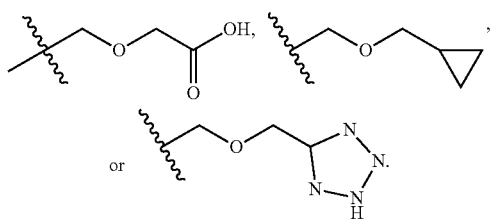

10. The compound of claim 1, or a pharmaceutically acceptable salt thereof, wherein each of $R^3$ and $R^4$ is independently H or $C_{1-3}$ alkyl.

11. The compound of claim 1, or a pharmaceutically acceptable salt thereof, wherein each of $R^3$ and $R^4$ is —H.

12. The compound of claim 1, or a pharmaceutically acceptable salt thereof, wherein n is 1 or 2;
each L³ is independently a bond or an optionally substituted branched or straight $C_{1-6}$ alkylene chain, wherein up to two carbon atoms of L³ are optionally and independently replaced by —NR'''—, —S—, —O—, —OC(O)—, —C(O)O—, —C(O)—, —C(O)NR'''—, —NR'''C(O)—, —S(O)—, or —S(O)₂—;
each $R^{30}$ is R''' or halo; and
each R''' is independently selected from —H, and an optionally substituted group selected from a $C_{1-6}$ alkyl, a 3-8-membered saturated, partially unsaturated, or fully unsaturated monocyclic ring having 0-4 heteroatoms independently selected from nitrogen, oxygen, and sulfur.

13. The compound of claim 1, or a pharmaceutically acceptable salt thereof, wherein n is 2 and at least one occurrence of $R^5$ is halo.

14. The compound of claim 13, or a pharmaceutically acceptable salt thereof, wherein one occurrence of $R^5$ is halo, and a second occurrence of $R^5$ is -L³-$R^{30}$; wherein L³ is independently a bond or an optionally substituted branched or straight $C_{1-4}$ alkylene chain, wherein one carbon atom of L³ is optionally and independently replaced by —NR'''—, —S—, or —O—;
$R^{30}$ is R'''; and
each R''' is independently selected from —H, and an optionally substituted group selected from a $C_{1-3}$ alkyl, and a 4-6-membered saturated, partially unsaturated, or fully unsaturated carbocycle.

15. The compound of claim 14, or a pharmaceutically acceptable salt thereof, wherein one occurrence of $R^5$ is —Cl, —Br, or —F, and the second occurrence of $R^5$ is -L³-$R^{30}$; wherein L³ is independently a bond or an optionally substituted branched or straight $C_{1-3}$ alkylene chain, wherein one carbon atom of L³ is optionally and independently replaced by —NR'''—; $R^{30}$ is R'''; and each R''' is independently selected from —H, and an optionally substituted group selected from a $C_{1-3}$ alkyl, or a 4-6-membered saturated, partially unsaturated, or fully unsaturated carbocycle.

16. The compound of claim 1, or a pharmaceutically acceptable salt thereof, wherein $R^4$ is

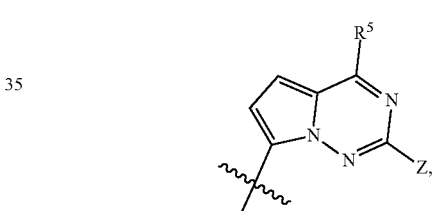

wherein Z is halo, and $R^5$ is -L³-$R^{30}$; wherein L' is independently a bond or an optionally substituted branched or straight $C_{1-4}$ alkylene chain, wherein one carbon atom of L³ is optionally and independently replaced by —NR''', —S—, or —O—; $R^{30}$ is R'''; and each R''' is independently selected from —H, and an optionally substituted group selected from a $C_{1-3}$ alkyl, a 4-6-membered saturated, partially unsaturated, or fully unsaturated carbocycle, or a 8-12 membered saturated, partially unsaturated, or fully unsaturated bicyclic carbocycle.

17. The compound of claim 1, or a pharmaceutically acceptable salt thereof, wherein $R^4$ is

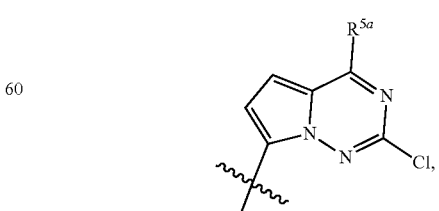

and $R^{5a}$ is —H, —CH$_3$,

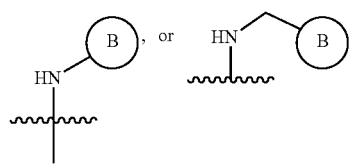

wherein ring B is

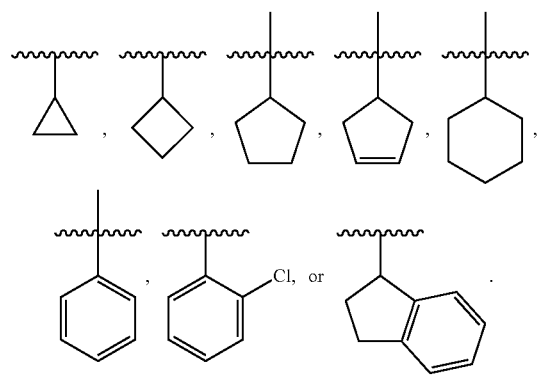

18. The compound of claim 1, or a pharmaceutically acceptable salt thereof, wherein $R^A$ is

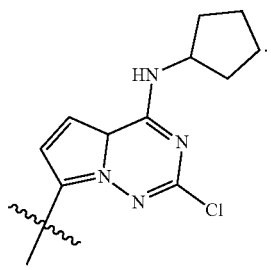

19. The compound of claim 1, or a pharmaceutically acceptable salt thereof, wherein $R^A$ is

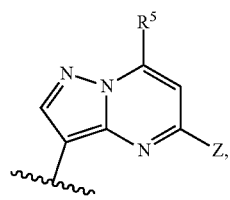

wherein Z is halo, and $R^5$ is -L$^3$-R$^{30}$; wherein L$^3$ is independently a bond or an optionally substituted branched or straight C$_{1-4}$ alkylene chain, wherein one carbon atom of L$^3$ is optionally and independently replaced by —NR'''—, —S—, or —O—; R$^{30}$ is R'''; and each R''' is independently selected from —H, and an optionally substituted group selected from a C$_{1-3}$ alkyl, a 4-6-membered saturated, partially unsaturated, or fully unsaturated carbocycle, or a 8-12 membered saturated, partially unsaturated, or fully unsaturated bicyclic carbocycle.

20. The compound of claim 1, or a pharmaceutically acceptable salt thereof, wherein $R^A$ is

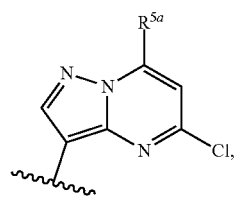

and $R^{5a}$ is —H, —CH$_3$,

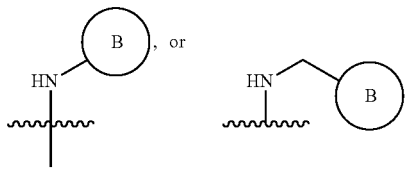

wherein ring B is

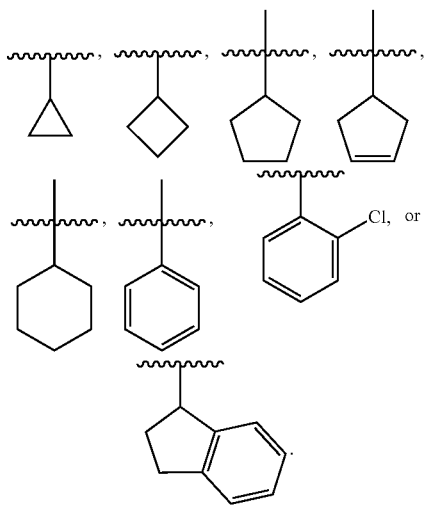

21. The compound of claim 1, or a pharmaceutically acceptable salt thereof, wherein $R^A$ is

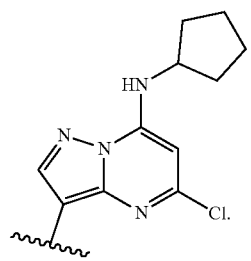 [SMILES: *c1cnn2c(NC3CCCC3)cc(Cl)nc12]

22. The compound of claim 1, or a pharmaceutically acceptable salt thereof, wherein the compound of Formula (I) is a compound of Formula (Ia-1) or (Ia-2):

(Ia-1)
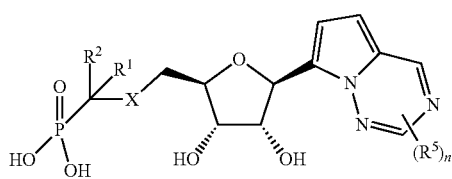

(Ia-2)
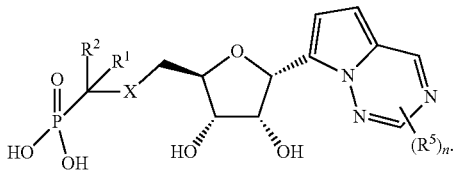

23. The compound of claim 1, or a pharmaceutically acceptable salt thereof, wherein the compound of Formula (I) is a compound of Formula (Ia-3) or (Ia-4):

(Ia-3)
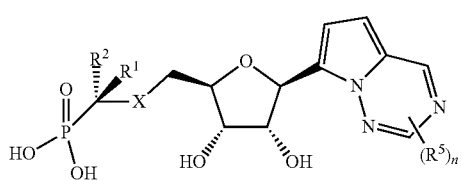

(Ia-4)
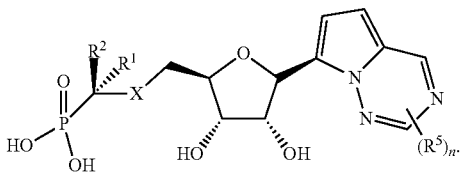

24. The compound of claim 1, or a pharmaceutically acceptable salt thereof, wherein the compound of Formula (I) is a compound of Formula (Ia-7):

(Ia-7)
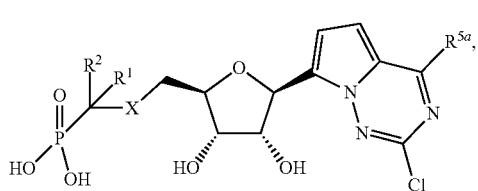

wherein $R^{5a}$ is —H, —CH$_3$,

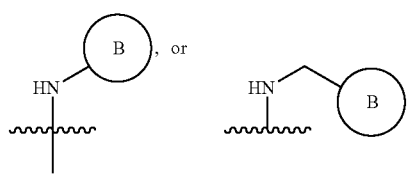

wherein ring B is

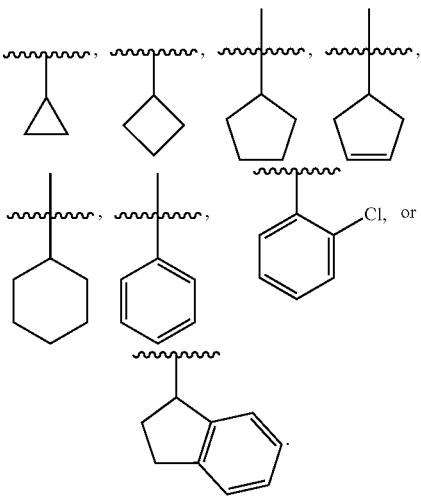

25. The compound of claim 24, or a pharmaceutically acceptable salt thereof, wherein the compound of Formula (Ia-7) is a compound of Formula (Ia-8) or (Ia-9):

(Ia-8)
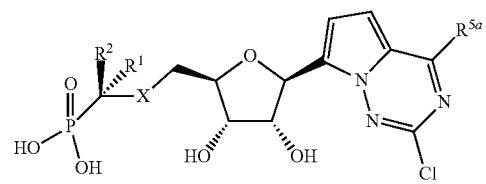

(Ia-9)
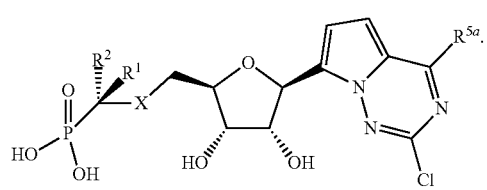

26. The compound of claim 1, or a pharmaceutically acceptable salt thereof, wherein the compound of Formula (I) is a compound of Formula (Ib-1) or (Ib-2):

(Ib-1)
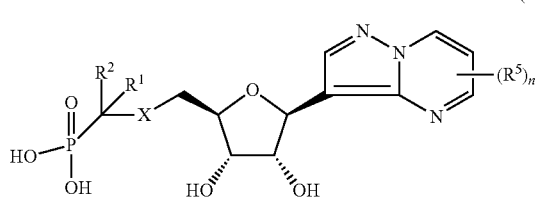

(Ib-2)
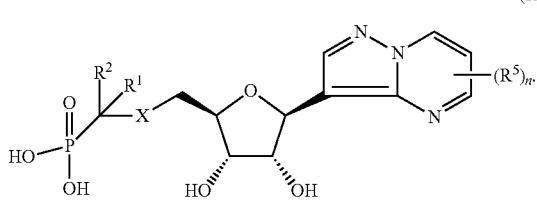

27. The compound of claim 1, or a pharmaceutically acceptable salt thereof, wherein the compound of Formula (I) is a compound of Formula (Ib-3) or (Ib-4):

(Ib-3)
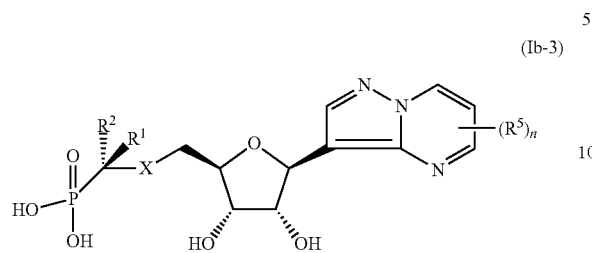

(Ib-4)
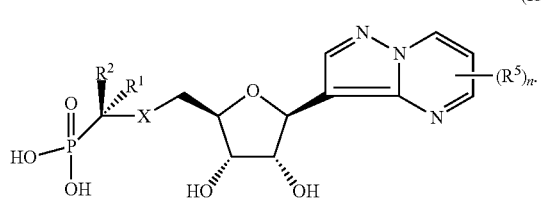

28. The compound of claim 1, or a pharmaceutically acceptable salt thereof, wherein the compound of Formula (I) is a compound of Formula (Ib-7):

(Ib-7)
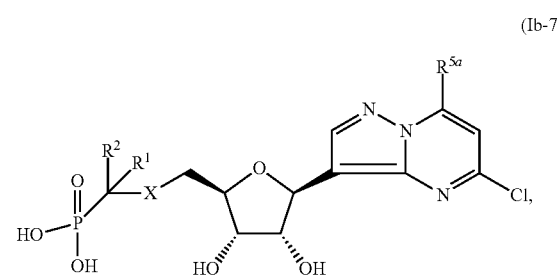

wherein $R^{5a}$ is —H, —CH$_3$,

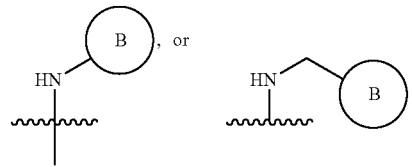

wherein ring B is

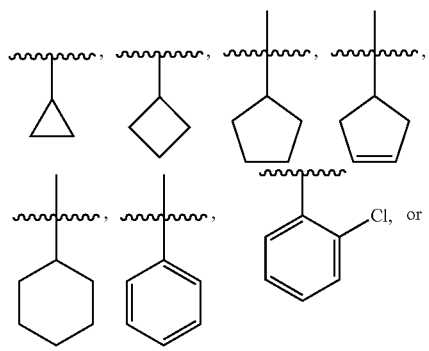

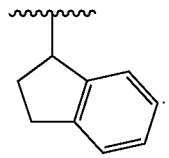

29. The compound of claim 28, or a pharmaceutically acceptable salt thereof, wherein the compound of Formula (Ib-7) is a compound of Formula (Ib-8) or (Ib-9):

(Ib-8)
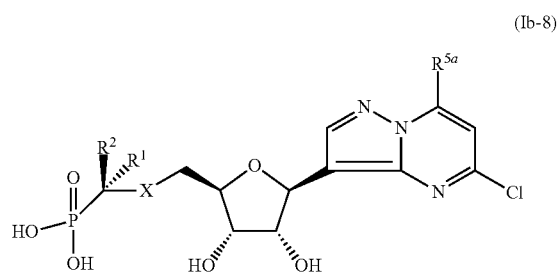

(Ib-9)
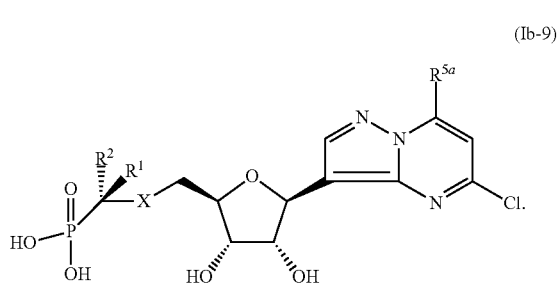

30. A compound selected from the group consisting of:

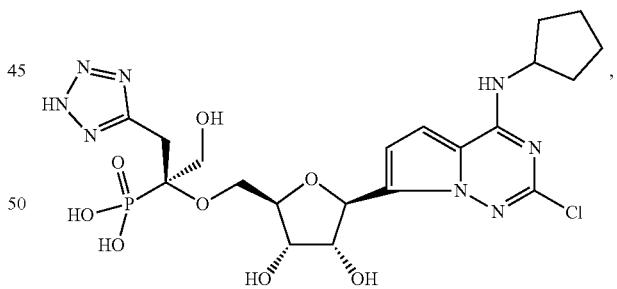

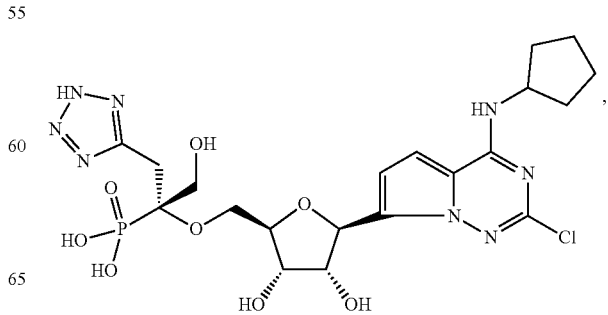

137
-continued
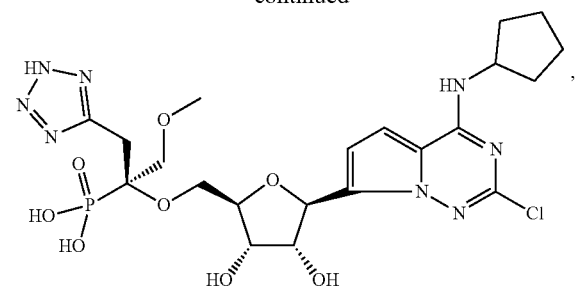
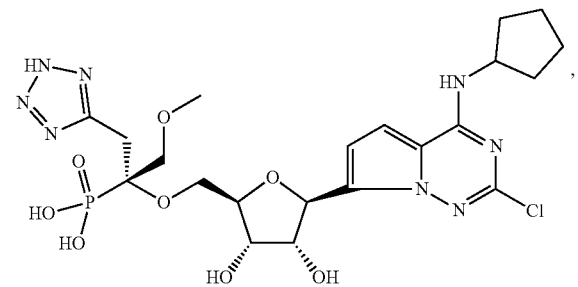
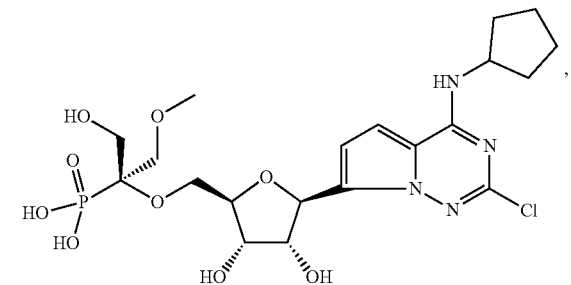
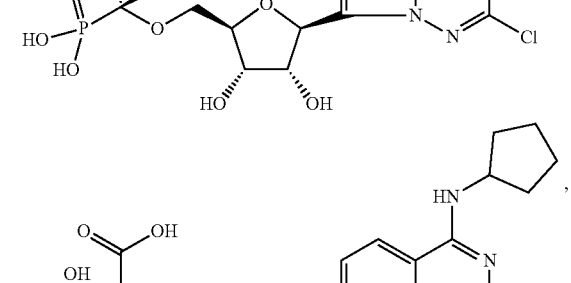
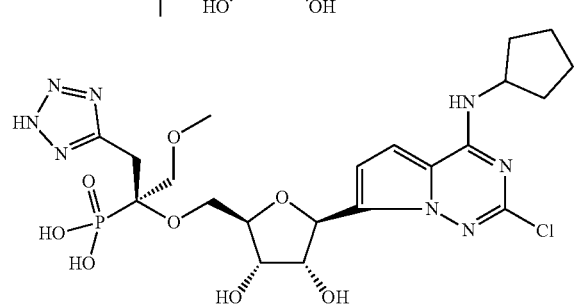
138
-continued
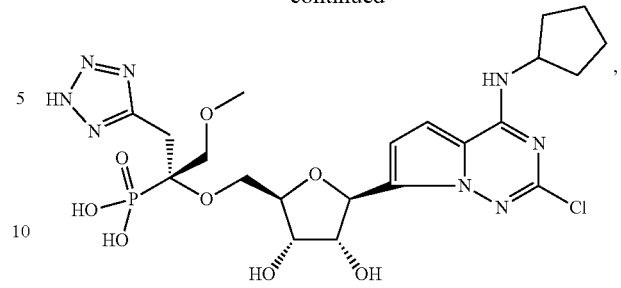
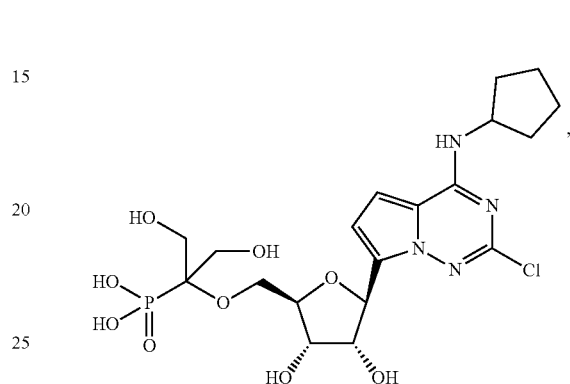
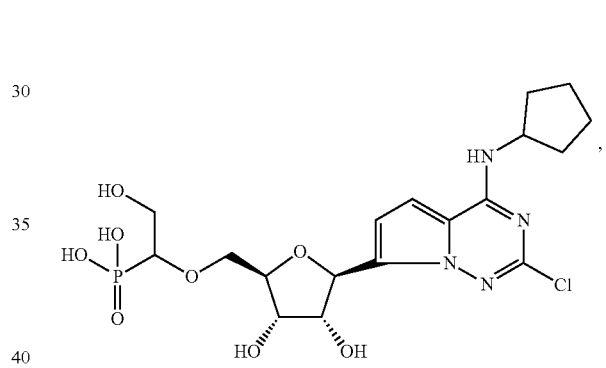
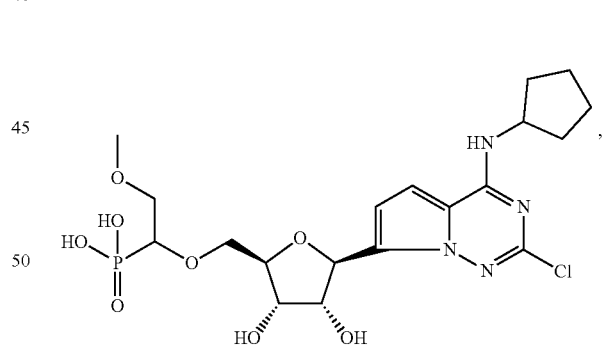
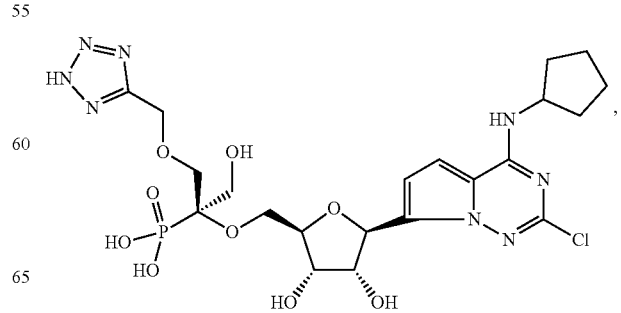

139
-continued
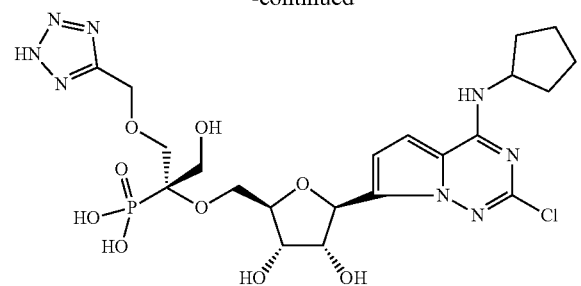
140
-continued
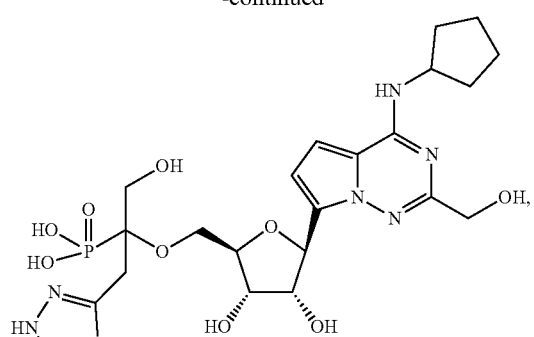
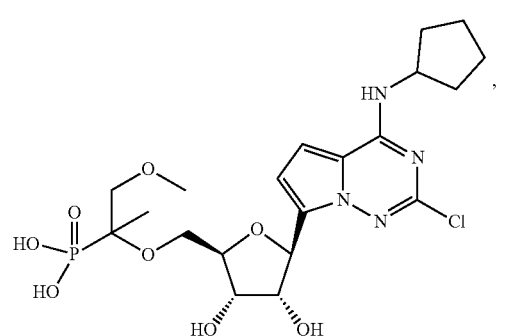
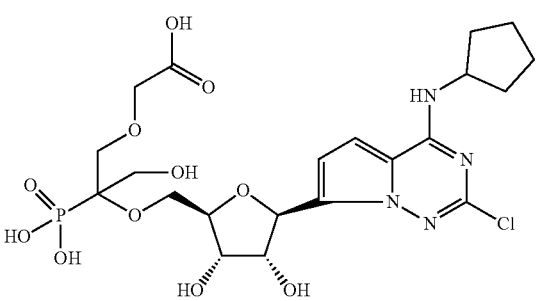
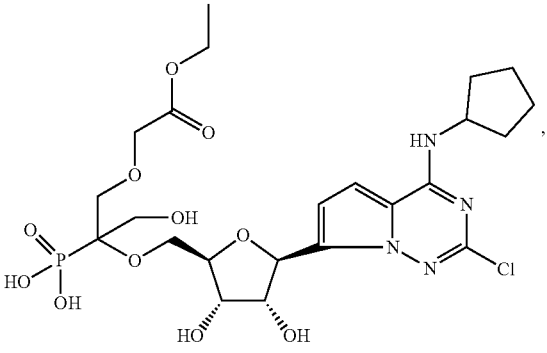
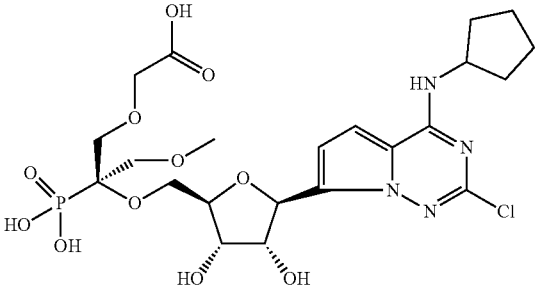

141
-continued
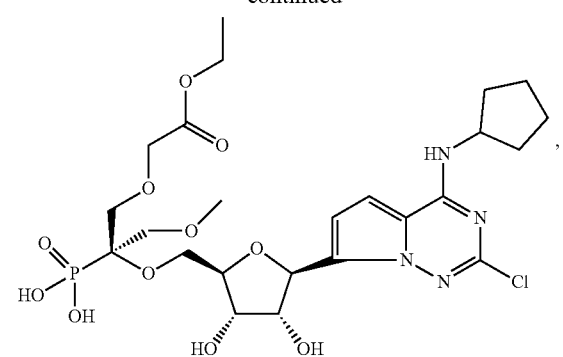
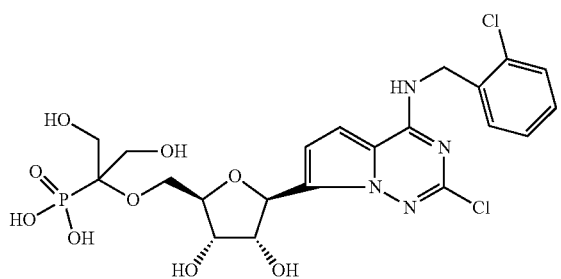
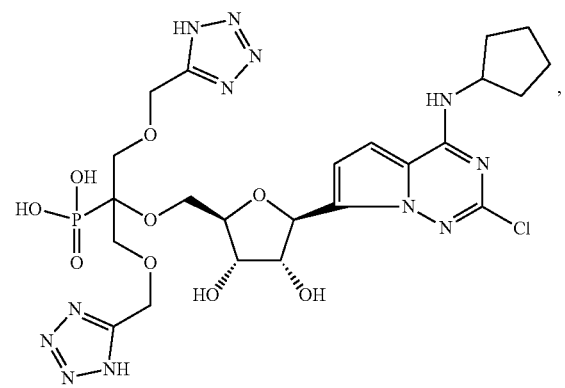
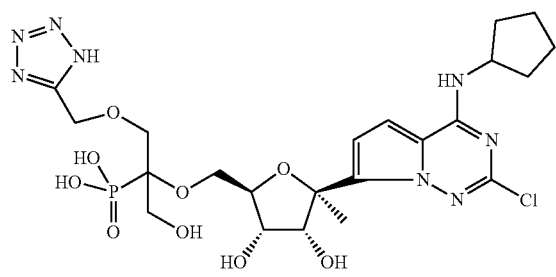
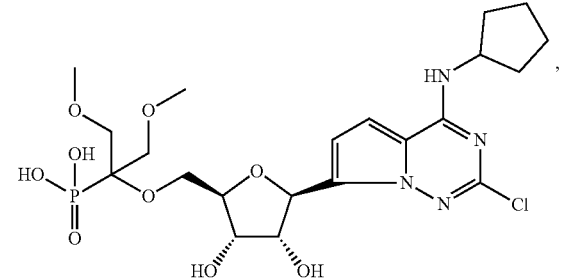
142
-continued
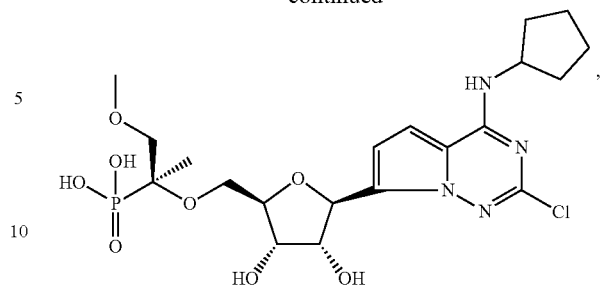
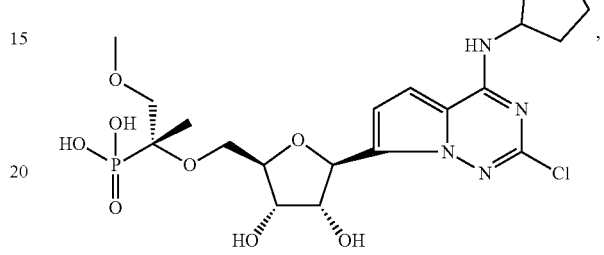
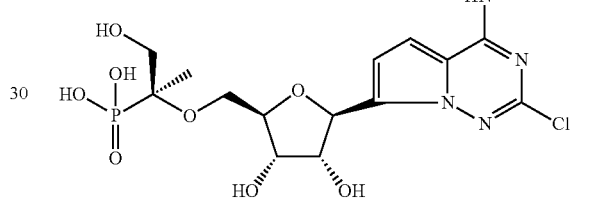
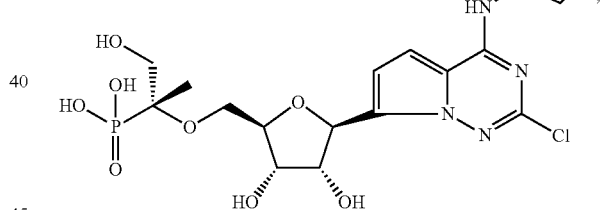
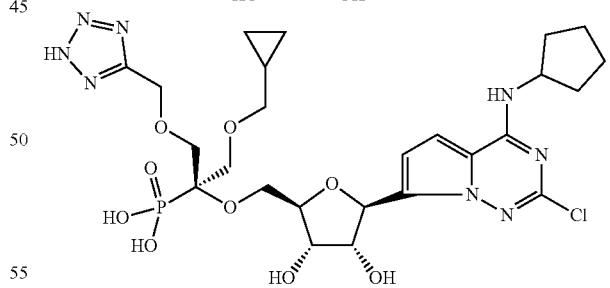
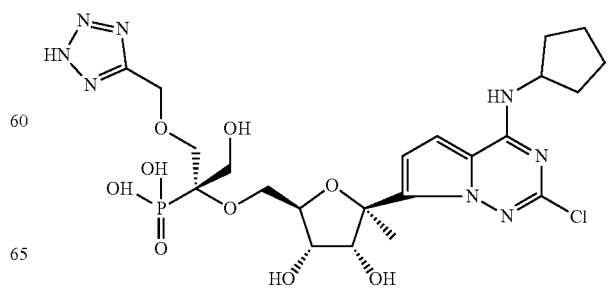

143
-continued
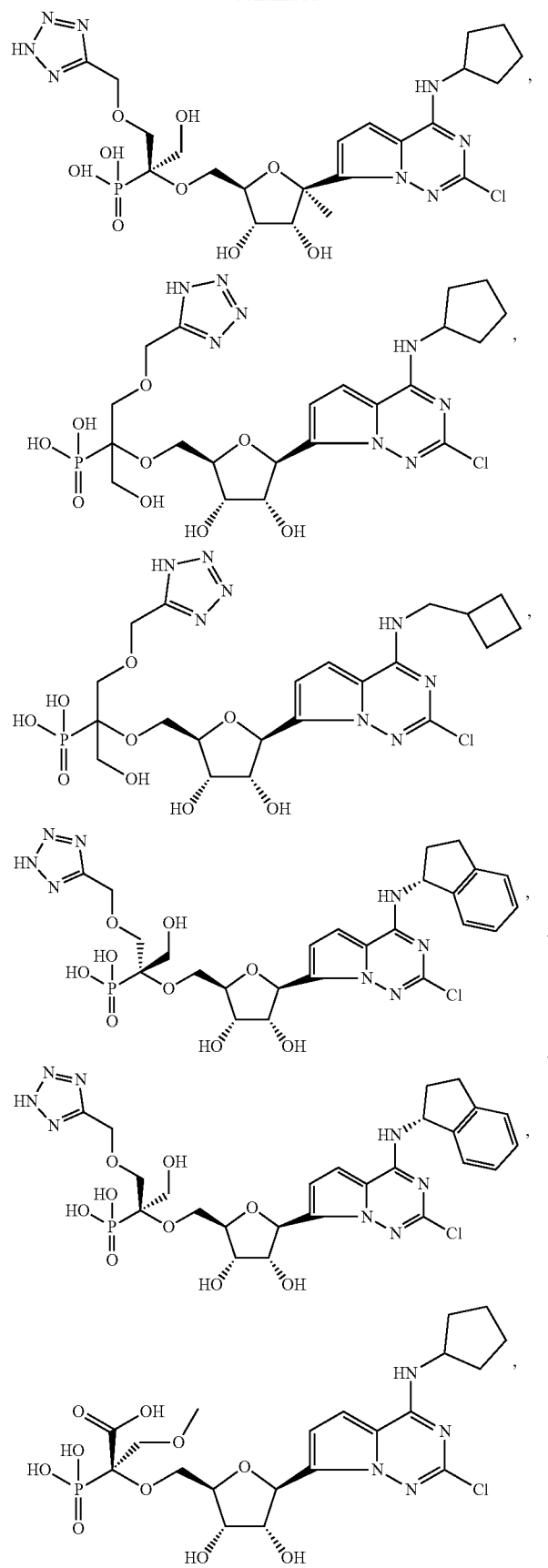
144
-continued
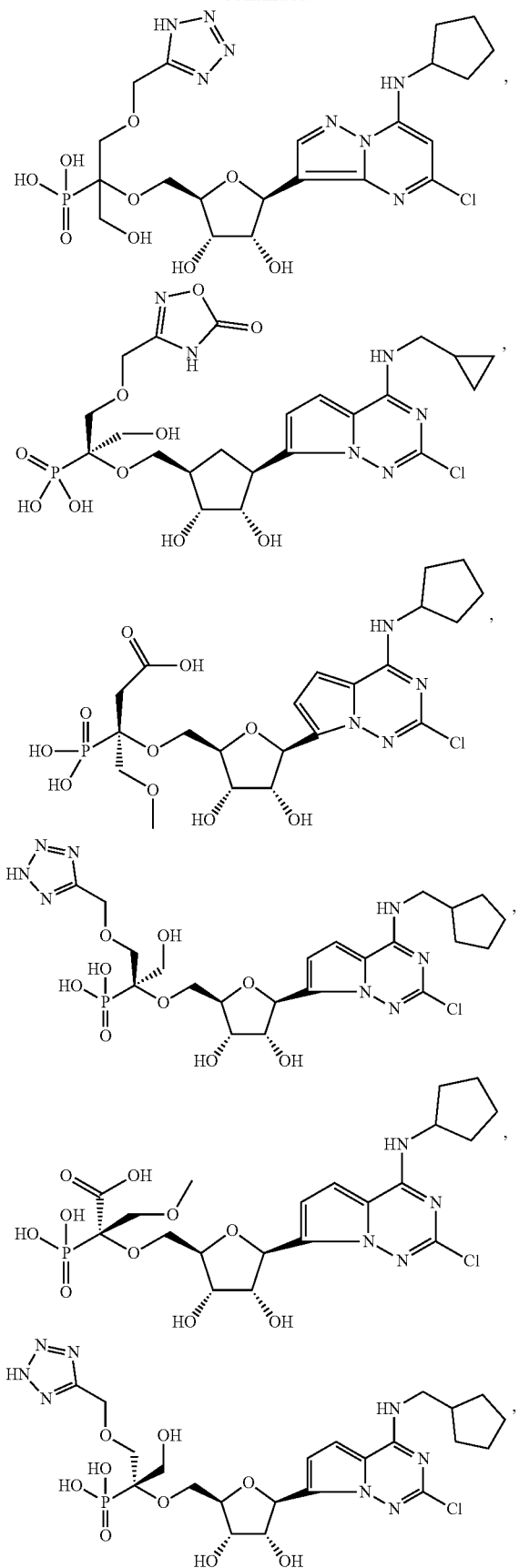

145
-continued
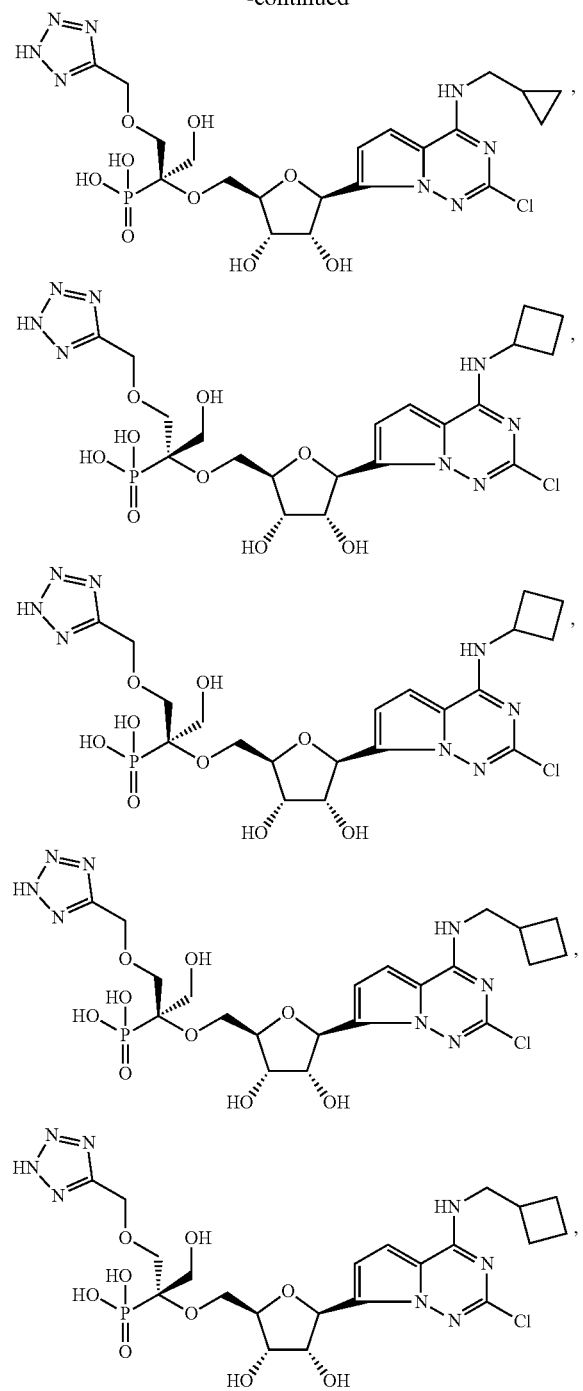
146
-continued
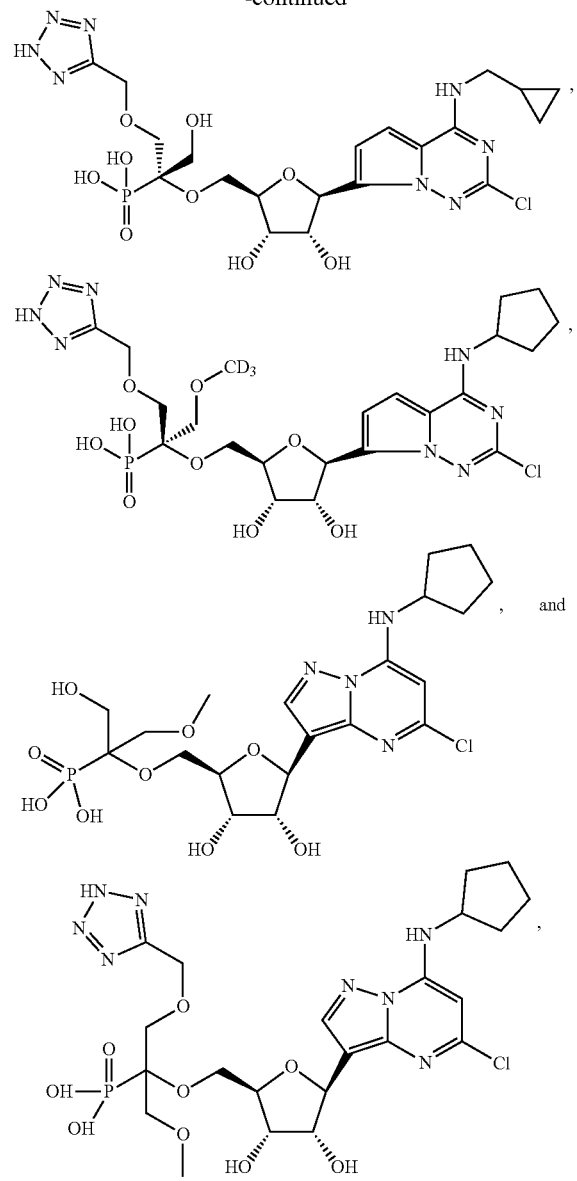
or a pharmaceutically acceptable salt thereof.
31. A pharmaceutical composition comprising a compound according to claim 1, or a pharmaceutically acceptable salt thereof, and a pharmaceutically acceptable vehicle, carrier, or adjuvant.
* * * * *